(12) United States Patent
Mark

(10) Patent No.: US 10,040,252 B2
(45) Date of Patent: *Aug. 7, 2018

(54) METHODS FOR FIBER REINFORCED ADDITIVE MANUFACTURING

(71) Applicant: MARKFORGED, INC., Cambridge, MA (US)

(72) Inventor: Gregory Thomas Mark, Cambridge, MA (US)

(73) Assignee: MARKFORGED, INC., Watertown, MA (US)

( * ) Notice: Subject to any disclaimer, the term of this patent is extended or adjusted under 35 U.S.C. 154(b) by 201 days.

This patent is subject to a terminal disclaimer.

(21) Appl. No.: 15/186,651

(22) Filed: Jun. 20, 2016

(65) Prior Publication Data

US 2016/0368213 A1    Dec. 22, 2016

Related U.S. Application Data

(63) Continuation of application No. 14/297,437, filed on Jun. 5, 2014, now Pat. No. 9,370,896, which is a
(Continued)

(51) Int. Cl.
*B29C 70/40* (2006.01)
*B29C 70/42* (2006.01)
(Continued)

(52) U.S. Cl.
CPC ........ *B29C 67/0081* (2013.01); *B29C 31/042* (2013.01); *B29C 31/044* (2013.01);
(Continued)

(58) Field of Classification Search
CPC ... B29C 31/042; B29C 31/044; B29C 31/045; B29C 31/048; B29C 47/0066;
(Continued)

(56) References Cited

U.S. PATENT DOCUMENTS 4,291,841 A    9/1981 Dalrymple et al.
4,720,251 A    1/1988 Mallay et al.
(Continued)

FOREIGN PATENT DOCUMENTS

CN    101133107 A    2/2008
CN    101193953 A    6/2008
(Continued)

OTHER PUBLICATIONS

Brett Compton, "3D printing of composites with controlled architecture," Engineering Conferences International, ECI Digital Archives, Composites at Lake Louise (CALL 2015), Fall Nov. 9, 2015, pp. 30.
(Continued)

*Primary Examiner* — Leo B Tentoni
(74) *Attorney, Agent, or Firm* — Lando & Anastasi, LLP

(57) ABSTRACT

Various embodiments related to three dimensional printers, and reinforced filaments, and their methods of use are described. In one embodiment, a void free reinforced filament is fed into an extrusion nozzle. The reinforced filament includes a core, which may be continuous or semi-continuous, and a matrix material surrounding the core. The reinforced filament is heated to a temperature greater than a melting temperature of the matrix material and less than a melting temperature of the core prior to extruding the filament from the extrusion nozzle.

24 Claims, 35 Drawing Sheets

Related U.S. Application Data continuation-in-part of application No. 14/222,318, filed on Mar. 21, 2014.

(60) Provisional application No. 61/907,431, filed on Nov. 22, 2013, provisional application No. 61/902,256, filed on Nov. 10, 2013, provisional application No. 61/883,440, filed on Sep. 27, 2013, provisional application No. 61/881,946, filed on Sep. 24, 2013, provisional application No. 61/880,129, filed on Sep. 19, 2013, provisional application No. 61/878,029, filed on Sep. 15, 2013, provisional application No. 61/847,113, filed on Jul. 17, 2013, provisional application No. 61/831,600, filed on Jun. 5, 2013, provisional application No. 61/815,531, filed on Apr. 24, 2013, provisional application No. 61/804,235, filed on Mar. 22, 2013.

(51) Int. Cl.

| | | |
|---|---|---|
| *B29C 70/52* | (2006.01) | |
| *B29C 67/00* | (2017.01) | |
| *B29C 31/04* | (2006.01) | |
| *B29C 47/00* | (2006.01) | |
| *B29C 69/00* | (2006.01) | |
| *B29C 70/16* | (2006.01) | |
| *B33Y 10/00* | (2015.01) | |
| *B33Y 50/02* | (2015.01) | |
| *B29C 64/141* | (2017.01) | |
| *B29C 64/165* | (2017.01) | |
| *B29C 64/386* | (2017.01) | |
| *B29K 79/00* | (2006.01) | |
| *B29K 71/00* | (2006.01) | |
| *B29K 25/00* | (2006.01) | |
| *B29K 63/00* | (2006.01) | |
| *B29K 77/00* | (2006.01) | |
| *B29K 105/08* | (2006.01) | |
| *B33Y 70/00* | (2015.01) | |
| *B29C 64/209* | (2017.01) | |
| *B29C 64/118* | (2017.01) | |

(52) U.S. Cl.
CPC .......... *B29C 31/045* (2013.01); *B29C 31/048* (2013.01); *B29C 47/0066* (2013.01); *B29C 64/141* (2017.08); *B29C 64/165* (2017.08); *B29C 64/386* (2017.08); *B29C 69/001* (2013.01); *B29C 70/16* (2013.01); *B29C 70/521* (2013.01); *B29C 70/523* (2013.01); *B29C 70/525* (2013.01); *B29C 70/528* (2013.01); *B33Y 10/00* (2014.12); *B33Y 50/02* (2014.12); *B29C 64/118* (2017.08); *B29C 64/209* (2017.08); *B29K 2025/08* (2013.01); *B29K 2063/00* (2013.01); *B29K 2071/00* (2013.01); *B29K 2077/00* (2013.01); *B29K 2079/085* (2013.01); *B29K 2105/08* (2013.01); *B33Y 70/00* (2014.12)

(58) Field of Classification Search
CPC ... B29C 64/118; B29C 64/141; B29C 69/001; B29C 70/40; B29C 70/42; B29C 70/52; B29C 70/521; B29C 70/523; B29C 70/525; B29C 70/528; B33Y 10/00; B33Y 70/00
USPC .................. 264/136, 148, 248, 308
See application file for complete search history.

(56) References Cited

U.S. PATENT DOCUMENTS

| | | |
|---|---|---|
| 5,002,712 A | 3/1991 | Goldmann et al. |
| 5,037,691 A | 8/1991 | Medney et al. |
| 5,155,324 A | 10/1992 | Deckard et al. |
| 5,340,433 A | 8/1994 | Crump |
| 5,866,058 A | 2/1999 | Batchelder et al. |
| 5,885,316 A | 3/1999 | Sato et al. |
| 5,906,863 A | 5/1999 | Lombardi et al. |
| 5,936,861 A | 8/1999 | Jang et al. |
| 5,955,119 A | 9/1999 | Andris et al. |
| 6,129,872 A | 10/2000 | Jang |
| 6,153,034 A | 11/2000 | Lipsker |
| 6,214,279 B1 | 4/2001 | Yang et al. |
| 6,363,606 B1 | 4/2002 | Johnson, Jr. et al. |
| 6,934,600 B2 | 8/2005 | Jang et al. |
| 7,127,309 B2 | 10/2006 | Dunn et al. |
| 8,050,786 B2 | 11/2011 | Holzwarth |
| 8,066,842 B2 | 11/2011 | Farmer et al. |
| 8,221,669 B2 | 7/2012 | Batchelder et al. |
| 8,815,141 B2 | 8/2014 | Swanson et al. |
| 8,916,085 B2 | 12/2014 | Jackson et al. |
| 9,207,540 B1 | 12/2015 | Bhargava et al. |
| 9,370,896 B2 | 6/2016 | Mark |
| 9,427,399 B2 | 8/2016 | Adams et al. |
| 9,511,544 B2 | 12/2016 | Hemingway et al. |
| 2002/0009935 A1 | 1/2002 | Hsiao et al. |
| 2002/0062909 A1 | 5/2002 | Jang et al. |
| 2002/0079607 A1 | 6/2002 | Hawley et al. |
| 2002/0102322 A1 | 8/2002 | Gunther |
| 2002/0113331 A1 | 8/2002 | Zhang et al. |
| 2002/0165304 A1 | 11/2002 | Mulligan et al. |
| 2003/0044593 A1 | 3/2003 | Vaidyanathan et al. |
| 2003/0056870 A1 | 3/2003 | Comb et al. |
| 2003/0090034 A1 | 5/2003 | Mulhaupt et al. |
| 2003/0186042 A1 | 10/2003 | Dunlap et al. |
| 2003/0236588 A1 | 12/2003 | Jang et al. |
| 2004/0166140 A1 | 8/2004 | Santini et al. |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2005/0279185 A1 | 12/2005 | Cook et al. |
| 2007/0003650 A1 | 1/2007 | Schroeder |
| 2007/0151167 A1 | 7/2007 | Cook et al. |
| 2007/0228592 A1 | 10/2007 | Dunn et al. |
| 2007/0252871 A1 | 11/2007 | Silverbrook |
| 2008/0176092 A1 | 7/2008 | Owens |
| 2008/0206394 A1 | 8/2008 | Bouti |
| 2008/0274229 A1 | 11/2008 | Barnett |
| 2009/0054552 A1 | 2/2009 | Yano et al. |
| 2009/0065965 A1 | 3/2009 | Bowen |
| 2009/0095410 A1 | 4/2009 | Oldani |
| 2009/0174709 A1 | 7/2009 | Kozlak et al. |
| 2009/0220632 A1 | 9/2009 | Haque |
| 2010/0024987 A1 | 2/2010 | Saine et al. |
| 2010/0028641 A1 | 2/2010 | Zhu et al. |
| 2010/0151072 A1 | 6/2010 | Scheurich |
| 2010/0191360 A1 | 7/2010 | Napadensky et al. |
| 2010/0203351 A1 | 8/2010 | Nayfeh |
| 2010/0243764 A1 | 9/2010 | Okesaku et al. |
| 2011/0032301 A1 | 2/2011 | Fienup et al. |
| 2011/0143108 A1 | 6/2011 | Fruth et al. |
| 2011/0178621 A1 | 7/2011 | Heide |
| 2011/0222081 A1 | 9/2011 | Yi et al. |
| 2011/0230111 A1 | 9/2011 | Weir et al. |
| 2011/0289791 A1 | 12/2011 | Menchik et al. |
| 2012/0060468 A1 | 3/2012 | Dushku et al. |
| 2012/0231225 A1 | 9/2012 | Mikulak et al. |
| 2012/0247655 A1 | 10/2012 | Erb et al. |
| 2013/0004610 A1 | 1/2013 | Hartmann et al. |
| 2013/0164498 A1 | 6/2013 | Langone et al. |
| 2013/0205920 A1 | 8/2013 | Tow |
| 2013/0209600 A1 | 8/2013 | Tow |
| 2013/0233471 A1 | 9/2013 | Kappesser et al. |
| 2013/0241102 A1 | 9/2013 | Rodgers et al. |
| 2013/0327917 A1 | 12/2013 | Steiner et al. |

(56) References Cited

U.S. PATENT DOCUMENTS

| | | |
|---|---|---|
| 2013/0337256 A1 | 12/2013 | Farmer et al. |
| 2013/0337265 A1 | 12/2013 | Farmer |
| 2014/0039663 A1 | 2/2014 | Boyer et al. |
| 2014/0044822 A1 | 2/2014 | Mulliken |
| 2014/0061974 A1 | 3/2014 | Tyler |
| 2014/0120197 A1 | 5/2014 | Swanson et al. |
| 2014/0159284 A1 | 6/2014 | Leavitt |
| 2014/0175706 A1 | 6/2014 | Kritchman |
| 2014/0232035 A1 | 8/2014 | Bheda |
| 2014/0268604 A1 | 9/2014 | Wicker et al. |
| 2014/0277661 A1 | 9/2014 | Amadio et al. |
| 2014/0287139 A1 | 9/2014 | Farmer et al. |
| 2014/0291886 A1 | 10/2014 | Mark et al. |
| 2014/0328963 A1 | 11/2014 | Mark et al. |
| 2014/0328964 A1 | 11/2014 | Mark et al. |
| 2015/0014885 A1 | 1/2015 | Hofmann et al. |
| 2015/0037446 A1 | 2/2015 | Douglass et al. |
| 2015/0165666 A1 | 6/2015 | Butcher et al. |
| 2015/0165690 A1 | 6/2015 | Tow |
| 2015/0239178 A1 | 8/2015 | Armstrong |
| 2015/0242737 A1 | 8/2015 | Glazberg et al. |
| 2015/0266243 A1 | 9/2015 | Mark et al. |
| 2015/0266244 A1 | 9/2015 | Page |
| 2015/0287247 A1 | 10/2015 | Willis et al. |
| 2015/0321427 A1 | 11/2015 | Gunnarsson et al. |
| 2015/0342720 A1 | 12/2015 | Koc et al. |
| 2016/0067927 A1 | 3/2016 | Voris et al. |
| 2016/0068678 A1 | 3/2016 | Luo et al. |
| 2016/0075089 A1 | 3/2016 | Duro Royo et al. |
| 2016/0192741 A1 | 7/2016 | Mark |
| 2016/0221259 A1 | 8/2016 | Kobida et al. |
| 2016/0263832 A1 | 9/2016 | Bui et al. |
| 2016/0346997 A1 | 12/2016 | Lewis et al. |
| 2017/0021564 A1 | 1/2017 | Ooba et al. |
| 2017/0057164 A1 | 3/2017 | Hemphill et al. |
| 2017/0106594 A1 | 4/2017 | Gardiner |
| 2017/0136707 A1 | 5/2017 | Batchelder et al. |

FOREIGN PATENT DOCUMENTS

| | | |
|---|---|---|
| CN | 101300299 A | 11/2008 |
| CN | 101484397 A | 7/2009 |
| CN | 101689229 A | 3/2010 |
| CN | 101801647 A | 8/2010 |
| CN | 104149339 A | 11/2014 |
| DE | 4102257 A1 | 7/1992 |
| JP | S58-122116 A | 7/1983 |
| JP | 1-266231 A | 10/1989 |
| JP | H7-117141 A | 5/1995 |
| JP | 2003-534159 A | 11/2003 |
| JP | 2004-331706 A | 11/2004 |
| JP | 2012-97449 A | 5/2012 |
| KR | 20100004475 A | 1/2010 |
| KR | 100995983 B1 | 11/2010 |
| KR | 101172859 B1 | 8/2012 |
| WO | 0189714 A1 | 11/2001 |
| WO | 2009009137 A1 | 1/2009 |
| WO | 2013017284 A2 | 2/2013 |
| WO | 2015042422 A1 | 3/2015 |

OTHER PUBLICATIONS

Brett G. Compton and Jennifer A. Lewis, "3D-Printing of Lighweight Cellular Campsites," Advanced Materials 2014, 26, pp. 5930-5935.

Ahn et al., Anisoptropic material properties of fused deposition modeling ABS, Rapid Prorotyping vol. 8, No. 4, 2002, pp. 248-257.

August et al., Recent Developments in Automated Fiber Placement of Thermoplastic Composites, SAMPE Technical Conference Proceedings, Wichita, KS, Oct. 23, 2013.

Dell'Anno et al., Automated Manufacture of 3D Reinforced Aerospace Composite Structures, International Journal of Structural Integrity, 2012, vol. 3, Iss 1, pp. 22-40.

Devleig et al., High-Speed Fiber Placement on Large Complex Structures, No. 2007-01-3843. SAE International 2007.

Hasenjaeger, Programming and Simulating Automated Fiber Placement (AFP) CNC Machines, SAMPE Journal, vol. 49, No. 6, Nov./Dec. 2013.

Hossain et al, Improving Tensile Mechanical Properties of FDM-Manufactured Specimens via Modifying Build Parameters, Proceedings of Solid Freeform Fabrication Symposium, Austin, Texas, Aug. 16, 2013.

International Search Report for PCT/US2014/041161 dated Dec. 3, 2014.

Lamontia et al, "Contoured Tape Laying and Fiber Placement Heads for Automated Fiber Placement of Large Composite Aerospace Structures," 34th ISTC, Baltimore, Md, Nov. 4-7, 2002.

Mondo et al., Overview of Thermoplastic Composite ATL and AFP Technologies, ITHEC 2012, Oct. 30, 2012, Messe Bremen, Germany.

Rower, Robot Driven Automatic Tapehead for Complex Composite Lay-ups, No. 10AMAF-0066, SAE International 2010, Aerospace Manufacturing and Automated Fastening Conference & Exhibition, Sep. 28, 2010.

Slocum, Alexander: "Kinematic Couplings: A Review of Design Principles and Applications", International Journal of Machine Tools and Manufacture 50.4 (2010): 310-327.

Zieman et al., Anisotropic Mechanical Properties of ABS Parts Fabricated by Fused Deposition Modelling, INTECH Open Access Publisher, 2012.

"Thermal Conductivity of Metals", The Engineering Toolbox, http://www.engineeringtoolbox.com/thermal-conductivity-metalsd_858.html, Sep. 15, 2017, 6 pages.

Bales, Steven, "Know Your Mold Coatings", Plastics Technology, http://www.ptonlinecom/articles/know-your-mold-coatings, Dec. 1, 2004, 8 pages.

Compton, B. G. et al., "3D-Printing of Lightweight Cellular Composites," Advanced Materials 2014, vol. 26, pp. 5930-5935.

Liu et al., "Wear of Materials", 2003, p. 1345.

Geek magazine—hacker daily blog "To Skolkovo created the Russia's first composite 3D-printer", Feb. 24, 2015, Retreived from the internet: <http://geek-mag.com/posts/246332/>.

This 3D printer could allow ISS components to be created in space—YouTube. Published on May 20, 2016. Retreived from the internet: <URL:<https://www.youtube.com/watch?v=YwrTfOjEFtw>.

"Sandwich-structured Composite", wikipedia.com, Dec. 29, 2009 version, accessed Apr. 18, 2018 at https://en.wikipedia.org/w/index.php?title=Sandwich-structured_composite&oldid=334666649 (Year: 2009).

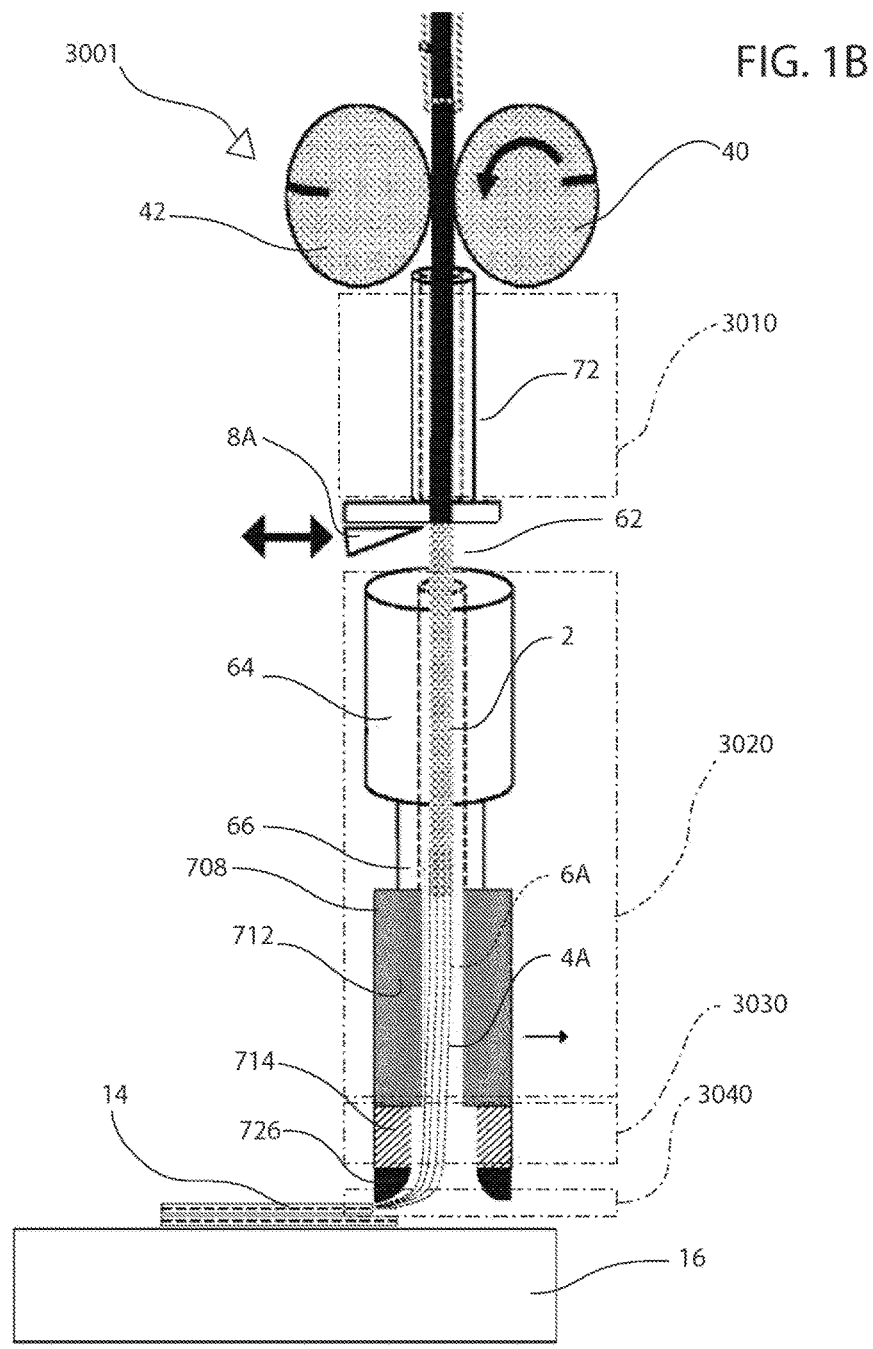

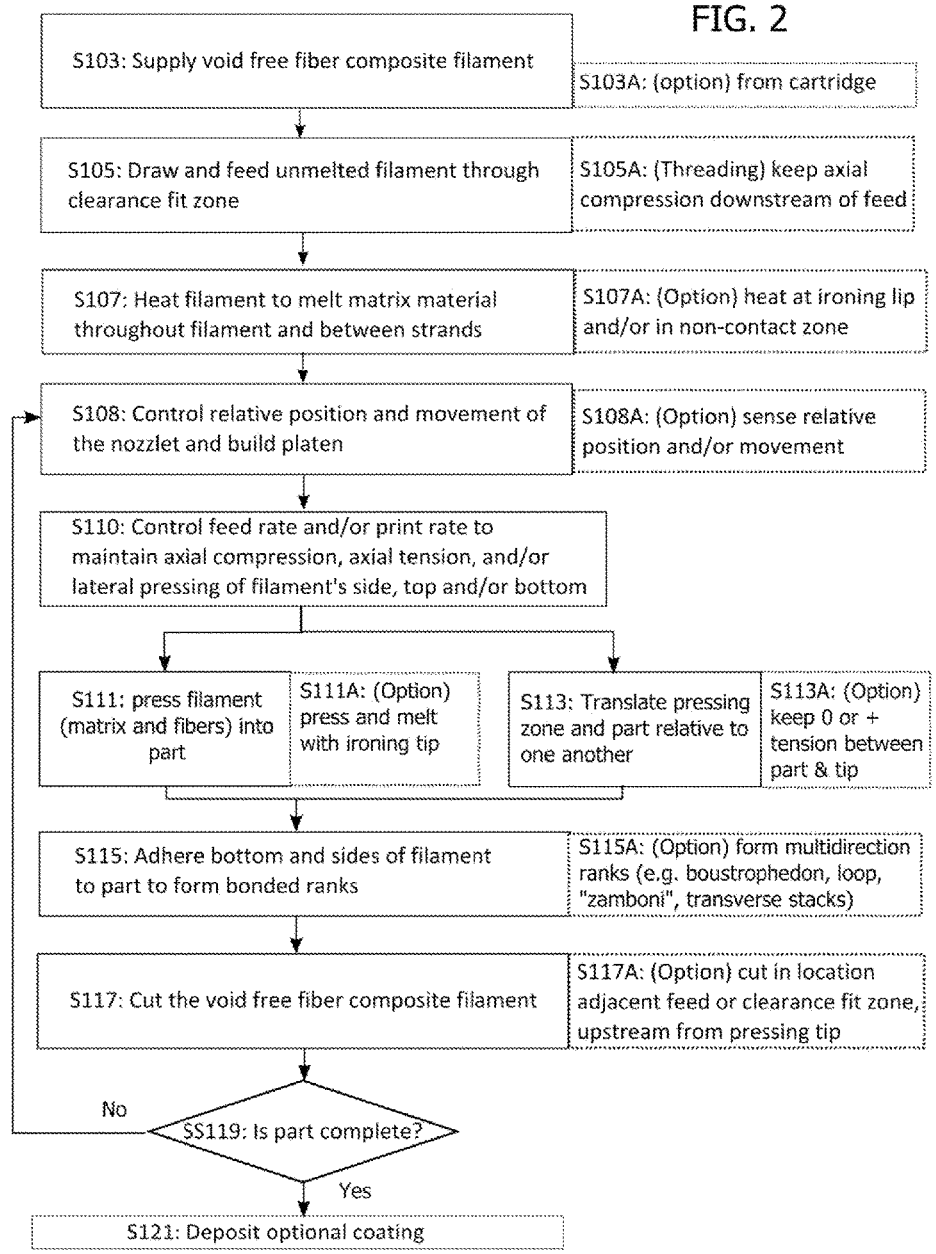

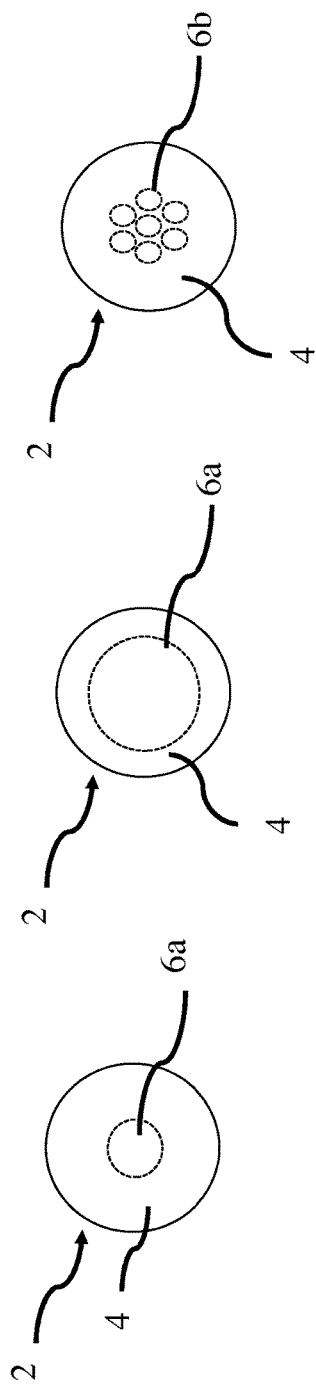
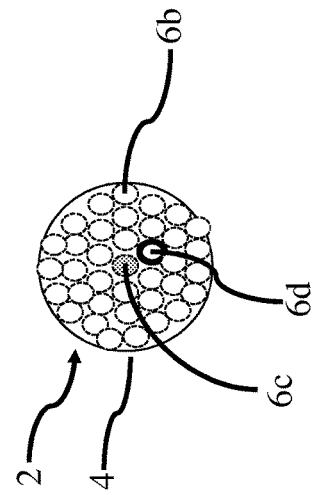
Fig. 3A  Fig. 3B  Fig. 3C  Fig. 3D  Fig. 4

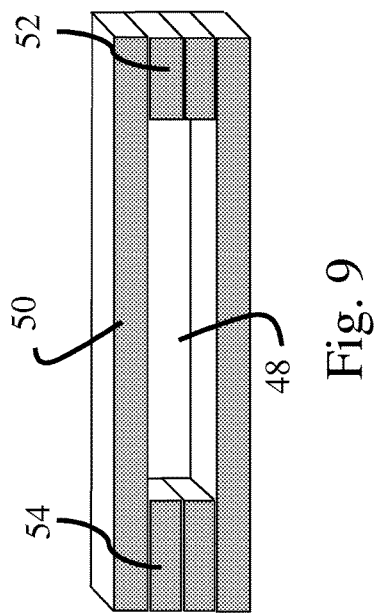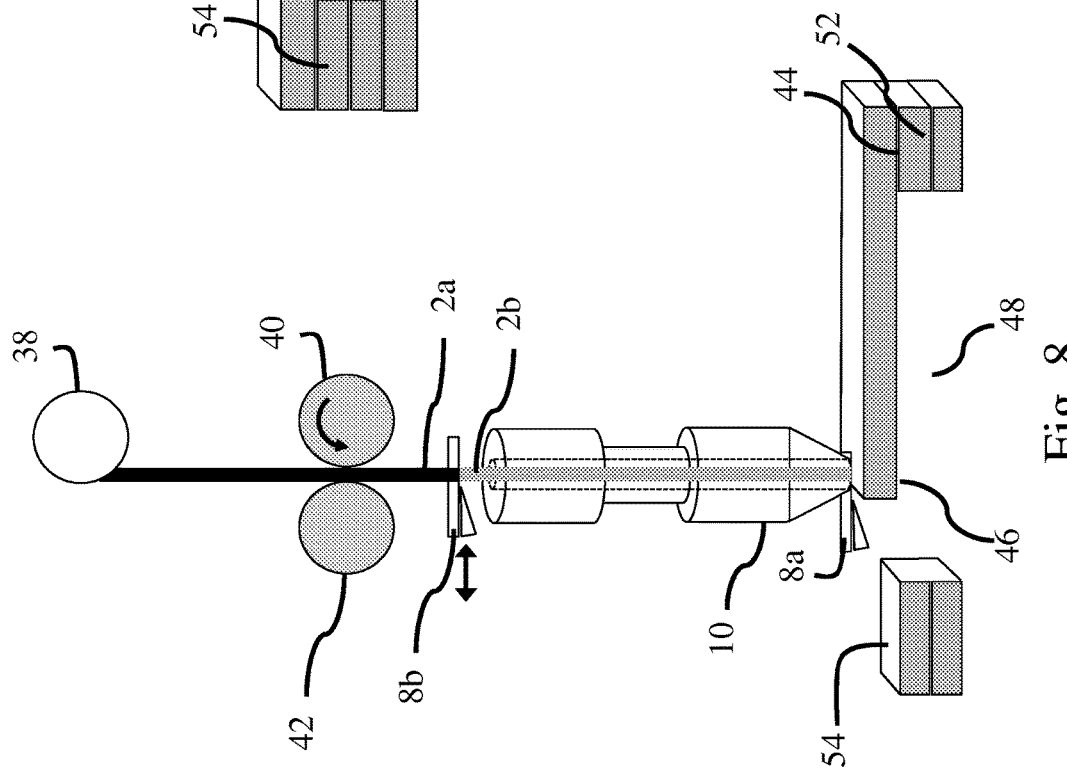

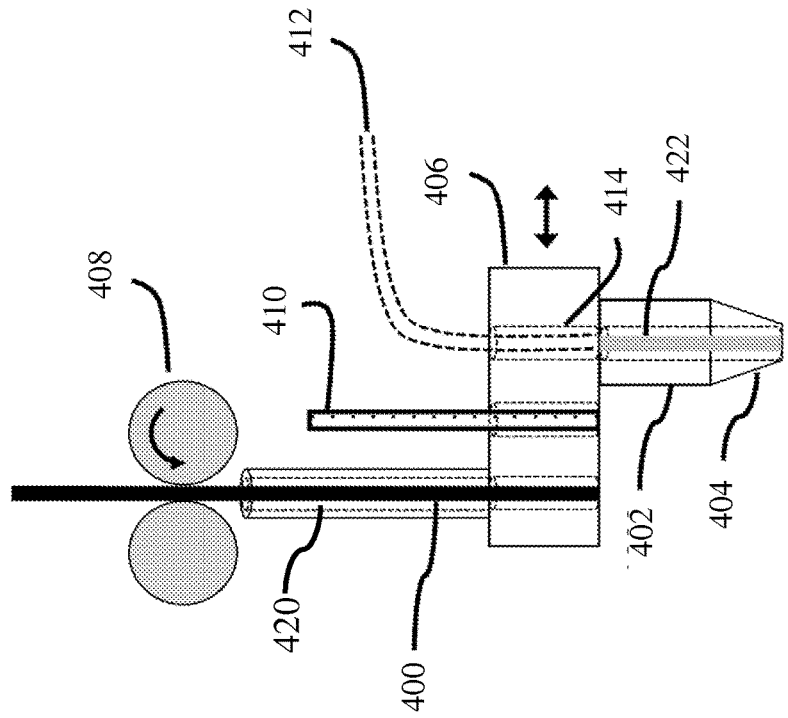
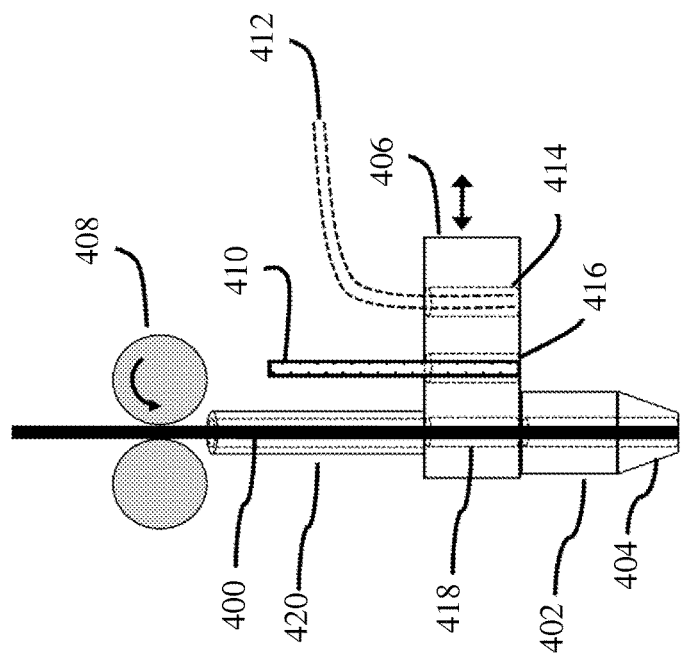

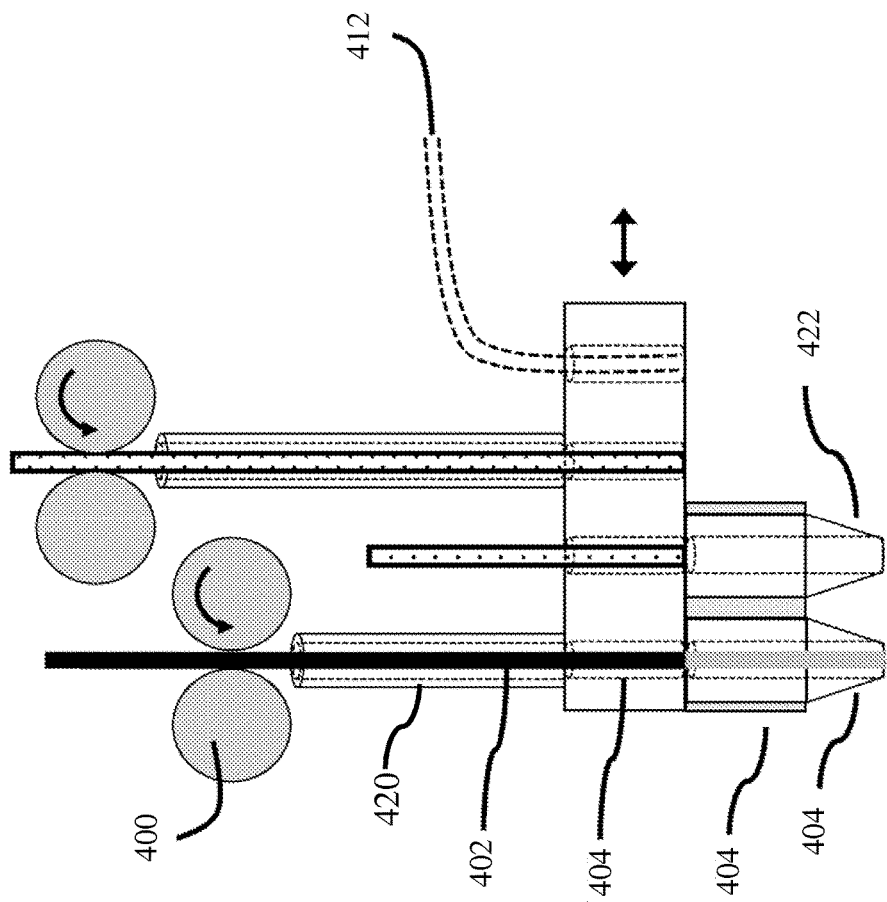

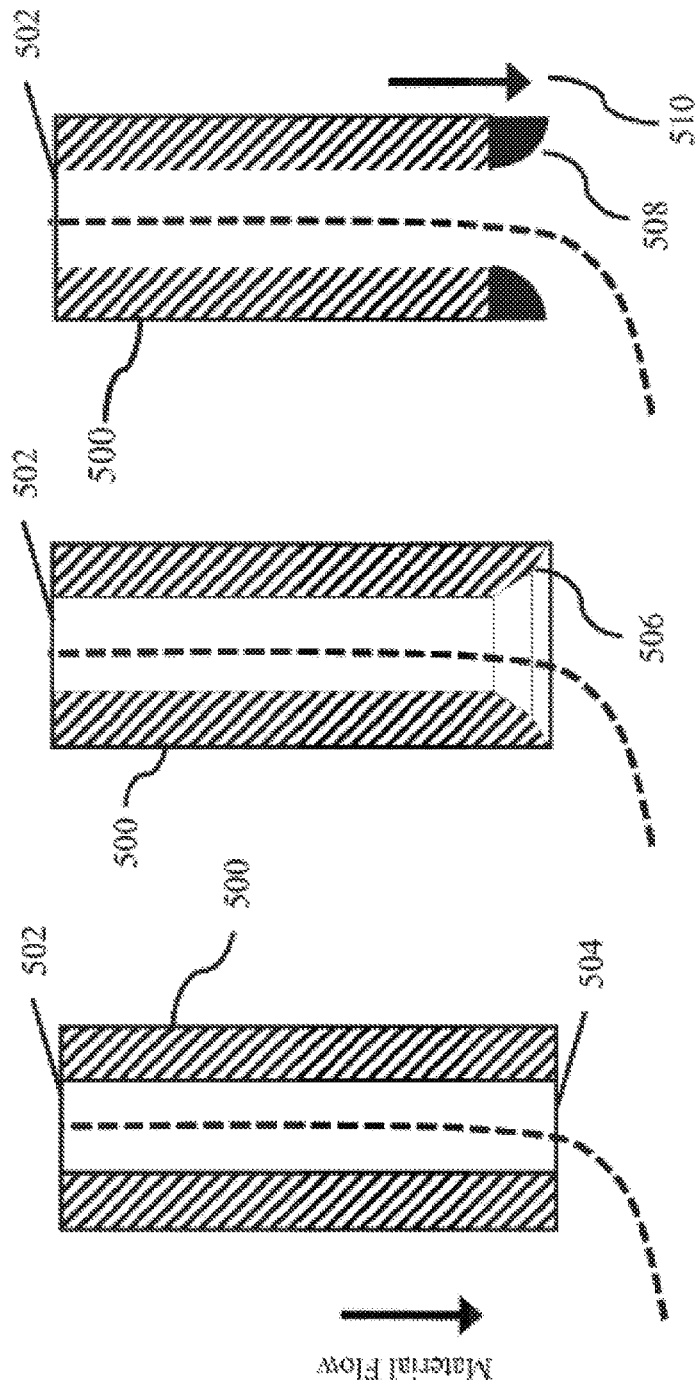

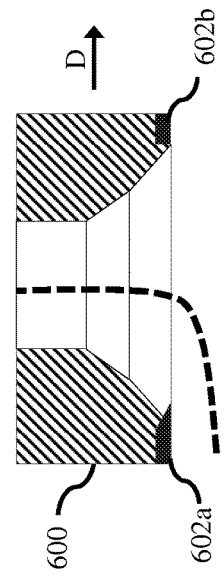
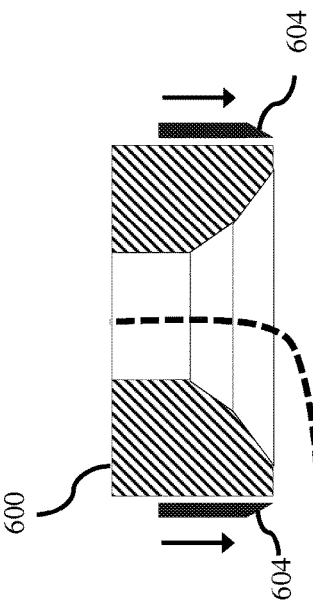
Fig. 15A
Fig. 15B
Fig. 16
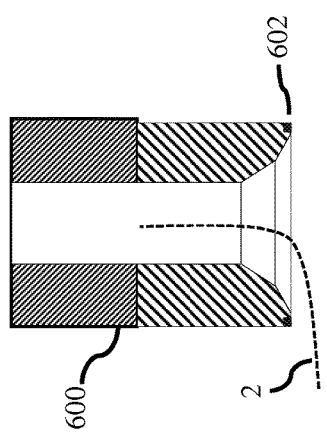
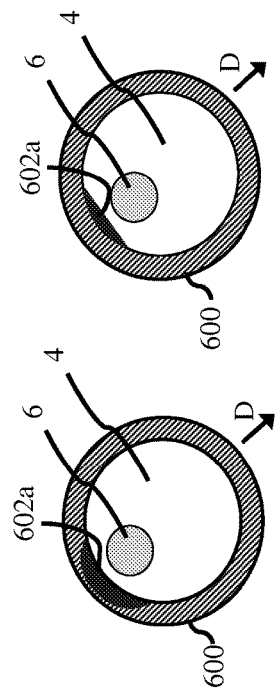
Fig. 15C
Fig. 15D

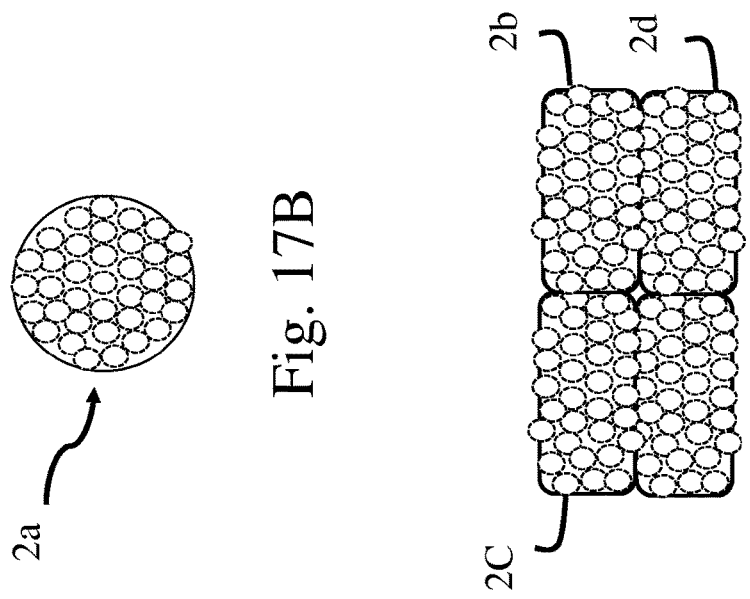
Fig. 17B
Fig. 17C
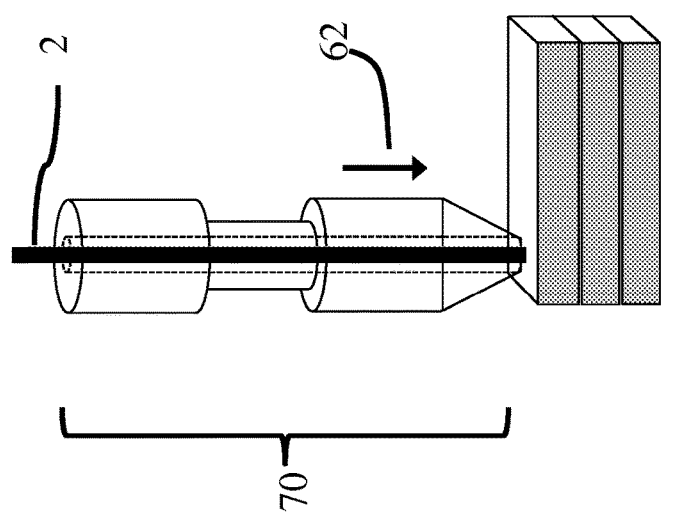
Fig. 17A

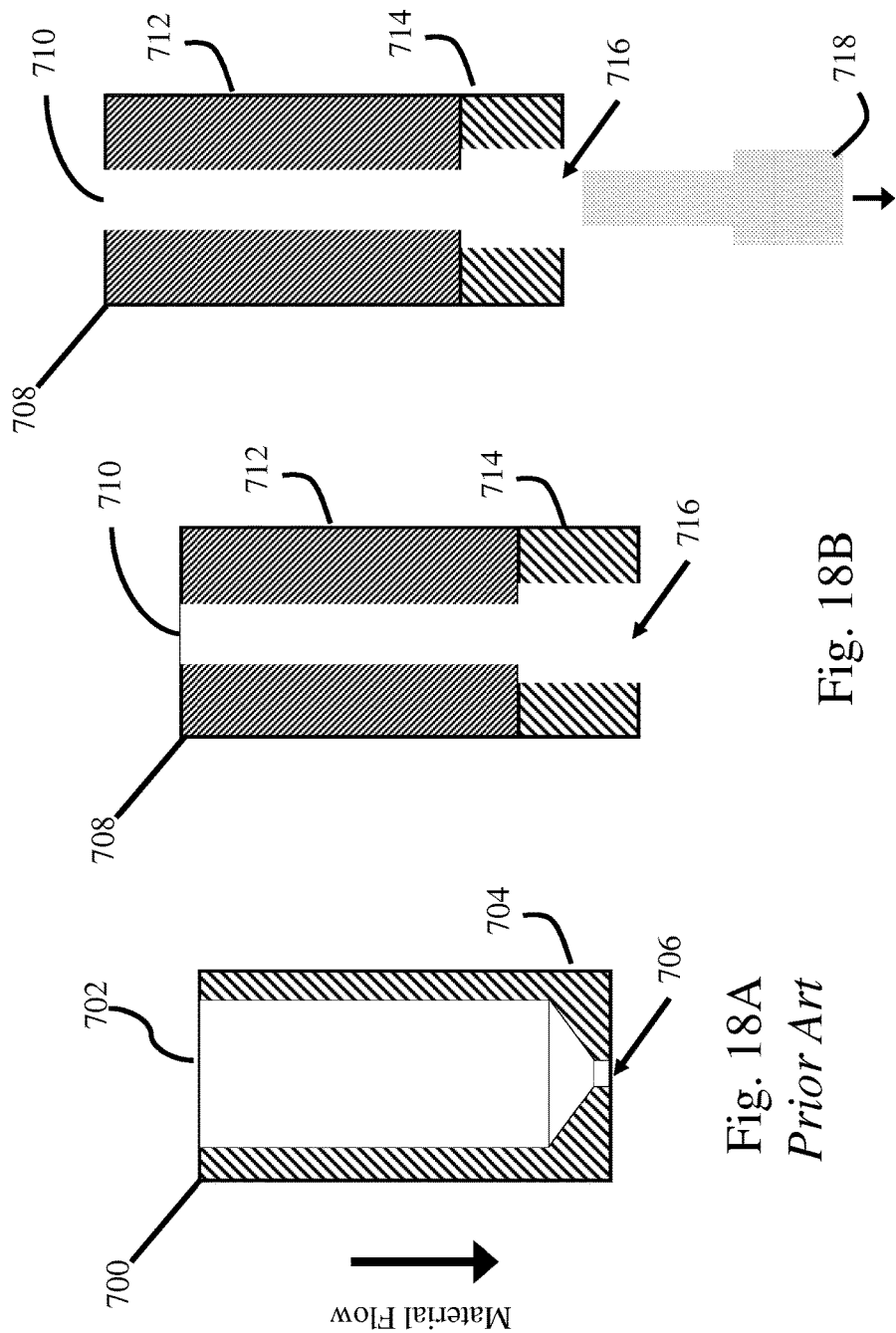

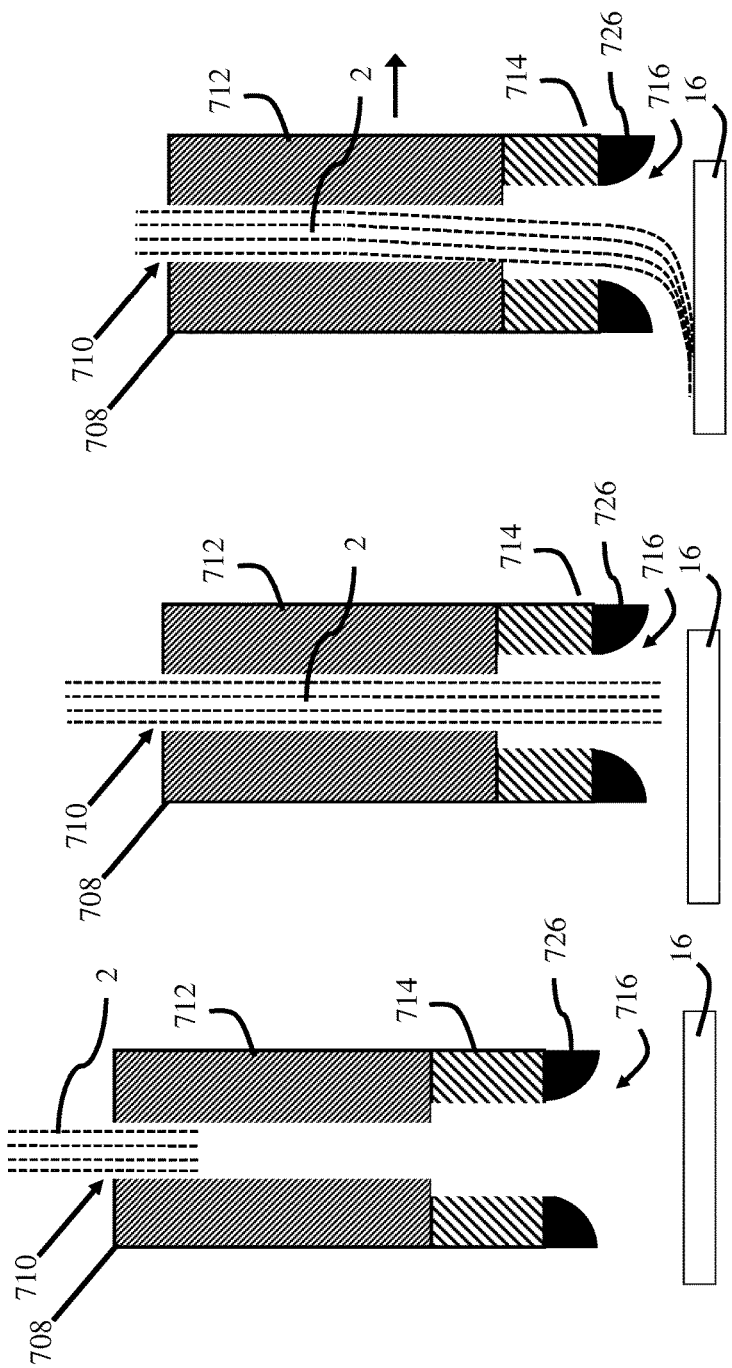

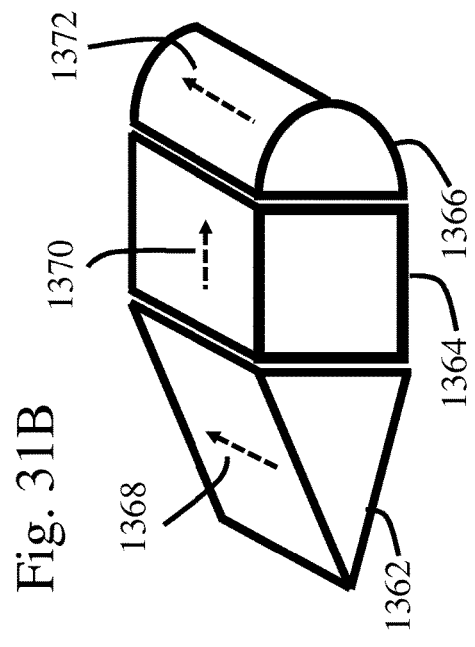
Fig. 31B
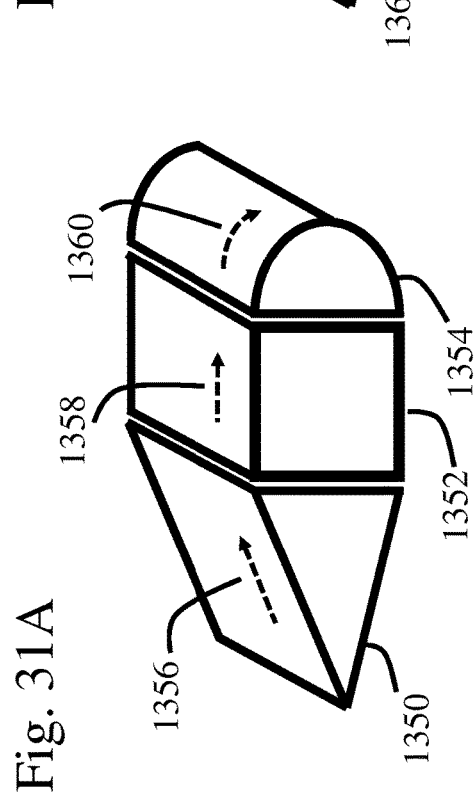
Fig. 31A
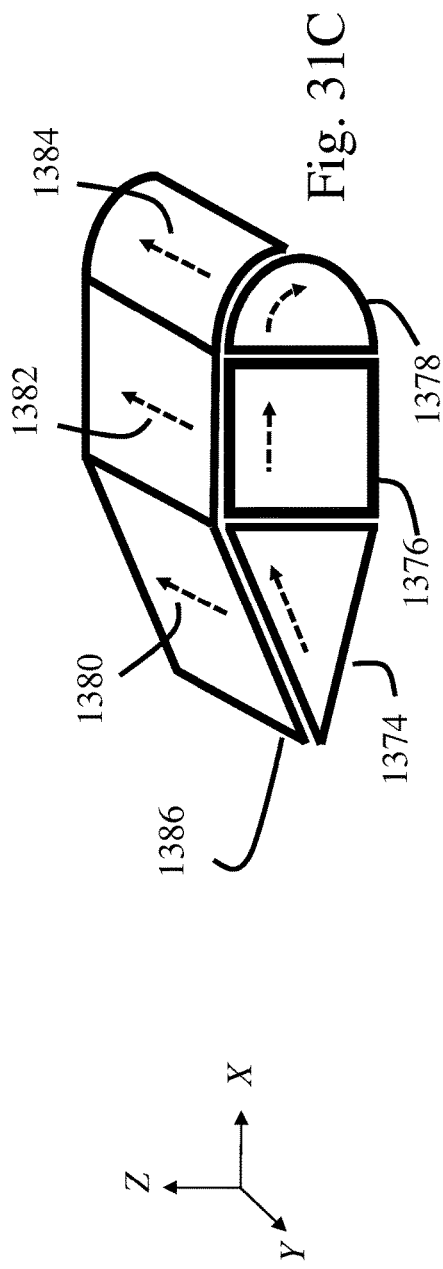
Fig. 31C
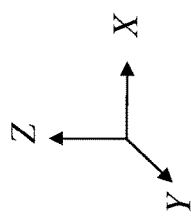

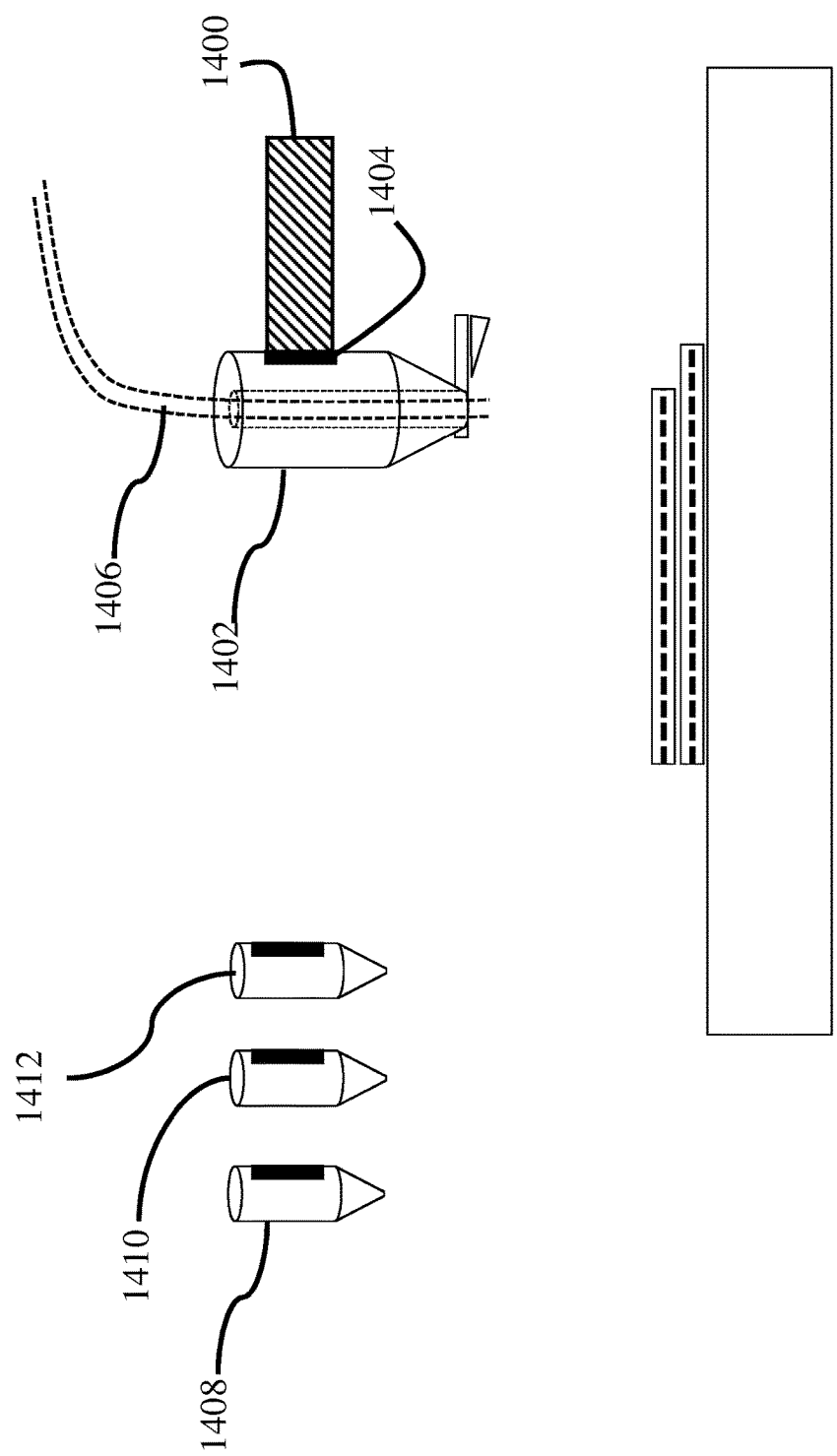

METHODS FOR FIBER REINFORCED ADDITIVE MANUFACTURING

CROSS-REFERENCE TO RELATED APPLICATIONS

This application is a continuation of U.S. patent application Ser. No. 14/297,437 [now Pat. No. 9,370,896], filed Jun. 5, 2014, the disclosure of which is herein incorporated by reference in its entirety. The Ser. No. 14/297,437 application is a continuation-in-part of U.S. patent application Ser. No. 14/222,318 [now Abandoned], filed Mar. 21, 2014, the disclosure of which is herein incorporated by reference in its entirety. The Ser. No. 14/222,318 application claims the benefit under 35 U.S.C. § 119(e) of U.S. provisional application Ser. No. 61/831,600 [Expired] filed Jun. 5, 2013, U.S. provisional application Ser. No. 61/815,531 [Expired] filed Apr. 24, 2013, U.S. provisional application Ser. No. 61/804,235 [Expired] filed Mar. 22, 2013, U.S. provisional application Ser. No. 61/878,029 [Expired] filed Sep. 15, 2013, U.S. provisional application Ser. No. 61/881,946 [Expired] filed Sep. 24, 2013, U.S. provisional application Ser. No. 61/847,113 [Expired] filed Jul. 17, 2013, U.S. provisional application Ser. No. 61/902,256 [Expired] filed Nov. 10, 2013, U.S. provisional application Ser. No. 61/880,129 [Expired] filed Sep. 19, 2013, U.S. provisional application Ser. No. 61/883,440 [Expired] filed Sep 27, 2013, and U.S. provisional application Ser. No. 61/907,431 [Expired] filed Nov. 22, 2013, the disclosures of which are herein incorporated by reference in their entirety. The Ser. No. 14/297,437 application also claims the benefit under 35 U.S.C. § 119(e) of U.S. provisional application Ser. No. 61/831,600 filed Jun. 5, 2013, U.S. provisional application Ser. No. 61/847,113 filed Jul. 17, 2013, U.S. provisional application Ser. No. 61/878,029 filed Sep. 15, 2013, U.S. provisional application Ser. No. 61/881,946 filed Sep. 24, 2013, and U.S. provisional application Ser. No. 61/902,256 filed Nov. 10, 2013, the disclosures of which are herein incorporated by reference in their entirety.

FIELD

Aspects relate to three dimensional printing.

BACKGROUND

"Three dimensional printing" as an art includes various methods such as Stereolithography (SLA) and Fused Filament Fabrication (FFF). SLA produces high-resolution parts, typically not durable or UV-stable, and is used for proof-of-concept work; while FFF extrudes through a nozzle successive filament beads of ABS or a similar polymer.

"Composite Lay-up" is not conventionally related to three dimensional printing. In this art, preimpregnated ("prepreg") composite sheets of fabric are impregnated with a resin binder into two-dimensional patterns. One or more of the individual sheets are then layered into a mold and heated to liquefy the binding resin and cure the final part.

"Composite Filament Winding" is also not conventionally related to three dimensional printing. In this art, sticky "tows" including multiple thousands of individual carbon strands are wound around a custom mandrel to form a rotationally symmetric part. Filament winding is typically limited to convex shapes due to the taut filaments "bridging" any concave shape.

There is no commercial or experimental three dimensional "printing" technique which provides the benefits of composite lay-up, or composite filament winding.

SUMMARY

According to a first version of the present invention, one combination of steps for additive manufacturing of a part includes supplying an unmelted void free fiber reinforced composite filament including one or more axial fiber strands extending within a matrix material of the filament, having no substantial air gaps within the matrix material. The unmelted composite filament is fed at a feed rate along a clearance fit zone that prevents buckling of the filament until the filament reaches a buckling section (i.e., at a terminal and of the nozzlet, opposing the part, optionally with a clearance between the nozzlet end and the part of a filament diameter or less) of the nozzlet. The filament is heated to a temperature greater than a melting temperature of the matrix material to melt the matrix material interstitially within the filament, in particular in a transverse pressure zone. A ironing force is applied to the melted matrix material and the one or more axial fiber strands of the fiber reinforced composite filament with an ironing lip as the fiber reinforced composite filament is deposited in bonded ranks to the part. In this case, the ironing lip is translated adjacent to the part at a printing rate that maintains a neutral to positive tension in the fiber reinforced composite filament between the ironing lip and the part, this neutral-to-positive (i.e., from no tension to some tension) tension being less than that necessary to separate a bonded rank from the part.

According to a second version of the present invention, another additional or alternative combination of steps for additive manufacturing of a part includes the above-mentioned supplying step, and feeding the fiber reinforced composite filament at a feed rate. The filament is similarly heated, in particular in a transverse pressure zone. The melted matrix material and the at least one axial fiber strand of the composite filament are threaded (e.g., through a heated print head, and in an unmelted state) to contact the part in a transverse pressure zone. This transverse pressure zone is translated relative to and adjacent to the part at a printing rate to bring an end of the filament (including the fiber and the matrix) to a melting position. The end of the filament may optionally buckle or bend to reach this position. At the melting position, the matrix material is melted interstitially within the filament.

According to a third version of the present invention, a three-dimensional printer for additive manufacturing of a part includes a fiber composite filament supply (e.g., a spool of filament, or a magazine of discrete filament segments) of unmelted void free fiber reinforced composite filament including one or more axial fiber strands extending within a matrix material of the filament, having no substantial air gaps within the matrix material. One or more linear feed mechanisms (e.g., a driven frictional rollers or conveyors, a feeding track, gravity, hydraulic or other pressure, etc., optionally with included slip clutch or one-way bearing to permit speed differential between material feed speed and printing speed) advances unmelted composite filament a feed rate, optionally along a clearance fit channel (e.g., a tube, a conduit, guide a channel within a solid part, conveyor rollers or balls) which guides the filament along a path or trajectory and/or prevents buckling of the filament. A print head may include (all optional and/or alternatives) elements of a heater and/or hot zone and/or hot cavity, one or more filament guides, a cold feed zone and/or cooler, and/or a reshaping lip, pressing tip, ironing tip, and/or ironing plate, and/or linear and/or rotational actuators to move the print head in any of X, Y, Z, directions and/or additionally in one to three rotational degrees of freedom. A build platen may include a build surface, and may include one or more linear actuators to move the build platen in any of X, Y, Z, directions and/or additionally in one to three rotational degrees of freedom. The heater (e.g., a radiant heater, an inductive heater, a hot air jet or fluid jet, a resistance heater, application of beamed or radiant electromagnetic radiation, optionally heating the ironing tip) heats the filament, and in particular the matrix material, to a temperature greater than a melting temperature of the matrix material (to melt the matrix material around a single fiber, or in the case of multiple strands, interstitially among the strands within the filament). The linear actuators and/or rotational actuators of the print head and/or build platen may each solely and/or in cooperation define a printing rate, which is the velocity at which a bonded rank is formed. A controller optionally monitors the temperature of the heater, of the filament, and/or and energy consumed by the heater via sensors.

In this third version of the invention and optionally other versions of the invention, the feed mechanism, clearance fit channel, linear or rotational actuators of the build platen and/or the linear and rotational actuators, guides, hot cavity, and/or reshaping or ironing lip or tip of the print head may optionally cooperate (any combination or permutation thereof or all) as a transverse pressure zone that presses and/or melts filaments onto the build platen or into the part being printed. Optionally, the linear and rotational actuators of the print head and/or build platen, and/or one or more linear feed mechanisms may be controlled by a controller monitoring force, displacement, and/or velocity sensors to apply a compressive force along the axial strands (e.g., tangentially to a feed roller diameter) of the filament and/or apply a reaction force from the build platen or part being printed to press melted matrix filaments against the build platen or against or into previous layers of the part to form bonded ranks (i.e., substantially rectangular ranks adhered to substantially flat surfaces below and to one side thereof). Fully optionally in addition or the alternative, the linear and rotational actuators of the print head and/or build platen, and/or one or more linear feed mechanisms may be controlled by a controller monitoring force, displacement, and/or velocity sensors to apply a transverse, sideways, downwards, ironing and/or ironing force (optionally using a surface of or adjacent the print head, which may be a reshaping and/or ironing lip, tip, or plate) to the side of the melted matrix filament to press and/or iron the melted matrix filaments against the build platen or against or into previous layers of the part to form bonded ranks. Fully optionally in addition or the alternative, the linear and rotational actuators of the print head and/or build platen, and/or one or more linear feed mechanisms may be controlled by a controller monitoring force, displacement, and/or velocity sensors to apply a neutral to positive tension force through the strand and unmelted matrix of the filament and/or between the build platen, previously deposited bonded ranks and the print head or feeding mechanism(s) (optionally using a surface of or adjacent the print head, which may be a reshaping and/or ironing lip, tip, or plate, and further optionally using interior surfaces of the print head or guides, and/or feeding mechanism clutches, slips, motor drive, idling, motor internal resistance, and/or small resistance currents) adjacent to the part at a printing rate that maintains neutral to positive tension in the fiber reinforced composite filament between the reshaping lip and the part. This tension force is optionally a neutral to positive tension force less than that necessary to separate a bonded rank from the part for sustained formation of bonded ranks, and further optionally and/or in the alternative, may be sufficient to separate or sever a filament with a discontinuous internal fiber connected by melted matrix to the print head.

In this third version of the invention and optionally the first and second and other versions of the invention, the linear and rotational actuators of the print head and/or build platen, and/or one or more linear feed mechanisms may be controlled by a controller monitoring force, displacement, and/or velocity sensors to apply a transverse, sideways, downwards, reshaping and/or ironing force (optionally using a surface of or adjacent the print head, which may be a reshaping and/or ironing lip, tip, or plate) to generate a different balance of forces within the printer, filament, and part in different printing phases (e.g., threading phases versus printing phases). For example, in one version of the invention, the linear and rotational actuators of the print head and/or build platen, and/or one or more linear feed mechanisms may be controlled by a controller monitoring force, displacement, and/or velocity sensors to apply a transverse, sideways, downwards, reshaping and/or ironing force (optionally using a surface of or adjacent the print head, which may be a reshaping and/or ironing lip, tip, or plate) may apply bonded ranks primarily via lateral pressing and axial tension in a continuous printing phase of applying bonded ranks, and primarily via lateral pressing and axial compression in a threading or initialization phase.

None of the abovementioned steps or structures in the first through third versions or other versions are critical to the invention, and the invention can be expressed as different combinations of these. In particular, pressing a fiber reinforced filament into a part may optionally be temporarily performed during threading or initialization by axial compression along the fiber composite (unmelted fiber strand(s), partially melted and partially glass matrix), and/or by "ironing" and/or reshaping in the transverse pressure zone (e.g., print head tip) and/or by the reshaping lip and/or by a companion "ironing" plate following the printhead. Each approach and structure is effective in itself, and in the invention is considered in permutations and combinations thereof. Further, the pressing may be done in combination with compression or tension maintained in the filament via the unmelted fiber strands. Pressing or ironing may be done in the presence of tension upstream and downstream of the transverse pressure zone (e.g., print head tip) and/or the ironing lip and/or companion "ironing" plate, but also or alternatively in the presence of tension downstream of the pressing and also upstream of the transverse pressure zone (e.g., print head tip) and/or ironing lip and/or by companion "ironing" plate.

In each of these first through third versions, as well as other versions of the invention, optionally the matrix material comprises a thermoplastic resin having an unmelted elastic modulus of approximately 0.1 through 5 GPa and/or unmelted ultimate tensile strength of approximately 10 through 100 MPa, and a melted elastic modulus of less than 0.1 GPa and melted ultimate tensile strength of less than 10 MPa, and the one or more axial fiber strands have an elastic modulus of approximately 5-1000 GPa and an ultimate tensile strength of approximately 200-100000 MPa. These versions may optionally maintain a substantially constant cross sectional area of the fiber reinforced composite filament in clearance fit zone, the non-contact zone, the transverse pressure zone, and as a bonded rank is attached to the workpiece. In each of these first through third versions, optionally the filament has a cross sectional area greater than 1×10E−5 inches and less than 2×10E−3 inches. Further optionally, the at least one axial strand includes, in any cross-sectional area, between 100 and 6000 overlapping axial strands or parallel continuous axial strands. Such matrix materials include acrylonitrile butadiene styrene, epoxy, vinyl, nylon, polyetherimide, polyether ether ketone, polyactic acid, or liquid crystal polymer, and such axial strand materials include carbon fibers, aramid fibers, or fiberglass.

In each of these first through third versions, as well as other versions of the invention, at least one of the feed rate and the printing rate are optionally controlled to maintain compression in the fiber reinforced composite filament within the clearance fit zone. Additionally or in the alternative for these and other versions, optionally in a threading or initialization phase, the filament is heated in an non-contact zone immediately upstream of the ironing, and the feed and printing rates controlled to induce axial compression along the filament within the non-contact zone primarily via axial compressive force within the one or more axial fiber strands extending along the filament. Additionally or in the alternative for these and other versions, optionally in a threading or initialization phase, at least one of the feed rate and the printing rate are controlled to compress the fiber reinforced composite filament and translate an end of the filament abutting the part laterally underneath an ironing lip to be ironed by application of heat and pressure. Additionally or in the alternative for these and other versions, the filament is heated and/or melted by the ironing lip, and one or both of the feed rate and the printing rate are controlled to maintain neutral to positive tension in the fiber reinforced composite filament between the ironing lip and the part primarily via tensile force within the at least one axial fiber strand extending along the filament.

In each of these first through third versions, as well as other versions of the invention, the unmelted fiber reinforced filament is optionally cut by a cutter at or adjacent the clearance fit zone; and/or cut by a cutter core at or adjacent one or both of the clearance fit zone or the ironing lip. Additionally or in the alternative for these and other versions, the clearance fit zone includes at least one channel forming a clearance fit about the fiber reinforced composite filament, and the fiber reinforced composite is maintained at a temperature below a glass transition temperature of the matrix material throughout the at least one channel. Supplying is optionally via a cartridge to decouple the speed of manufacturing or forming the reinforced fiber material (e.g., combining the fiber with the matrix) from the speed of printing.

In each of these first through third versions, as well as other versions of the invention, height of the ironing lip from the current printing layer surface (e.g., bonded rank layer below, either FFF or fiber composite, or platen) is optionally controlled to be less than the diameter of the filament (e.g., the height of each bonded rank is less than the diameter of the filament). Pressing or ironing the filament in a transverse pressure zone may include applying a ironing force to the filament with as the filament is deposited in bonded ranks. Additionally or in the alternative for these and other versions, the method includes preventing the filament from touching a heated wall of a cavity defining the non-contact zone; and/or includes touching the filament to a heated ironing lip in the transverse pressure zone to melt matrix material of the filament.

In each of these first through third versions, as well as other versions of the invention, the method optionally further includes, as the melted matrix material and the axial fiber strand(s) are pressed into the part in the transverse pressure zone to form laterally and vertically bonded ranks, flattening the bonded ranks on at least two sides by applying a first ironing force to the melted matrix material and the at least one axial fiber strand with the ironing lip, and applying a opposing reshaping force to the melted matrix material and the at least one axial fiber strand as a normal reaction force from the part itself.

In each of these first through third versions, as well as other versions of the invention, the method may further include drawing the fiber reinforced composite filament in the transverse pressure zone from a connection to a first portion of the part, translating the transverse pressure zone through free space; and ironing to reconnect the fiber reinforced composite filament to a second portion of the part.

In each of these first through third versions, as well as other versions of the invention, the method may include forming a solid shell with the filament; and/or the ironing lip may be rounded. Additionally or in the alternative for these and other versions, the ironing lip may be at the tip of a nozzlet or printing guide with a cross-sectional area of the nozzlet outlet larger than a cross-sectional area of the nozzlet or printing guide inlet. Additionally or in the alternative for these and other versions, the cross sectional area within the walls of a heating cavity or non-contact zone is larger than a cross-sectional area of the clearance fit zone.

In each of these first through third versions, as well as other versions of the invention, the method may include depositing bonded ranks in a first direction in a first portion of a part and in a second direction in a second portion of the part. Additionally or in the alternative for these and other versions, the method may include pulling the filament out of a nozzlet or printing guide when a dragging force applied to the filament is greater than a force threshold of an associated feeding mechanism.

In each of these first through third versions, as well as other versions of the invention, the one or more fiber cores may be constructed as a train of separate segments extending in an axial direction of the filament. In this case, the segments may be located at pre-indexed locations along the axial direction of the filament; and/or at least some of the segments may overlap along the axial direction of the filament. Additionally or in the alternative for these and other versions, the average length of the segments may be less than or equal to a length of the heated or non-contact zone.

In each of these first through third versions, as well as other versions of the invention, the push-pultrusion process of depositing a first filament into a layer of matrix material in a first desired pattern may be followed by or performed in parallel with curing a matrix layer (e.g., stereolithography or selective laser sintering) to form a layer of a part including the deposited first filament. Additionally or in the alternative for these and other versions, this alternative may optionally include cutting the first filament and depositing a second filament in a second desired pattern in the layer of matrix material.

One aspect of the present invention prints structures using a substantially void-free preimpregnated (prepreg) material that remains void-free throughout the printing process. One form of this material is a reinforced filament including a core with multiple continuous strands preimpregnated with a thermoplastic resin that has already been "wicked" into the strands, and applied using one of the push-pultrusion approaches of the present invention to form a three dimensional structure. A composite formed of thermoplastic (or uncured thermoset) resin having wetted or wicked strands, may not be "green" and is also rigid, low-friction, and substantially void free. Another form may employ a single, solid continuous core. Still another form may use a sectioned continuous core, i.e., a continuous core sectioned into a plurality of portions along the length is also contemplated. Still another form may employ a solid core or multiple individual strands that are either evenly spaced from one another or include overlaps. "Void free" as used herein with respect to a printing material may mean, at an upper limit, a void percentage between 1% than 5%, and at a lower limit 0%, and with respect to a printed part, at an upper limit, a void percentage between 1 and 13%, and at a lower limit 0%. Optionally, the push-pultrusion process may be performed under a vacuum to further reduce or eliminate voids.

A fiber or core "reinforced" material is described herein. The fiber or core may either be positioned within an interior of the filament or the core material may extend to an exterior surface of the filament, or for multistrand implementations, both. The term including "reinforced" may optionally extend to strands, fibers, or cores which do not provide exceptional reinforcing structural strength to the composite, such as optical fibers or fluid conducting materials, as well as conductive materials. Additionally, it should be understood that a core reinforced material also includes functional reinforcements provided by materials such as optical fibers, fluid conducting channels or tubes, electrically conductive wires or strands.

The present invention contemplates that optionally, the entire process of push-pultrusion, including the use of different compatible materials herein, many be a precursor or a parallel process other modes of additive manufacturing, in particular stereolithography (SLA), selective laser sintering (SLS), or otherwise using a matrix in liquid or powder form. Push-pultrusion may embed within or about parts made by these mode substantially void free parts, enabling the entire part to exhibit enhanced strength.

If the push-pultrusion process is used to lay down bonded ranks with a dominant direction or directions, these directions may optionally exhibit anisotropic strength both locally and overall. Directionality or anisotropy of reinforcement within a structure can optionally provide enhanced part strength in desired locations and directions to meet specific design requirements or enable lighter and/or stronger parts.

Optionally in any above-described invention, a cutter may provide selective deposit of a desired length of composite filament and/or bonded rank. The cutter is optionally located between a feeding mechanism for the core material and the outlet of a nozzlet. An additional or alternative cutter may be placed at the nozzlet's outlet. Alternatively or in addition, and optionally in any above-described invention, the substantially void free material may be fed through a shaping nozzlet to provide a desired shape, especially flattening. The nozzlet may include an ironing lip that includes a shape for forming top or side surfaces of bonded ranks, in particular a curved lip or chamfer, a straight lip or chamfer, or a square or rectangle reshaping surface.

Optionally in any above-described invention, the matrix material may be acrylonitrile butadiene styrene (ABS), epoxy, vinyl, nylon, polyetherimide (PEI), Polyether ether ketone (PEEK), Polyactic Acid (PLA), or Liquid Crystal Polymer. The core or strands of the core may reinforce structurally, conductively (electrically and/or thermally), insulatively (electrically and/or thermally), optically and/or in a manner to provide fluidic transport. The core or strands of the core may include, in particular for structural reinforcing, carbon fiber, aramid or high strength nylon fiber, fiberglass. Further, multiple types of continuous cores or strands may be combined in a single continuous core reinforced filament to provide multiple functionalities such as both electrical and optical properties.

Optionally in any above-described invention or versions of the invention, fiber reinforced composite filaments with different resin to fiber ratios may provide different properties within different sections of the part, e.g., printed with different printheads at different stages. Similarly optionally, a "low-resin" fiber reinforced composite filament skeletal filler may be used for the internal construction to maximize the strength-to-weight ratio (e.g., 30% resin/70% fiber by cross sectional area). "Low-resin" means a resin percentage in cross sectional area from 30% to 50%. Similarly optionally a "High-resin" fiber reinforced composite filament shell coating (e.g., 90% resin/10% fiber by cross sectional area) may be used to prevent the possible print through of an underlying core or individual fiber strand of the core. Additionally, in some embodiments and versions of the invention, the consumable material may have zero fiber content, and be exclusively resin and/or printed with conventional FFF.

Optionally in any above-described invention or versions of the invention, the unmelted composite filament is fed at a feed rate along a clearance fit zone that prevents buckling of the filament until said filament reaches the buckling section of the nozzlet (outlet).

All of the listed options apply individually, and in any operable permutation or combination to each of the first, second, third, and other versions of the invention, including that acts or steps are implemented with apparatus structures disclosed herein as would be understood by one of skill in the art, and apparatus structures perform acts or steps as disclosed herein as would be understood by one of skill in the art. In all cases throughout the invention, the term "may" denotes an optional addition or alternative material, structure, act, or invention to the invention.

BRIEF DESCRIPTION OF DRAWINGS

FIGS. 1A and 1B are schematic representations of a three dimensional printing system using a continuous core reinforced filament;

FIG. 2 is a representative flow chart of a three dimensional printing process;

FIGS. 3A-3D are schematic representations of various embodiments of core configurations of a continuous core reinforced filament 2;

FIG. 4 is a schematic representation of a core configuration of a continuous core reinforced filament with secondary functional strands.

FIG. 8 is a schematic representation of a three dimensional printing system including a cutter and a printing process bridging an open space;

FIG. 9 is a schematic representation of a part formed by the three-dimensional printing system and/or process that includes an enclosed open space;

FIGS. 12A and 12B are is a schematic representations of a shear cutting head in respective first and second indexing positions;

FIG. 13 is a schematic representation of a multi-nozzlet print head including shear cutting;

FIGS. 14A-14C are a schematic representations of nozzles and rounded outlet nozzles respectively;

FIG. 15A is a schematic cross-sectional view of a cutter integrated with a nozzlet tip;

FIG. 15B is a schematic cross-sectional view of the cutter integrated with a nozzlet tip depicted in FIG. 14A rotated 90°;

FIG. 15C-15D are bottom views an embodiment of a cutter integrated with a nozzlet tip;

FIG. 16 is a schematic cross-sectional view of a cutter integrated with a nozzlet tip;

FIG. 17A is a schematic representation of a three-dimensional printing system applying a compaction pressure during part formation;

FIG. 17B is a schematic representation of a continuous core reinforced filament to be utilized with the printing system prior to deposition;

FIG. 17C is a schematic representation of the continuous core reinforced filament and surrounding beads of materials after deposition using compaction pressure;

FIG. 18A is a schematic representation of a prior art nozzle;

FIG. 18B is a schematic representation of a divergent nozzle;

FIG. 18C is a schematic representation of the divergent nozzlet of FIG. 18B shown in a feed forward cleaning cycle;

FIGS. 19C-19E are schematic representations of a continuous core filament being threaded and printed with a divergent nozzle;

FIG. 31A is a schematic representation of an airfoil formed with discrete subsections including fiber orientations in the same direction;

FIG. 31B is a schematic representation of an airfoil formed with discrete subsections including fiber orientations in different directions;

FIG. 31C is a schematic representation of an airfoil formed with discrete subsections and a shell formed thereon;

FIG. 32 is a schematic representation of a three dimensional printing system including a print arm and selectable printer heads;

DETAILED DESCRIPTION

Figure 1A:
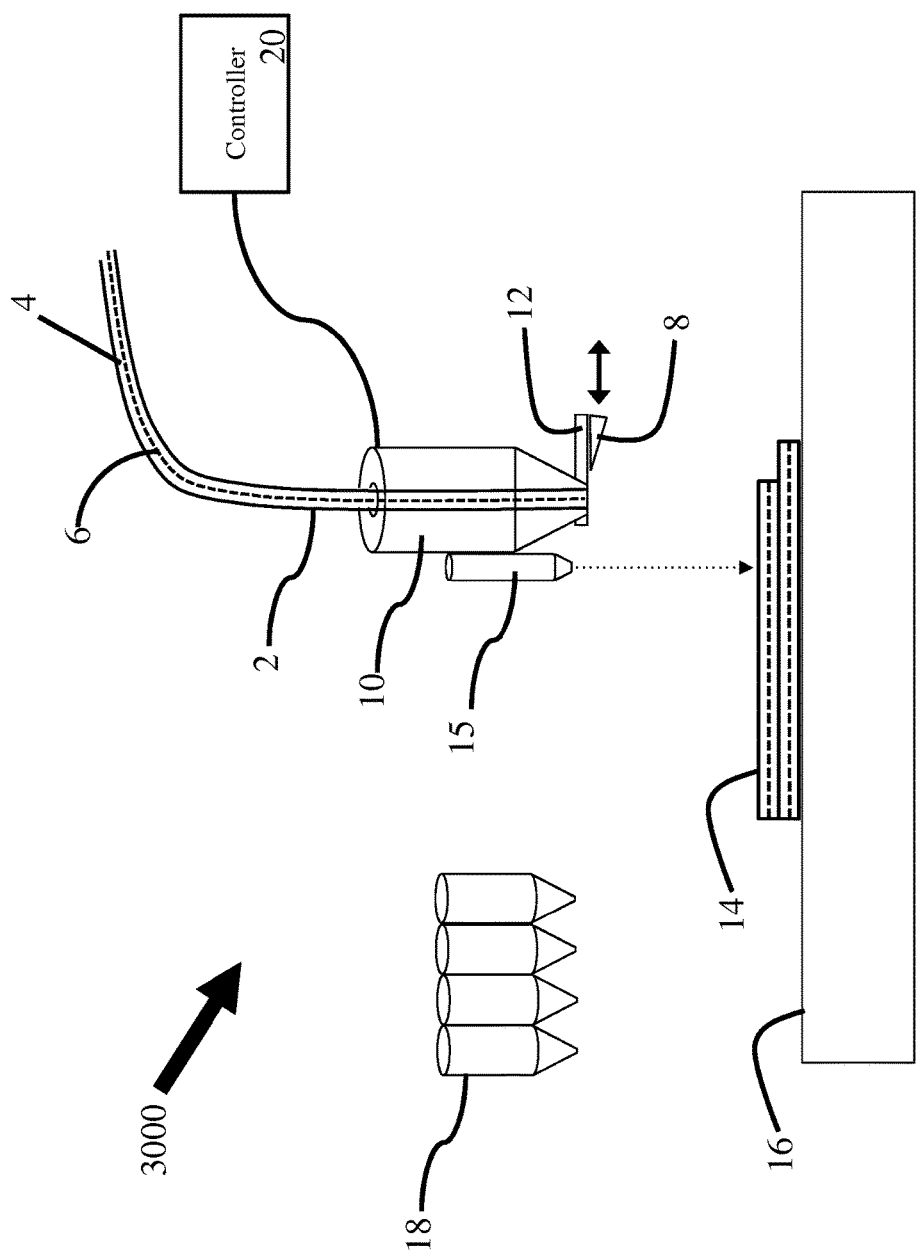

In both of the relatively recent arts of additive manufacturing and composite lay-up, coined words have become common. For example, a "prepreg" is a pre-impregnated composite material in which a resin matrix and a fiber assembly are prepared ahead of time as a composite raw material. A "towpreg" is "prepreg" formed from a combination of a "tow" (a bundle of hundreds to thousands of fiber strands at very high fiber percentage, e.g., 95%) and a sticky (at room temperature) resin, conventionally being dominated by the fibers of the impregnated tow (e.g., 75% fiber strands), with the sticky resin being impregnated as a means of transferring shear between fiber strands roughly adjacent in a filament winding process and sticking the towpreg to the rotated member. "Pultrusion" is one of the processes of making a towpreg, where a tow is pulled through a resin to form—in a process conducted entirely in tension—elongated and typically hardened composites including the tow embedded in the resin.

As used herein, "extrusion" shall have its conventional meaning, e.g., a process in which a stock material is pressed through a die to take on a specific shape of a lower cross-sectional area than the stock material. Fused Filament Fabrication (FFF) is an extrusion process. Similarly, "nozzle" shall have its conventional meaning, e.g., a device designed to control the direction or characteristics of a fluid flow, especially to increase velocity and/or restrict cross-sectional area, as the fluid flow exits (or enters) an enclosed chamber.

In contrast, the present invention shall use the coined word "push-pultrusion" to describe the overall novel process according to the invention, in which unlike extrusion, forward motion of the fiber reinforced composite printing material includes a starting, threading, or initialization phase of compression followed by tension of embedded fiber strands, as well as melted/cured and unmelted/uncured states of the matrix throughout the printhead as the printing material forms bonded ranks on a build table, and successively within a part. The present invention shall also use the coined word "nozzlet" to describe a terminal printing head according to the invention, in which unlike a FFF nozzle, there is no significant back pressure, or additional velocity created in the printing material, and the cross sectional area of the printing material, including the matrix and the embedded fiber(s), remains substantially similar throughout the process (even as deposited in bonded ranks to the part).

The present invention shall also use the coined word "push-pulpreg" to describe a material useful in push-pultrusion, which—in contrast to a conventional towpreg—the resin is preferably a thermoplastic that (i) provides sufficient friction and exposed resin material to be fed by rollers or other friction feed (ii) is sufficiently stiff (i.e., normal unmelted elastic modulus) to be pushed through a clearance fit tube or channel without buckling in an unmelted, "glass" state, the stiffness provided by the embedded fiber strands and to a lesser extent the unmelted matrix resin (iii) and/or has no appreciable "tack"/molecular diffusion in ambient conditions, i.e., is in a "glass" state in ambient or even warmed conditions so that it can be readily pushed through such a tube without sticking.

Consolidation is typically advantageous to remove voids that result from the inability of the resin to fully displace air from the fiber bundle, tow, or roving during the processes that have been used to impregnate the fibers with resin. The individually impregnated roving yarns, tows, plies, or layers of prepregs are usually consolidated by heat and pressure by compacting in an autoclave. The consolidation step has generally required the application of very high pressures and high temperatures under vacuum for relatively long times. Furthermore, the consolidation process step using an autoclave or oven requires a "bagging" operation to provide the lay-up with a sealed membrane over the tool to allow a vacuum to be applied for removal of air and to provide the pressure differential necessary to effect consolidation in the autoclave. This process step further reduces the total productivity of the composite part operation. Thus, for a thermoplastic composite it would be advantageous to in-situ consolidate to a low void composite while laminating the tape to the substrate with the ATL/AFP machine. This process is typically referred to as in-situ ATL/AFP and the material used in that process called an in-situ grade tape.

Lastly, in the three-dimensional printing art, "filament" typically refers to the entire cross-sectional area of a spooled build material, while in the composites art, "filament" refers to individual fibers of, for example, carbon fiber (in which, for example, a "1K tow" will have 1000 individual strands). For the purposes of the present invention, "filament" shall retain the meaning from three-dimensional printing, and "strand" shall mean individual fibers that are, for example, embedded in a matrix, together forming an entire composite "filament".

Additive manufacturing methods often result in reduced the strength and durability versus conventional molding methods. For example, Fused Filament Fabrication results in a part exhibiting a lower strength than a comparable injection molded part, due to weaker bonding between the adjoining strips (e.g., "bonded ranks") of deposited material (as well as air pockets and voids.

Prepreg sheet composite construction method are time consuming and difficult, and thereby expensive. Further, bending prepreg sheets around curves may cause the fibers to overlap, buckle, and/or distort resulting in undesirable soft spots.

Feeding a commercial fiber "Towpreg" through a plastic bath to add matrix resin, then further feeding through a custom print head does not result in a viable additive process, due to the extremely flexible and high-friction (sticky) construction. Moreover, this process binds the speed of manufacturing this composite to the speed of printing it (even were printing viable). Towpreg typically requires, and is sold with appropriate "tack" (a level of room-temperature adhesion sufficient to maintain the position of the tow after it has been deposited on a tool or lay-up). Further, towpreg "green" materials tend to entrap air and include air voids, which are only removed by high tension and/or a subsequent vacuum and/or heating steps. These steps also slow down the printing process.

Accordingly, there is a need for composite additive manufacturing that is faster than lay-up or winding; that reduces or prevents entrapped air in the bonded ranks, avoiding most vacuum or heating post-processes; that provides an ability to deposit composite material in concave shapes, and/or construct discrete features on a surface or composite shell.

Turning now to the figures, specific embodiments of the disclosed materials and three dimensional printing processes are described.

FIG. 1A depicts an embodiment of a three dimensional printer 3000 in before applying a fiber reinforced composite filament 2 to build a structure. The fiber reinforced composite filament 2 (also referred to herein as continuous core reinforced filament) may be a push-pulpreg that is substantially void free and includes a polymer or resin 4 that coats or impregnates an internal continuous single core or multistrand core 6.

The fiber reinforced composite filament 2 is fed through a nozzlet 10 heated (e.g., by a band heater or coil heater) to a controlled push-pultrusion temperature selected for the matrix material to maintain a predetermined viscosity, and/or a predetermined amount force of adhesion of bonded ranks, and/or a surface finish. The push-pultrusion may be greater than the melting temperature of the polymer 4, less than a decomposition temperature of the polymer 4 and less than either the melting or decomposition temperature of the core 6.

After being heated in the nozzlet 10 and having the matrix material or polymer 4 substantially melted, the continuous core reinforced filament 2 is applied onto a build platen 16 to build successive layers 14 to form a three dimensional structure. One or both of (i) the position and orientation of the build platen 16 or (ii) the position and orientation of the nozzlet 10 are controlled by a controller 20 to deposit the continuous core reinforced filament 2 in the desired location and direction. Position and orientation control mechanisms include gantry systems, robotic arms, and/or H frames, any of these equipped with position and/or displacement sensors to the controller 10 to monitor the relative position or velocity of nozzlet 10 relative to the build platen 16 and/or the layers 14 of the part being constructed. The controller 20 may use sensed X, Y, and/or Z positions and/or displacement or velocity vectors to control subsequent movements of the nozzlet 10 or platen 16. For example, the three dimensional printer 1000 may include a rangefinder 15 to measure distance to the platen 16, a displacement transducers in any of three translation and/or three rotation axes, distance integrators, and/or accelerometers detecting a position or movement of the nozzlet 10 to the build platen 16. As depicted in FIG. 1A, a (e.g., laser) range sensor 15 may scan the section ahead of the nozzlet 10 in order to correct the Z height of the nozzlet 10, or the fill volume required, to match a desired deposition profile. This measurement may also be used to fill in voids detected in the part. The range finder 15 may measure the part after the filament is applied to confirm the depth and position of the deposited bonded ranks.

The three dimensional printer 1000 may include a cutter 8 controlled by the controller 20 that cuts the continuous core reinforced filament (e.g., without the formation of tails) during the deposition process in order to (i) form separate features and components on the structure as well as (ii) control the directionality or anisotropy of the deposited material and/or bonded ranks in multiple sections and layers. As depicted the cutter 8 is a cutting blade associated with a backing plate 12 located at the nozzlet outlet. Other cutters include laser, high-pressure air or fluid, or shears.

FIG. 1A also depicts at least one secondary print head 18 optionally employed with the three dimensional printer 1000 to print, e.g., protective coatings on the part including 100% resin FFF extrusion, a UV resistant or a scratch resistant coating.

FIG. 1B depicts an embodiment of a three dimensional printer 3001 in applying a fiber reinforced composite filament 2 to build a structure. Like numbered features are similar to those described with respect to FIG. 1A.

As depicted in FIG. 1B, upstream of a driven roller 42 and an idle roller 40, a spool (not shown) supplies under mild tension an unmelted void free fiber reinforced composite filament. The filament including at least one axial fiber strand extending within a matrix material of the filament, having no substantial air gaps within the matrix material. In this example, the fiber reinforced composite filament 2 is a push-pulpreg including a nylon matrix 4A that impregnates hundreds or thousands of continuous carbon fiber strands 6A.

A "zone" as discussed herein is a segment of the entire trajectory of the filament from the spool (not shown) to the part. The driven roller 42 and an idle roller 40 feed or push the unmelted filament at a feed rate (which is optionally variably controllable by the controller 20, not shown, and optionally is less than the printing rate, with any differential between these rates absorbed along the filament by a slip clutch or one-way bearing), along a clearance fit zone 3010, 3020 that prevents buckling of filament. Within a non-contact cavity or non-contact zone 714, the matrix material of the composite filament may be heated. The fibers 6A within may be under axial compression at the threading stage or beginning of the printing process, as the feeding or pushing force of the rollers 42, 40 transmits through the unmelted matrix to the fibers along the clearance fit zone 3010, 3020.

"Threading" is a method of pushing a pushpreg or push-pulpreg through an outlet wherein the stiffness of the pushpreg or push-pulpreg is sufficiently greater than the sticking/drag force (to prevent buckling or flaring/jamming of the pushpreg or push-pulpreg) over the time scale of the stitching operation. Initially, in a threading stage, the melted matrix material 6A and the axial fiber strands 4A of the filament 2 are pressed into the part with axial compression, and as the build platen and print head are translated with respect to one another, the end of the filament contacts the ironing lip 726 and is subsequently continually ironed in a transverse pressure zone 3040 to form bonded ranks in the part 14. Transverse pressure means pressure to the side of the filament, and is also discussed herein as "ironing". As shown by the arrow, this transverse pressure zone 3040 (along with attached parts of the print head) may be translated adjacent to the part 14 at a printing rate (or the printing rate may be a result of translation of both or either one of the platen 16 and print head).

The matrix material is, in this example, with respect to tensile and compressive elastic modulus, a thermoplastic resin having an unmelted elastic modulus of approximately 0.1 through 5 GPa and a melted elastic modulus of less than 0.1 GPa, and the fiber strands are of a stranded material having an elastic modulus of approximately 5-1000 GPa. In this manner, the strands of fiber are sufficiently resistant to deformation to enable the entire filament to be "pushed" through limited friction in small clearance channels, and even through free space when the matrix is melted. With respect to tensile ultimate strength, the matrix material is preferably a thermoplastic resin having an unmelted ultimate tensile strength of approximately 10 through 100 MPa and a melted ultimate tensile strength of less than 10 MPa, and the at least one axial strand includes a stranded material having an ultimate tensile strength of approximately 200-100000 MPa. In this manner, the internal strands of fiber are sufficiently resistant to stretching or snapping to enable the entire filament to be maintained in neutral to positive (i.e., from zero tension and higher amounts of tension) tension over significant distances extending through free space from the bonded ranks, in some cases before the matrix fully solidifies. Most filaments will have a cross sectional area greater than $1 \times 10^{-5}$ ($1 \times 10E-5$) inches and less than $2 \times 10^{-3}$ $2 \times 10E-3$ inches. In the case of multi-strand fibers, the filament may include, in any cross-section area, between 100 and 6000 overlapping axial strands or parallel continuous axial strands (particularly in the case of carbon fiber strands).

Either or both of the printing head or nozzlet 708 or the build platform 16 may be translated, e.g., the feed rate and/or the printing rate are controlled to maintain compression in the filament in the threading stage, and to maintain neutral to positive tension in the printing operation. The matrix material 4A of the filament 2 may be heated and melted in the non-contact zone 3030 (in particular, so that there is less opportunity to stick to the walls of the nozzlet 708), but is melted or liquefied at the ironing lip or tip 726. The larger or diverging diameter of the non-contact zone optionally prevents the filament from touching a heated wall 714 of the cavity defining the non-contact zone. The feed and printing rates may be monitored or controlled to maintain compression, neutral tension, or positive tension within the unsupported zone as well as primarily via axial compressive or tensile force within fiber strand(s) extending along the filament.

As shown in FIG. 1B, the transverse pressure zone 3040 includes an ironing lip 726 that reshapes the filament 2. This ironing lip 726 may be a member that compacts or presses the filament 2 into the part to become bonded ranks. The ironing lip 726 may also receive heat conducted from the heated walls 714 or other heat source, in order to melt or liquefy the matrix material 4A of the filament 2 in the transverse pressure zone 3040. Optionally, the ironing lip 726 in the transverse pressure zone 3040 flattens the melted filament 2 on the top side, applying an ironing force to the melted matrix material and the axial fiber strands as the filament 2 is deposited in bonded ranks. This may be facilitated by ensuring that the height of the bottom of the ironing lip 726 to the top of the layer below is less than the diameter of the filament. Another reshaping force is applied spaced opposite of the ironing lip 726 to the melted matrix material and the axial fiber strands as a normal reaction force from the part itself. This flattens the bonded ranks on at least two sides as the melted matrix material 4A and the axial fiber strands 6A are pressed into the part 14 in the transverse pressure zone 3040 to form laterally and vertically bonded ranks (i.e., the ironing also forces the bonded ranks into adjacent ranks).

Accordingly, the ironing lip 726 and the normal reaction force from the part itself oppose one another and sandwich or press the melted composite filament therebetween to form the bonded ranks in the part 14. The pressure and heat applied by ironing improves diffusion and fiber penetration into neighboring ranks.

As shown in FIG. 1B, in this example, unmelted fiber reinforced filament is cut at or adjacent the clearance fit zone 3010, 3020. It may be cut, as shown in FIG. 1A, in a gap 62 between a guide tube 72 (having a clearance fit) and the nozzlet 708, or may be cut within the nozzlet 708, e.g., upstream of the non-contact zone 3030. Alternatively or in addition, the core reinforced filament may be cut by a cutter 8 positioned at or adjacent either one of the clearance fit zone 3010, 3020 or the ironing lip 725. The clearance fit zone 3010, 3020 includes an optionally interrupted channel forming a clearance fit about the fiber reinforced composite filament 2, and this is preferably one of a running fit or a clearance location fit, in any even sufficient clearance to permit the filament to be pushed along, even in axial compression, without sticking and without buckling.

The pushing/feeding along the axial direction, and ironing within the transverse pressure zone 3040 are not necessarily the only forces forming the bonded rows. Alternatively, or in addition, the transverse pressure zone 3040 and/or ironing lip 726 are translated respective to the part 14 at a printing rate that maintains neutral to positive tension in the fiber reinforced composite filament 2 between the ironing lip 726 and the bonded ranks of the part 14, this tension being less than that necessary to separate a bonded rank from the part 14.

For example, after the matrix material 6A is melted by the ironing lip or tip 726, the feed and/or printing rate can be controlled by the controller 20 to maintain neutral to positive tension in the composite filament 2 between the ironing lip 726 and the part 14 primarily via tensile force within the fiber strands 4A extending along the filament 2. This is especially the case at the end of bonded ranks and in making a turn to begin a new adjacent rank in the opposite direction, as pressure from the ironing lip into the part 14 may be released. This can also be used to form bridges through open space, e.g. by drawing the fiber reinforced composite filament 2 in the transverse pressure zone 3040 from a connection to a first portion of the part 14; then translating the transverse pressure zone 3040 through free space; then ironing to reconnect the fiber reinforced composite filament 2 to a second portion of the part 14.

Unlike a true extrusion process, the cross sectional area of the filament 2 is substantially maintained the entire time, and none of the strands, the matrix, nor the filament 2 lengthens nor shortens appreciably. The feed rate of the spooled push-pulpreg and the formation rate (the printing rate) of the bonded ranks are substantially the same (although for portions of the conveyance or feeding, slip clutches or one-way bearings may permit slack, build-up or differential). At times, the feed rate and the compression rate may be temporarily and differentially controlled to balance sufficient neutral to positive axial tension downstream of the ironing lip 726, or a slip clutch may be used to allow one of feed rate or printing rate to slip. However, a substantially constant cross sectional area of the fiber reinforced composite filament is maintained in the clearance fit zone, the unsupported zone, the transverse pressure zone, and also as a bonded rank is attached to the workpiece or part 14.

FIG. 2 presents a schematic flow diagram of a three dimensional printing process using the system and controller depicted in FIG. 1A or 1B. In FIG. 2, optional steps of the invention that individually or in any combination may modify some versions of the invention disclosed in FIG. 2 are denoted with dotted lines and an "A" suffix, although none of the steps shown are individually critical or in the particular order shown, except as inherently necessary. Initially a continuous core or multistrand fiber reinforced filament 2 is supplied (e.g., from a spool, as a push-pulpreg) at step S103. As shown in step S103A, supplying in cartridge form can be important, as it permits complete independence between processes of manufacturing the push-pulpreg and printing. That is, either manufacturing of push-pulpreg or printing could be a limiting speed factor, and by using prepared cartridges or rolls of interchangeable filament, each is made independent. In step S105, the filament 2 is drawn from the supply or spool (e.g., by rollers) and fed in an unmelted, relatively stiff state through a clearance fit, or a succession of clearance fits, that may prevent buckling of the filament as it is pushed and fed. Optionally, as shown in step S105A, during the threading or stitching process, the filament is fed in a manner that keeps axial compression in the filament 2 downstream of the feed (noting that this may change into axial neutral or positive tension in optional step S113A after the lateral pressing step S111) into the heated nozzlet 708.

In step S107, the filament (and thereby the matrix material) is heated to a desired temperature that is greater than a melting temperature of the resin and is less than a melting temperature of the continuous core or strands at step S107. This completion of this step may be out of order with respect to that shown in FIG. 2, i.e., the heating of the ironing tip 726 or other heating zone may be initiated at step S107, but the actual melting may take place only in step S11A. Moreover the heating zone may be the final zones along the path, i.e., the ironing tip or non-contact zone, as shown in optional step S107A. This step melts the matrix material throughout and permits the shape of the filament to change, e.g., from a circular cross section or an oval cross section to a square or rectangular cross section as it is packed/pressed into the part, while nonetheless keeping a substantially similar or identical cross sectional area. As noted in optional step S107A, this heating may take place in or at an ironing tip 726 at the tip of the nozzlet. Further, within a non-contact the zone 714 or 3030, the walls of the nozzlet 708 are sufficiently distant from the filament 2 such that even heating into a plastic, glass transition or tacky form will not adhere the filament to the walls. At step S108, the controller 20 of the three dimensional printer 1000, 3001 controls, (optionally in step S108A using the sensors described herein), position, speed, or acceleration of the nozzlet 708 relative to the build platen 16 or part, and may also monitor distances therebetween and temperature properties at each zone or within each zone.

In step S110, while controlling the position and movement of the heated nozzlet 708, the controller 20 controls the feed rate, print rate, cutter 8 and/or temperatures to maintain an axial compression in the close fitting zone 3010 or 3020 (upstream and downstream of a cutter 8) and the heating and/or non-contact zone 714, 3030 in the threading phase, or, in the printing phase; and/or controls pressing, compressing, or flattening pressure or force within zone 3040; and/or in the printing phase controls axial neutral to positive tension within the filament between the bonded ranks within the part 14 and the lateral or transverse pressure zone 3040 and/or ironing lip 208, 508, and/or 726.

In step S111, under the control of the controller 120, the filament (matrix and fibers) 2 is pressed into the part 14. Optionally, as shown in step S111A, this is performed with an ironing lip or tip 208, 508, and/or 726, which may be smooth but also may be more like a doctor blade (for abrasion resistant fibers such as aramid). Simultaneously, the pressing zone 3040 and/or built platen or platform 16 are translated (optionally in 3 axes, and further optionally rotated in 3 rotational axes) with respect to one another at step S113. Optionally as shown by optional step S113A, in this step S113, neutral or positive tension is maintained and/or increased in the filament between the tip 208, 508, and/or 726 and the part 14.

In step S115, the ironing (pressing and heating) and relative translating (or relative printing motion for multi-axis implementations) adheres the bottom and sides of melted matrix within the filament 2 to form bonded ranks in the part 14. As discussed herein and as shown in step S115A, these ranks may optionally be tight boustrophedon ranks, may be circular, oval, or oblate loops (e.g., racetrack shapes for long parts), may proceed with small turns in a "Zamboni" pattern, and in any of these patterns or other patterns may be successively laid up such that one layer is parallel with or overlapping the layer below, or is transverse to (perpendicular or angled) to the layer below.

In step S117, after reaching the desired termination point, the continuous core reinforced filament may be cut. As discussed in steps S117 and S117A, "cut" includes cutting at a position within the compression zone 3010, 3020, in particular upstream of the nozzlet 8, and in particular of the filament in an unmelted, glass state of the matrix material. "Cut" may also include cutting at a position in downstream or adjacent of the nozzlet 708. In addition, "cut" may include, for embodiments in which the continuous strands are formed in discrete, separated segments within the filament, pulling the nozzlet 708 and build platen 16 away from one another to separate the matrix material at a location where one segment of continuous fiber is adjacent the next. The controller 20 may then determine if the three dimensional part is completed. If the printing process is not completed the controller may return to step S108 during which it senses the current position and movement of the nozzlet prior to depositing the next piece of continuous core reinforced filament. If the part is completed, the final part may be removed from the build platen. Alternatively, an optional coating may be deposited on the part using a secondary print head at S121 to provide a protective coating and/or apply a figure or image to the final part.

FIGS. 3A-3D are schematic representations of a different possible filaments useful with the invention, although these are not necessarily to scale. FIGS. 3A and 3B depict cross-sections having a solid continuous core 6a (e.g., a fiberglass fiber) and surrounding thermoplastic polymer 4 or resin, respectively greater than 70% resin by cross-sectional area and less than 30% resin (each by cross-sectional area). FIGS. 3C and 3D depict cross-sections having multi-strand fibers surrounded by and wicked/wetted by thermoplastic resin, respectively greater than 60% resin and all fibers being ¼ diameter or more from the perimeter; and less than 30% resin with fibers distributed throughout the filament and protruding from the perimeter. FIG. 4 depicts a cross-section similar to FIG. 3D but including one or more separate secondary functional strands 6c and 6d (with electrical, optical, thermal or fluidic conducting properties to conduct power, signals, heat, and/or fluids as well as for structural health monitoring and other desired functionalities). For carbon fiber, resin amounts for printing in push-pulpreg manner are from 30-90% (i.e., 10-70% fiber by cross sectional area).

According to one version of the present invention, the polymer material is pre-impregnated as a push-pulpreg such that the molten polymer or resin wicks into the reinforcing fibers during the initial production of the material, optionally into the entire cross-section of a multifilament. Optionally per this aspect of the invention, strands of fiber may be pre-treated with a coating(s) or agents, such as a plasticizer, energy application by radiation, temperature, pressure, or ultrasonic application to aid the polymer or resin wicking into the cross section of the multifilament core without voids. The heating temperature of the printing process in zone 3030 may be at a lower temperature and/or higher viscosity of melted material than the temperature or energy necessary to accomplish wetting, wicking, tacking, or interstitial penetration at lower viscosity to fill voids. Preparing the push-pulpreg as a void-free prepreg permits filament width and other properties (e.g., stiffness, smoothness) to be predetermined, reducing the need for complicated measurement and variable control for different filaments (of the same type, or of different types).

According to one version of the present invention, a vacuum is provided within the heated section 714 of nozzlet 708 to remove air (including voids) while the matrix material is melted. This construction may be used even with filaments which may have air voids within (e.g., "green material") including a solid or multifilament core while under vacuum. In the alternative to or in addition to the vacuum removal of voids the present invention, the filament may be forced through a circuitous path, which may be provided by offset rollers or other configurations, to mechanically work out entrapped air.

Figure 5:
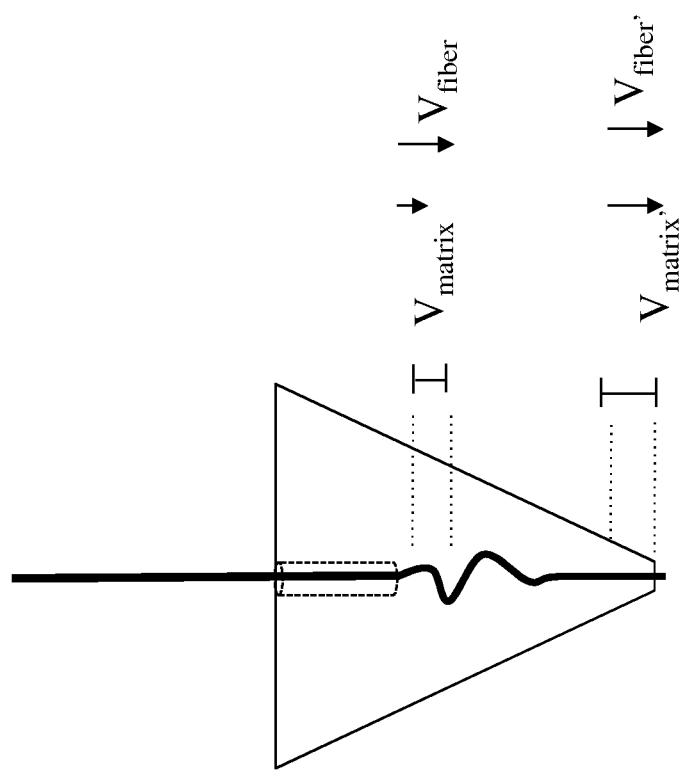
FIG. 5 is a schematic representation of fiber bunching within a hypothetical converging nozzle.

FIG. 5 depicts a hypothetical and theoretical problem, unknown in the prior art, in which the present inventor contemplated whether a known convergent nozzle could be used with towpreg or other embedded fiber composite filament. The matrix material as a polymer has a larger coefficient of thermal expansion (even in the case of a polymer fiber such as aramid). As the matrix material is heated it is believed it would accelerates relative to the fiber due to the larger expansion of the matrix material within the confined space of the converging nozzle. The matrix material flow rate Vmatrix is less than the fiber material flow rate Vfiber near the nozzle inlet, yet the matrix material flow rate at the outlet Vmatrix' is equal to the fiber material flow rate Vfiber. As illustrated in the FIG. 5, the mismatched velocities of the matrix material and fiber within the converging nozzle may result in the fiber collecting within the nozzle during the deposition process, leading to at least clogging and poor uniformity in deposition. While the present inventor does not believe the converging nozzle is the optimal solution, nonetheless it is within the scope of the present embodiments.

Figure 6:
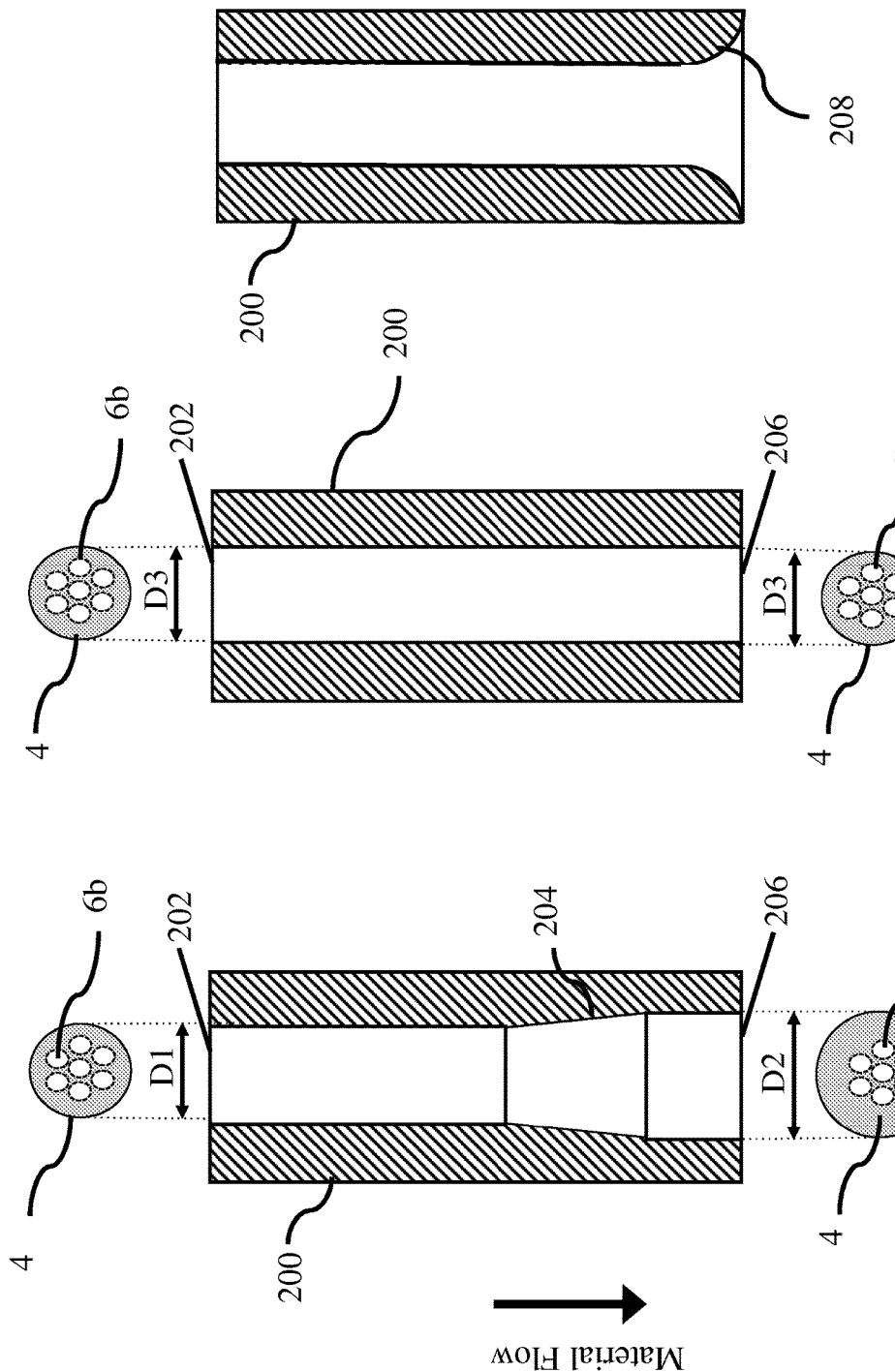
FIG. 6A-6C are a schematic representations of nozzlets utilized in some embodiments of the printing system.

A family of straight and diverging nozzlets which maintain a matched velocity of the strand(s) of fiber material 6b and the polymer matrix 4 throughout the entire nozzlet (at least so that the matrix does not build up within) are shown in FIGS. 6A through 6C. FIG. 6A depicts a divergent nozzlet 200 with an increasing nozzlet throat diameter that matches the thermal expansion of the matrix material, the nozzlet 200 including an inlet 202 with a diameter D1, a section with an increasing diameter 204, and an outlet 206 with a diameter D2 that is greater than the diameter D1. Alternatively, where both the matrix material and the fiber strand(s) have relatively low coefficients of thermal expansion (such as carbon fiber and Liquid Crystal Polymer), the nozzlet 200 may include an inlet 202 and outlet 206 that have substantially the same diameter D3, see FIG. 6B. A nozzlet 200 or 708 may also include a rounded outlet 208 or 726, as shown in FIG. 6C. For example, the rounded outlet 208 may be embodied by an outwardly extending lip, a chamfer, a filet, an arc, or any other appropriate geometry providing a smooth transition from the outlet, which may help to avoid fracture, applying stresses to, and/or scraping, the filament as it is printed.

Figure 7:
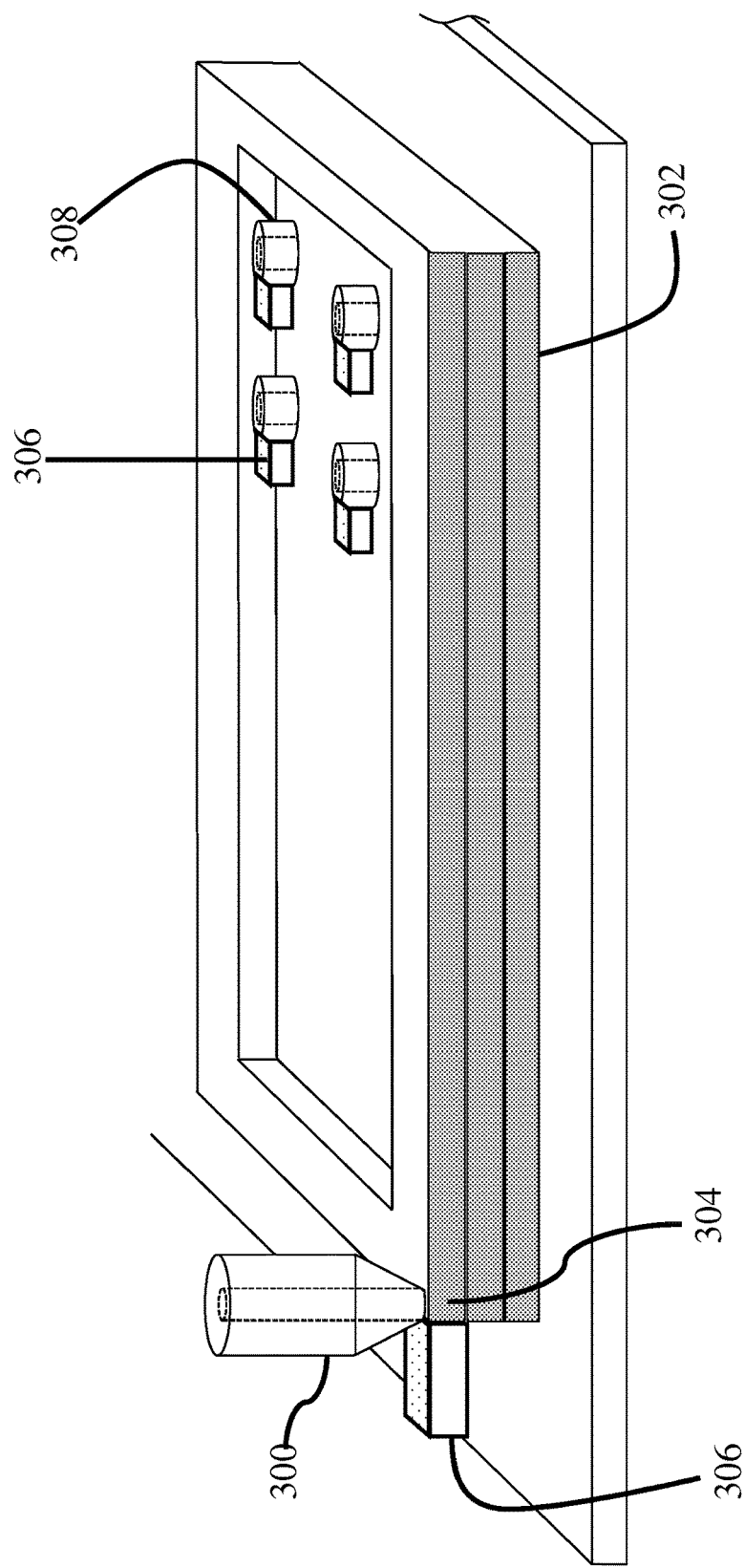
FIG. 7 is a schematic representation of a three dimensional printing system.

FIG. 7 illustrates a hypothetical and theoretical problem, unknown in the prior art, in which a print head 300 is forming part 302, having deposited the last section of material layer 304. The print head 300 touches the top of the extruded plastic, leaving no room for a cutter. If this print head were a push-pultrusion printer discussed herein but lacking the optional cutter 8, 8A discussed herein, the print head would print a tag-end over-run 306 not modelled (i.e., to be removed later) in the part in order to enable a subsequent cutting process to cut the embedded strand (and matrix) and terminate a printing process. In some cases, this may be desired (e.g., for conductive fibers). In other cases, this would create undesired tag-end overruns, e.g., as shown in FIG. 7, each of many hard mounting bosses 308 would all have a tag-end over-run 306 at each layer within the boss.

FIG. 8 depicts two embodiments of a cutter for use with a three dimensional printer. Like elements described with reference to, e.g., FIG. 1A or 1B are substantially similar. As depicted, a filament 2 or 2a, is supplied from a spool 38 and drawn and fed by driving roller 40 and idle wheel 42, which apply a force directed in a downstream direction to the filament 2a. Unheated, or at ambient or room temperature, or in any case below glass transition temperature in this zone (3010 or 3020), the matrix of the filament 2a is in a solid or "glass" state when this force is applied. The applied downstream force, as discussed herein, is transmitted via the glass state matrix 4A to the fiber strands 6A, which pushes the entire filament from a heated nozzlet 10 to build up a three dimensional part, despite that the matrix is then melted. The position of a cutter 8, 8a, 8b may reduce or eliminate the presence of tag-end over-runs in the final part, or permit them to be flexibly created if advantageous.

Positioning the cutter 8a (e.g., blade) at the outlet of the nozzlet 10 allows actuation of the cutter 8a to completely cut the deposited strip or bonded rank by severing the internal fiber strands, and/or may prevent further advance and/or dripping by physically blocking the nozzle outlet. A cutter 8a or 8b enables the deposition of filament (fiber reinforced or unreinforced) with precisely controlled lengths as controlled by the controller 20. In the alternative, positioning a cutter 8b upstream from the nozzlet 10, between the nozzlet 10 outlet and the feeding mechanism 40, permits a smaller gap between the nozzlet 10 outlet and the part. In the alternative or addition, the cutter 8b may cut the filament while the matrix temperature is below a melting, softening, or glass transition temperature, reducing the propensity of the resin to stick to the blade which may reduce machine jamming; and/or enable more precise metering of the deposited material.

Figure 10:
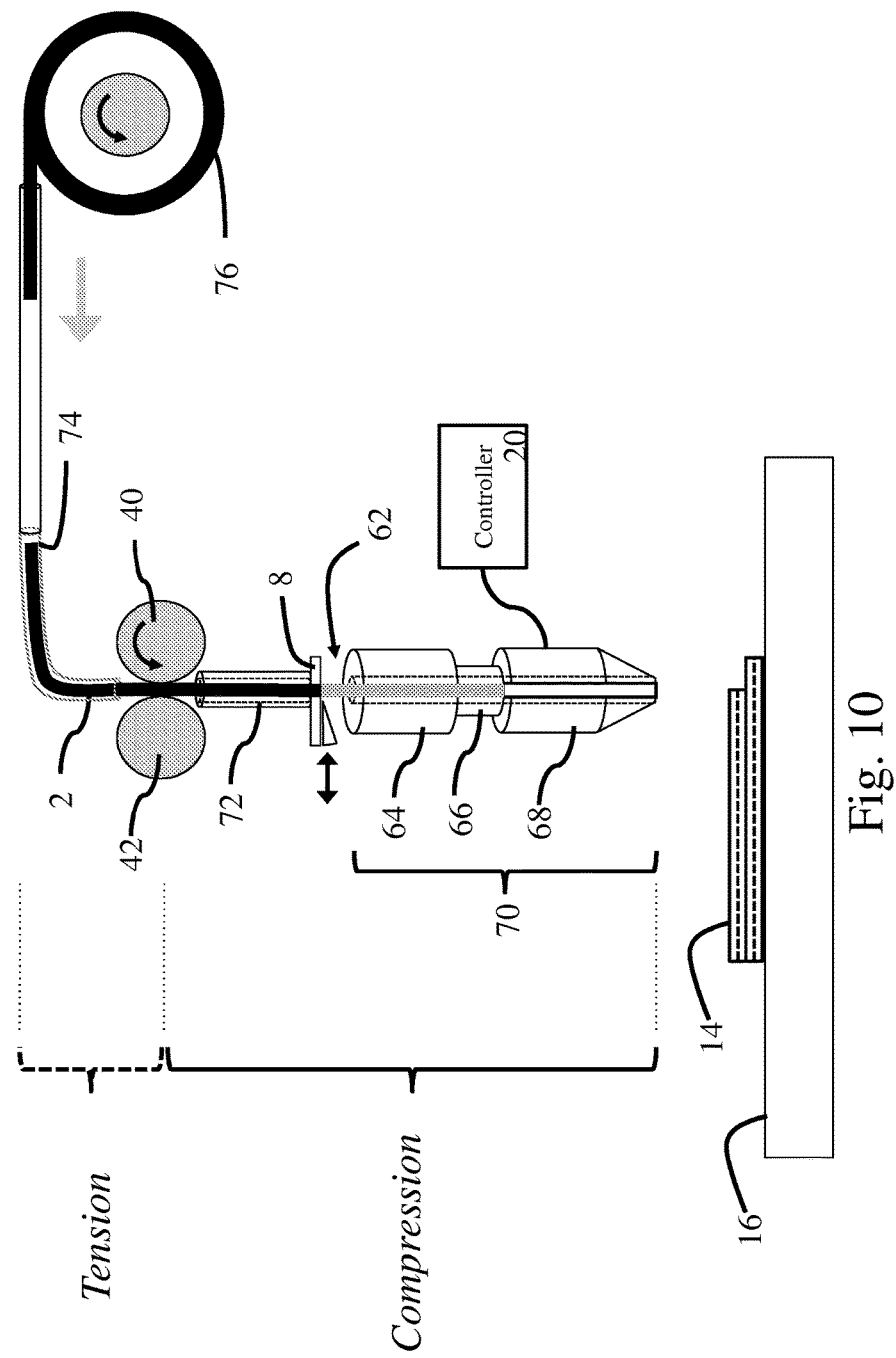
FIG. 10 is a schematic representation of a three-dimensional printing system including a guide tube.

If a relatively close (but in no circumstances binding) fit is maintained between the filament 2 and a guiding tube shown in FIG. 10 (which may be a clearance fit 3010 or larger guide), a downstream portion 2b of the cut strand is pushed by the abutting upstream portion 2a is driven by the drive roller 40. The previously bonded ranks (cooled) are adhered and under tension "drag" filament 2b from of the nozzlet 10 as the nozzlet 10 and build platen 16 are moved relative to one another. A combination of upstream forces from the feeding mechanism and downstream forces transferred via the unmelted or glass portion of the filament and the strands of the filament are used to deposit the bonded ranks.

As noted, a cutter 8, 8a, 8b is optional, but may also prevent buckling of the material to help ensure a uniform deposition and prevent machine jams. Further, small diameter (e.g., less than 30 thou) continuous filament is more susceptible to buckling. In this case, a close-fitting guide tube 10, or close-fitting guide within 64, 712 (in zones 3010, 3020) adjacent the feeding mechanism 42, 40 and/or near to the nozzlet 708 outlet, may help prevent buckling of the material. Therefore, in one embodiment, the feeding mechanism 42, 40 may be located within less than about 3-8 diameters from a guide tube or inlet to the nozzle. In one specific embodiment, the guide tube is a round hypodermic tube. However, if the filament is shaped other than circularly (e.g., oval, square, or tape), the guide tube is sized and shaped to match. Optionally, the filament 2 may include a smooth outer coating and/or surface where the fibers do not protrude through the filament 2 perimeter (reducing friction or resistance within the guide tube).

In some embodiments, the three-dimensional printing system does not include a guide tube. Instead, the feeding mechanism may be located close enough to an inlet of the nozzle, such as the receiving tube 64, such that a length of the continuous core filament 2 from the feeding mechanism to an inlet of the nozzlet is sufficiently small to avoid buckling. In such an embodiment, it may be desirable to limit a force applied by the feeding mechanism to a threshold below an expected buckling force or pressure of the continuous core filament, or other material fed into the nozzle.

In some embodiments, the maximum tension or dragging force applied to the deposited reinforcing fibers is limited to prevent the printed part from being pulled up from a corresponding build plane or to provide a desired amount of neutral to positive tensioning of the continuous core. For example, a one-way locking bearing may be used to limit the dragging force (e.g., with the speed of the feeding rollers set to be less than the speed of printing, but with the one-way bearing permitting the filament to be pulled through the rollers faster than they are driven). In such an embodiment, the drive motor 42 may rotate a drive wheel though a one-way locking bearing such that rotating the motor drives the wheel and advances material. If the material dragging exceeds the driven speed of the drive wheel, the one-way bearing may slip, allowing additional material to be pulled through the feeding mechanism and nozzle, effectively increasing the feed rate to match the printing rate or head traveling speed while also limiting the driving force such that it is less than or equal to a preselected limit. The dragging (neutral to positive tension) force may also be limited using a clutch with commensurate built-in slip. Alternatively, in another embodiment, the normal force and friction coefficients of the drive and idler wheels may be selected to permit the continuous material to be pulled through the feeding mechanism above a certain dragging force. Alternatively or in addition, an AC induction motor, or a DC motor switched to the "off" position (e.g. a small resistance applied to the motor terminals or opening motor terminals) may be used to permit the filament to be pulled from the printer against motor resistance. In such an embodiment, the motors may be allowed to freewheel when a dragging force above a desired force threshold is applied to allow the filament to be pulled out of the printer. In view of the above, a feeding mechanism is configured in some form or fashion such that a filament may be pulled out of the printer nozzlet when a dragging force applied to the filament is greater than a desired force threshold. Additionally, in some embodiments, a feeding mechanism may incorporate a sensor and controller loop to provide feedback control of either a deposition speed, printer head speed, and/or other appropriate control parameters based on the tensioning of the filament.

According to the versions of the invention discussed herein, the printing process may be similar in all phases, or create a different balance of forces within the printer, filament, and part in different printing phases (e.g., threading phase versus printing phase, and/or straight phases versus curved phases). For example, in one version of the invention, the printer may apply bonded ranks primarily via lateral pressing and axial tension in the main, continuous printing phase, and primarily via lateral pressing and axial compression in the threading phase where the end of the filament is first abutted to the platen or part and then translated under the ironing tip to be melted.

According to the versions of the invention discussed herein, the printing system may, under axial neutral to positive tension, drag a filament 2 out of a printer nozzle 708 along straight printed sections (and this tension extends past the nozzlet 708 to the feeding mechanism 42, 40 controlled at a feed rate, but which may have a slipping or clutch mechanism). During such operation, a printer head may be displaced or translated at a desired rate by the controller 20, and the deposited material and/or bonded ranks which are adhered to a previous layer or printing surface will apply a dragging force to the filament within the printing nozzle. The filament is pulled out of the printing system and deposited onto the part 14. In contrast, in addition, or in the alternative, according to the versions of the invention discussed herein, when printing along curves and/or corners, the feeding mechanism 42, 40 feed rate, and printing rate of the printing system may be controlled by the controller 20 to pushes the deposited filament onto a part or build surface 16. However, versions of the invention and embodiments in which a filament is pushed out of the printing system during a straight operation and/or where a filament is dragged out of a printer head when printing a curve and/or corner are also contemplated, as well as versions where the filament is substantially always dragged or substantially always pushed.

The deposition of tensioned internal strand reinforced filaments including a non-molten strand enables the deposited material to be pushed by the print head and adhered to the printed part at the (distal) end. The print head can suspend the filament across an open gap under tension, without the material sagging, enabling the construction of hollow-core components (with or without the use of soluble support material).

FIG. 8 depicts free-space printing enabled by the continuous core reinforced filament. With the continuous core reinforced filament 2b attached to the part at point 44, and held by the print head at point 46, it is possible to bridge the gap 48. Absent the tensioned internal fiber strands, the molten matrix material would sag and fall into the gap 48. In one example, the closed section box shown in FIG. 9 is formed by a section 50 which is bridges gap 48 and is affixed to opposing sections 52 and 54. Such free-space printing could also be used to produce cantilever beams that cannot be printed with typical unsupported materials. In such a case, optionally, a cooling mechanism such as a jet of cooling air may further prevent sagging by solidifying the polymer material surrounding the core, either continuously cooled over the entire or most of the build area during gap spanning, or cooled at the point of material advance during gap spanning. Selectively cooling material only while it is over a gap may lead to better adhesion in the remaining part since maintaining an elevated enhances diffusion bonding between adjacent layers.

In the above noted embodiments, a cutting blade is located upstream of the nozzlet to selectively sever a continuous core when required by a printer. While that method is effective, there is a chance that a towpreg will not "jump the gap" correctly between the cutter and the nozzle. Consequently, in at least some embodiments, it is desirable to increase the reliability of rethreading the core material after the cutting step. A cutter may be designed to reduce or eliminate the unsupported gap after the cutting operation, e.g., a tube-shaped shear cutter in which two abutting and coaxial tubes guiding the filament are temporarily displaced with respect to one another to shear the filament.

FIG. 10, similar to FIGS. 1A and 1B, depicts a printer mechanism. Like reference numerals and parts by appearance describe similar features. The filament 2 which is drawn into the feed rollers 40, 42 under tension, and to facilitate guiding and maintaining alignment of the filament 2 with the rollers 40, 42, the filament 2 passes through a guide tube 74 upstream of the rollers 40, 42. After passing through the rollers, 40, 42 the continuous core filament 2 is in axial compression (at least sufficient to overcome friction through any guiding tubes or elements). Depending on a length of the material under compression as well as a magnitude of the applied force, the continuous core filament 2 may tend to buckle. Accordingly, the continuous core filament 2 passes through a close-fitting guide tube 72 (e.g., clearance fit) positioned downstream of the rollers 40, 42 and upstream of the nozzlet 68. The guide tube 72 both guides the filament 2 and prevents buckling of the continuous core filament 2. A gap 62 is present between the printer head 70 and the cutter 8.

Figure 11:
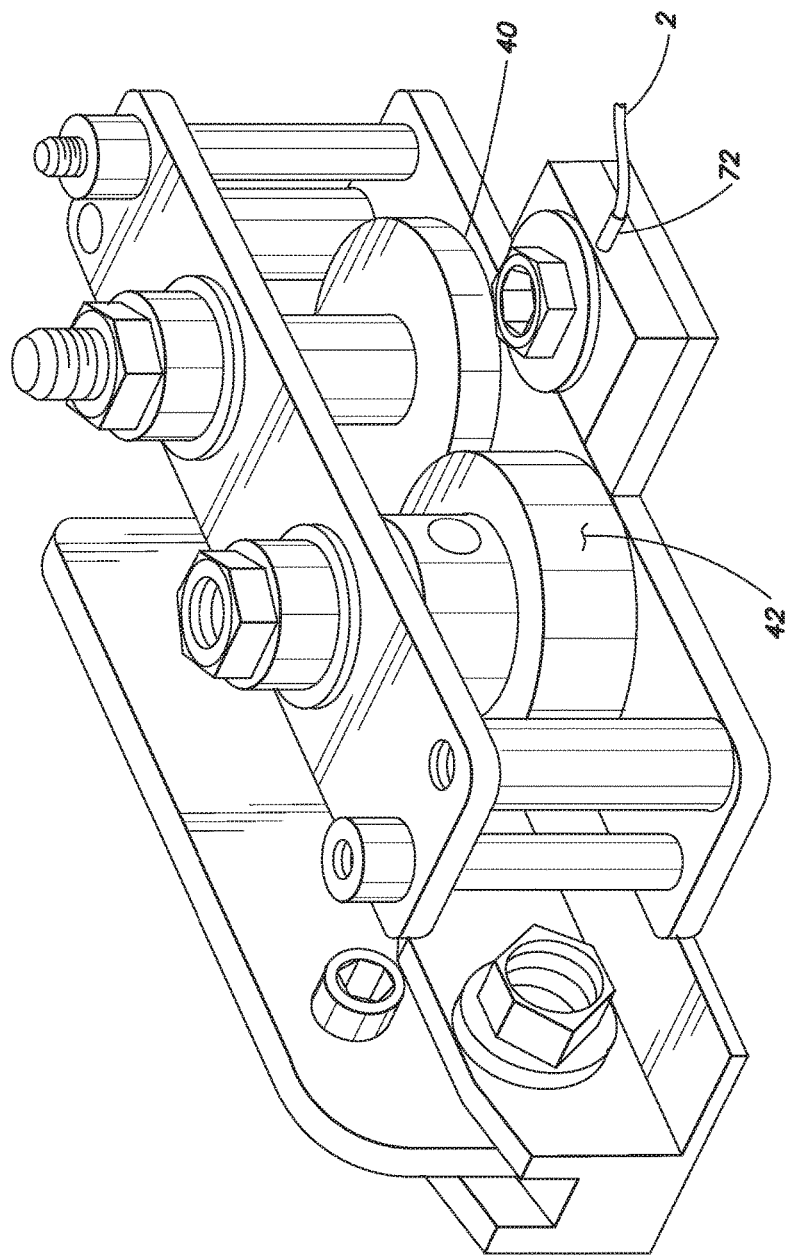
FIG. 11 is a photograph of a three dimensional printing system including a guide tube.

When the filament 2 is cut, the filament 2 is "rethreaded" passing from one side of the gap 62 to the receiving guide tube 64. The receiving tube 64 itself is optionally below the glass transition temperature of the material. Optionally, a thermal spacer 66 between the receiving tube 64 and heated part of the nozzlet 68 reduces the heat transfer to the receiving tube 64 from the hot nozzlet 68. FIG. 11 is a photograph of a system including the above-noted components, showing the roller 40, 42, close fitting tube 72, and filament 2 (which are each of very small diameter, between 10 and 50 thou).

In FIG. 10, difficulty in rethreading (i.e., through the entire system, versus during the threading or stitching process through the terminal end of the printhead which initiates printing) may be encountered because the filament is more flexible and prone to bending or buckling when the end is unsupported, than after it has been threaded and both ends are fully supported and constrained in a first order bending mode. After the filament has been threaded, the downstream portion guides all the subsequent filament. Cutting a filament, especially with a dull or thick blade, may also deform the end of the filament, tending to increase misalignment of the filament 2 and the receiving tube 64.

To improve the reliability of threading the filament past the cutter 8, 8a, or 8b, when not in use, the cutter 8 is removed from the gap 62 and the guide tube 72 is displaced (down) and/or telescoped towards the receiving tube 64 during rethreading. The clearance (gap) between the guide tube 72 and receiving tube 64 may be reduced, or the tubes 64, 72 may abut. Alternatively, pressurized fluid, such as air, may also be directed axially down the guide tube 72, such that the axial fluid flow centers the material to align the material with the receiving end 16 (and may cool the guide tube 72 tube for high-speed printing and/or higher printing temperatures, and/reduce friction of the material through the guide tube.

FIGS. 12A, 12B, and 13 depict embodiments of shear cutters, each of which eliminates the gap 62 to increase reliability of threading. The shear cutter may be optionally located within a print head, or upstream of the print head; and relative movement of shearing blocks is more important than which block moves. In FIG. 12A, the continuous filament 400 is driven in compression by drive wheel 408, and received by a close-fitting guide tube 420. The filament 2 is driven in compression through an upper shear cutting block guide 406, lower shear cutting head 402, and heated print head 404. The upper shear cutting block 406 and lower shear cutting head 402 are displaced relative to each other to apply a shearing force to the filament to cut it. FIG. 12B shows the upper shear cutting block 406 translated relative to shear cutting head 402, shearing off the filament segment 422. If a simple cut is desired, the shear head 402 can return to the original position relative to the upper cutting block 406. After the shear cut and return, the end of the filament 400 is entirely captive in the guiding tube. There is no gap to jump.

It may be desirable to provide printing capabilities with multiple types of materials and/or operations. FIG. 12A illustrates one embodiment of a system including optional indexing stations 414 and 416. In one embodiment, station 416 is a cleaning station and includes an optionally metal cleaning material 410 (e.g., brass, copper, stainless steel, aluminum), that can be fed through the print head 404 to clean the nozzlet, enabling the nozzlet to be heated, and purged with a material having a higher melting temperature than the filament 2. One process may be: the print head 404 is moved to a print cleaning station at a the back corner or other appropriate location; is then heated up and indexed to station 416; then the cleaning material 410 is then fed through the nozzlet to clear any obstructions. The upper sheer cutting block 406 and the lower shear cutting head 402 can then sever the sacrificial cleaning pieces to prevent introducing contaminants back to the nozzle. Alternatively the cleaning agent may be cyclically pushed down, and pulled back up through the nozzle. In another embodiment, the cleaning station 416 is used to push cleaning agents such as high-pressure liquids, gasses, solvents or the like, through the nozzle.

In some embodiments, the three-dimensional printing system may include a station 414 corresponding to a second filament 412, which may be an electrically conductive material such as copper, an optically conductive material such as fiber optics, a second core reinforced filament, plastics, ceramics, metals, fluid treating agents, solder, solder paste, or epoxies, etc. The print nozzle or nozzlet 404 is indexed from one of the other stations to the station 414 to deposit the second material 412, and back when completed.

FIG. 13 shows a shear cutting block 402 including multiple nozzles 404 and 424 formed in the shear cutting block. In one embodiment, the nozzlet 404 has a larger print orifice than the nozzlet 424, enabling larger diameter push-pulpreg and/or pure polymer materials to be deposited at a more rapid volume. In another embodiment, the second nozzlet 424 is substantially the same as nozzlet 404. Consequently, the second nozzlet 424 may be used as a replacement nozzlet that can be automatically switched into use if nozzlet 404 becomes clogged. Having an additional nozzlet would decrease the down time of the machine, especially in unattended printing (e.g. overnight). Similar to the above, the first and second nozzles 404 and 424 may be indexed between different stations.

FIGS. 14A-14C depict a family of nozzlets having different outlets. FIG. 14A depicts a nozzlet 500 including an inlet 502 and an outlet 504 which includes a sharp exit corner suitable for some filaments 2 such as aramid, but which may lead to damage to fibers which are not resistant to abrasion, such as fiberglass, carbon, plating on metal cores, treatments to fiber optic cables. FIG. 14B depicts a smooth transition, multiple chamfered (e.g., twice chamfered, or 45 degree) nozzlet outlet 506, which reduces shear cutting of fibers, and FIG. 14C depicts smoothly rounded nozzlet exit or ironing tip 508 which reduces shearing and cutting of non-molten strands.

It may, in the alternative, be desirable to sever the filament 2, e.g., by pushing a sharp edged nozzle down in the vertical Z direction, as shown by arrow 510. As depicted in FIG. 14C, the corner of a nozzlet 508 may be sharpened and oriented in the Z direction to sever the continuous when forced against the filament 2 (optionally under tension, optionally provided by any or all of driving the feeding mechanism and/or moving the print head, or moving the build table). As depicted in FIGS. 15A-15D, a portion of a nozzlet is optionally be sharpened and directed towards an interior of the nozzlet outlet to aid in cutting material output through the nozzlet. As shown, smoothly chamfered nozzlet 600 contains a filament 2, exiting from a chamfer nozzlet 600, and a ring 602 located at a distal outlet of the nozzlet. A first portion of the ring 602 is non-cutting and shaped and arranged to avoid interfering with the filament 2, and a second portion of the ring 602 includes a cutting portion or blade 602*a* (optionally steel, carbide, or ceramic) sharpened and oriented inwards towards the filament 2 path contained within the nozzlet 600 as seen in FIGS. 15B-15D, and occupying less than 1/10 of the nozzlet outlet area. The cutting portion 602*a* may be any of: permanently attached; selectively retracted during printing and deployed to cut; recessed into a perimeter of the nozzlet outlet; forming a part of the perimeter of the nozzlet exit as depicted in FIG. 15B; formed integrally with the nozzlet outlet; and/or attached to the nozzlet outlet.

In operation as shown in FIGS. 15A-15D, the nozzlet 600 is translated in a direction D relative to a part being constructed on a surface while the filament 2 is stationary and/or held in place, resulting in the tensioning of the core material 6. As increasing tension is applied to the continuous core filament 2, the core 6 is cut through by the cutting portion 602*a*. Alternatively, the surface and/or part is translated relative to the nozzlet or the filament tensioned using the feeding mechanism to perform the severing action. FIG. 16 presents another embodiment of a nozzlet tip-based cutter m the depicted embodiment, a cutting ring 604 having a sharp and edge oriented towards the already deposited filament 2, which is actuated relative to the nozzlet 600 and part to expose the sharp edge to bring the filament in contact with the cutting element 604, and sever the core material 6.

For brittle materials, such as fiber optic cables, the cutting portion 602*a* or 604 may form a small score, and additional relative translation of the nozzlet and the part may complete the cut. For other materials, such as composite fibers, the rounded geometry of the nozzlet results in the core 6 being directed towards the cutting portion 602*a* or 604 under tension, with resulting consolidation (e.g. compaction) toward the cutting portion enables cutting of a large fiber with a relatively smaller section blade. For metal fibers or ductile materials, the cutting portion 602*a* or 604 may create enough of a weak point in the material that sufficient tensioning of the core breaks the core strand at the nozzlet exit.

The cutting portion 602*a* or 604 may be a high temperature heating element referred to as a hot knife, which may directly or indirectly heat the fiber to a melting temperature, carbonization temperature, or a temperature where the tensile strength of the core is low enough that it may be broken with sufficient tensioning. The heating element may be a high-bandwidth heater that heats quickly and cools down quickly without harming the printed part; or an inductive heating element that isolates heating to the fiber.

According to versions of the present invention discussed herein, axial compression and/or laterally pressing the melted matrix filament 2 into bonded ranks may enhance final part properties. For example, FIG. 17A shows a composite fiber reinforced filament 2 applied with a compaction force, axial compression, or lateral pressure 62. The compaction pressure from axial compression and flattening from the ironing lip 508, 726, 208 in zone 3040, compresses or reshapes the substantially circular cross-section filament 2*a*, see FIG. 17B, into the preceding layer below and into a second, substantially rectangular cross-section compacted shape, see FIG. 17C. The entire filament forms a bonded rank (i.e., bonded to the layer below and previous ranks on the same layer) as it is shaped. The filament 2*b* both spreads and interior strands intrude into adjacent bonded ranks 2*c* on the same layer and is compressed into the underlying shaped filament or bonded rank of material 2*d*. This pressing, compaction, or diffusion of shaped filaments or bonded ranks reduces the distance between reinforcing fibers, and increases the strength of the resultant part (and replaces conventional techniques achieved in composite lay-up using post-processing with pressure plates or vacuum bagging). Accordingly, in some versions of the present invention discussed herein, the axial compression of the filament 2 and/or especially the physical pressing by the printer head 70, nozzlet or ironing lip 508, 726, 208 in zone 3040 may be used to apply a compression pressure directly to the deposited material or bonded ranks to force them to spread or compact or flatten into the ranks beside and/or below. Cross-sectional area is substantially or identically maintained. Alternatively or in addition under versions of the present invention, pressure may be applied through a trailing pressure plate behind the print head; a full width pressure plate spanning the entire part that applies compaction pressure to an entire layer at a time; and/or heat, pressure, or vacuum may be applied during printing, after each layer, or to the part as a whole to reflow the resin in the layer and achieve the desired amount of compaction (forcing of walls together and reduction and elimination of voids) within the final part.

As noted above, and referring to FIG. 18A, nozzles 700 used in Fused Filament Fabrication (FFF) three dimensional printers typically employ a constriction at the tip of the nozzle 700, leading to eventual clogging and jamming of the print head (nozzle). The nozzles on most FFF three-dimensional printers are considered wear items that are replaced at regular intervals.

In a divergent nozzlet according to some versions of the present invention, material expands as it transitions from a feed zone, to a heated melt zone, enabling any particulate matter that has entered the feed zone to be ejected from the larger heated zone. A divergent nozzlet is both easier to clean, permitting permit material to be removed in a feed forward manner.

As used in the following discussion, "fluidly connected" is used in the context of a continuous connection permitting flow, and does not suggest that the filament 2 is or is not fluid at any particular stage unless otherwise indicated. FIG. 18B shows a nozzlet 708 including a material inlet 710, connected to a cold-feed zone 712, in turn fluidly connected to a heated zone 714. The cross-sectional area (perpendicular to flow direction) of the cavity or channel in the heated zone 714 and/or outlet 716 is greater than the cross-sectional area (perpendicular to flow direction) of the cavity or channel located in the cold-feed zone 712 and/or the inlet 710. The cold-feed zone 712 may be constructed of a material that is less thermally conductive than that of the heated zone 714, permitting the filament 2 to pass through the cold feed zone 712 and into the heated zone 714 without softening.

In one particular embodiment, the divergent nozzlet 708 is formed by using a low-friction feeding tube, such as polytetrafluoroethylene, fed into a larger diameter heated zone located within a nozzlet such that a portion of the heated zone is uncovered downstream from the tube. The heating zone may in addition or in the alternative be constructed from, or coated with, a low friction material such as polytetrafluoroethylene, and the transition from the cold feed zone 712 to the heated zone 714 may be stepped, chamfered, curved, or smooth.

FIG. 18C depicts an instance where a divergent nozzlet 708 has been obstructed by a plug 718 that has formed during use within the heated zone 714 and then removed. The divergent nozzlet 708 can be cleaned using a forward-feeding cleaning cycle, e.g., starting by applying and adhering a portion of plastic onto a print bed or cleaning area adjacent the print bed, after which the adhered plastic is cooled (left to cool) below its melting temperature, where-upon the print bed and nozzlet are moved relative to each other to extract the plug 718 from the nozzlet 708 (optionally helped by a unmelted compressive force from filament upstream in the feeding mechanism). While any appropriate material may be used with a divergent nozzle, nylon and nylon relatives are particularly advantageous because nylon's coefficient of thermal expansion for nylon causes it to pull away from the nozzlet slightly during cooling and nylons exhibit a low coefficient of friction. Polytetrafluoroethylene walls within either or both of the cold feed and heated zone may help with plug removal. A cleaning cycle may also be performed without the adhering step by extruding a section of plastic into free air, then removed by hand or using an automated tool.

Figure 19B:
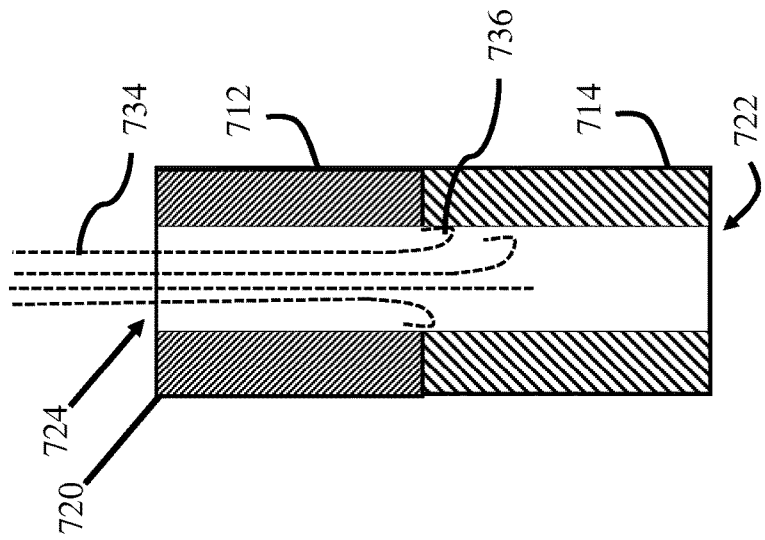
FIG. 19B is a schematic representation of a green towpreg being printed with a straight nozzle.
Figure 19A:
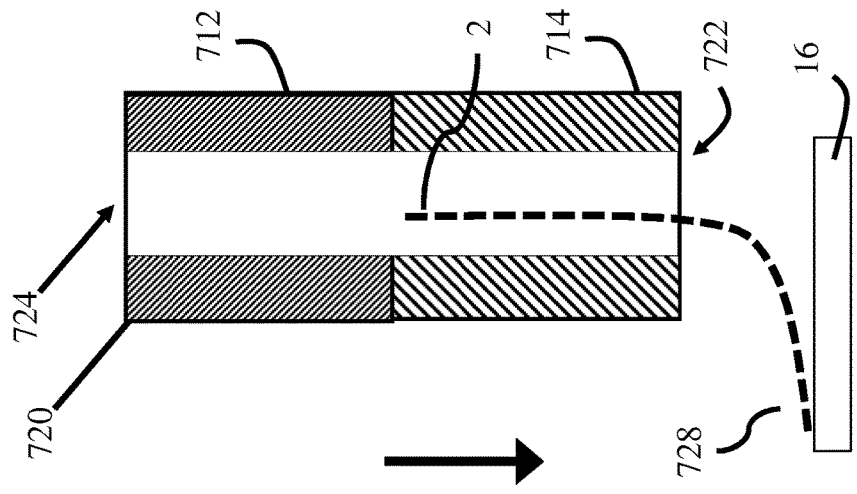
FIG. 19A is a schematic representation of a continuous core filament being printed with a straight nozzle.

In the case of a straight nozzlet, particularly for small diameter filaments on the order of about 0.001" up to 0.2", as shown in FIG. 19A, a nozzlet 720 may include an inlet 724 that is substantially the same size as nozzlet outlet 722. A material such as a stranded reinforced composite filament 2 passes through a cold feed zone 712 and into a heated zone 714 (e.g., either or both zones low friction and/or polytetrafluoroethylene walled). The heated zone 714 is thermally conductive, e.g., made from copper, stainless steel, brass, or the like. The filament 2 is attached to a build platen 16 or cleaning area, and the process describe with respect to FIGS. 18B and 18C carried out. Small diameter filaments are suited to this because the low thermal mass permits them to heat up quickly and be extruded (in the case of FFF) at substantially the same size as they are fed into the print head. FIG. 19B shows a hypothetical manner in which a conventional green towpreg may come apart in a straight nozzlet.

FIGS. 19C-19E illustrate a method of threading according to versions of the present invention using a rigid push-pulpreg stranded filament fed through a divergent nozzlet 708, such that clogging is reduced or eliminated. "Threading", in this context, is the first step in printing of continuous deposition (straight sections and rows) of bonded ranks, and is only performed again after the filament 2 is cut, runs out, is separated, or otherwise must be again started. FIG. 19C shows a continuous core filament 2 located within a cold feed zone 712, which may begin 5 inches or more from the heated zone 714. Where the filament 2 has a larger thermal capacity and/or stiffness, the cold feed zone may begin closer to the heated zone 714 to provide pre-heating of the material prior to stitching. Within the cold feed zone 712 (below a melting temperature of the matrix), the filament 2 remains substantially solid and rigid, and is maintained in this position until just prior to printing.

When printing is initiated, the filament 2 is quickly fed and threaded through the nozzlet, see FIG. 19D. The cold-feed zone 712 feeds into the larger cavity heated zone 714, and the filament 2 is constrained from touching the walls of the heated zone 714 by the rigidity of the upstream filament still located in the cold feed zone 712, see FIG. 19D. By maintaining a stiffness and preventing melting and wall contact until the material has been threaded to the outlet, fibers are prevented from peeling off, curling and/or clogging within the nozzlet, enabling the filament 2 to more easily pushed into and through the hot-melt zone 714. In some embodiments, a blast of compressed air may be shot through the nozzlet prior to and/or during threading in order to cool the nozzlet to reduce the chance of sticking to the sides of the nozzle. Additionally, heating of the heated zone 714 of the nozzlet may be reduced or eliminated during a stitching process to also reduce the chance of sticking to the sides of the nozzle.

As feeding of the continuous core filament 2 continues, the continuous core filament 2 contacts the build platen 16 or previous layer. The filament 2 is then laid or pressed along the surface by motion of the nozzlet relative to the build platen 16. Within a short distance, the filament 2 contacts the walls of the rounded or chamfered lip 726 next to the heated zone 714 or nearly contacts the walls of the heating zone 714, as illustrated in FIG. 19E. Alternatively, instead of translating the printer head, the filament 2 could be driven to a length longer than a length of the nozzlet, and when the outlet is blocked by a previous layer or by the print bed, the filament buckles to the same effect. After contacting the rounded or chamfered ironing lip 726, the wall of the heating zone 714 (or nearly contacting the same), the continuous core filament 2 is heated to the deposition temperature (e.g., melting temperature of the matrix) for fusing the deposited material the build platen and/or previous layers. Threading speeds may be between about 2500 mm/min and 5000 mm/min.

The rounded or chamfered lip 726 located at a distal end of the nozzlet outlet 716 may provide gradual transition at the nozzlet outlet may help to avoid fracturing of the continuous core and also applies a downward, compaction, pressing, or ironing force to the continuous core filament 2 as it is deposited. That is, "ironing" refers to an act in which (i) a substantially lateral or transverse force to the side of the filament (e.g., downward if the filament is laid horizontally) is (ii) applied by a smooth surface (partially parallel to the build platen or rounded with a tangent thereof parallel to the build platen) (iii) that is translated in the printing direction as it presses upon the melted filament to become a bonded rank. The rounded or chamfered lip provides a downward force, and translates its lower smooth surface parallel to the build platen to iron the continuous core filament down to the previous layer. Ironing may be conducted by positioning the lip 726 at a distance relative to a deposition surface that is less than a diameter of the continuous core filament 2; and or by setting the height of a bonded rank to be less than the diameter of the filament 2, but appropriate compaction force may be achieved without this act (e.g., with sufficiently stiff materials, using the axial compression force only, positioning the lip at a distance greater than the diameter of the filament 2). This distance from the lip 726 to the previous layer or build platen, or the height of a bonded rank may be confirmed using an appropriate sensor.

Figure 20A:
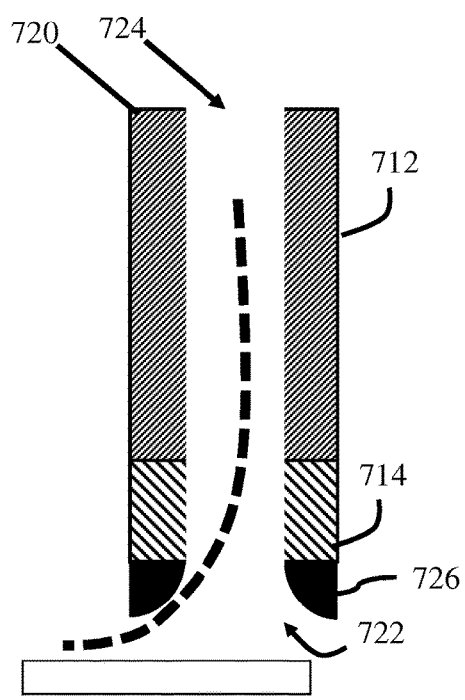
FIG. 20A is a schematic representation of a multi-material nozzlet with a low friction cold feeding zone.
Figure 20B:
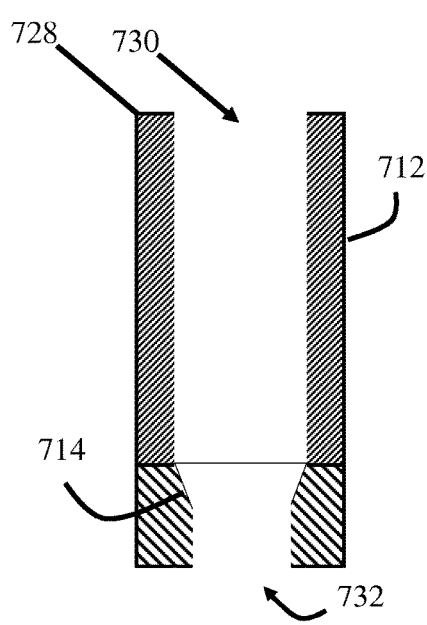
FIG. 20B is a schematic representation of a slightly convergent nozzlet including a low friction cold feeding zone.

The ironing and/or axial compression compaction(s) discussed herein do not require a divergent nozzlet. For example, the ironing or ironing lip or tip 726 may be incorporated with a substantially straight nozzlet 720 or a slightly convergent nozzlet, see FIG. 20A. Alternatively, or in addition, a convergent nozzle may also use a separate cold feed zone and heated zone, e.g., as shown in FIG. 20B, which shows a convergent nozzlet 728 including a nozzlet inlet 730 that feeds into a cold feed zone 712 which is in fluid communication with a heated zone 714 and then a convergent nozzlet outlet 732.

Figures 21A, 21B, 21C, 21D:
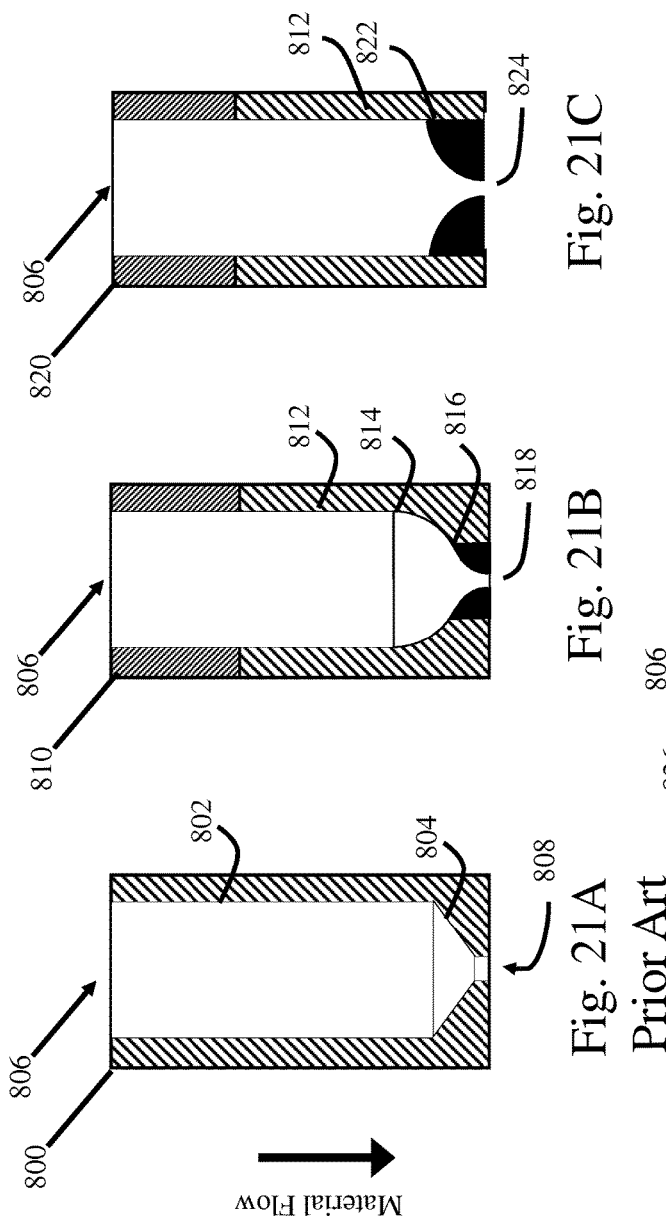
FIG. 21A is a schematic representation of a prior art nozzle.
FIGS. 21B-21D represent various embodiments of nozzle geometries.

FIGS. 21A-21D show FFF nozzles which can be employed with the secondary, coating or shell print head described herein according to the present invention. FIG. 21A shows a nozzle 800 including an inlet 806 is aligned with an internal wall 802 that extends up to a convergent section 804 and then to a nozzle outlet 808 with an area that is less than an area of the inlet 806. FIGS. 21B-21D depict various geometries including smooth transitions to reduce a back pressure generated within the nozzle. FIG. 21B depicts a nozzle 810 including an inlet 806, an internal wall 812 with a first diameter initially vertical but transitioning to a tangential inward curvature 814, and after about 45 degrees of curvature, an inflection point 816 reverses curvature and curves until the internal wall 812 is again vertical, the resulting outlet 818 aligned with the inlet 810 and with a reduced second diameter. FIG. 21C depicts a nozzle 820 with an internal wall that transitions to a downwards oriented curvature 822 directed towards the nozzle outlet 824. FIG. 21D depicts a nozzle 826 which transitions to a chamfered nozzle section 828 which extends up to a point 830 where it transitions to a downwards oriented curvature 832 to define a nozzle outlet 834.

Figure 22:
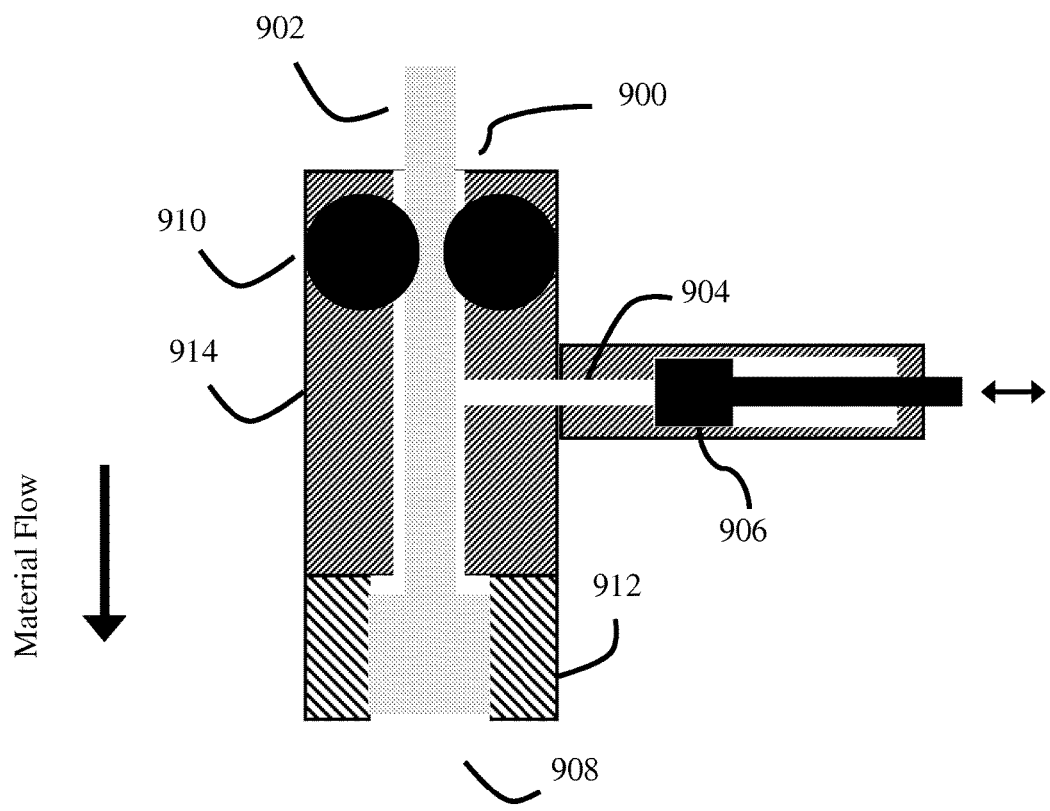
FIG. 22 is a schematic representation of an anti-drip nozzle and pressure reduction system.

FIG. 22 depicts an anti-drip feature for FFF nozzles describe herein. In the depicted embodiment, an extrusion nozzle 900 has a material 902 fed past one or more gaskets 910 and into a cold feed zone 914 and heated zone 912 prior to exiting nozzle outlet 908. An air channel 904 is connected to the cold feed zone 914 and is in fluid communication with a pneumatic cylinder 906. During operation, the pneumatic cylinder 906 is actuated from a first neutral position to a second position to selectively applying suction to the air channel 904 when printing is stopped. Since the air channel 904 is in fluid communication the cold feed zone 914 as well as with material within the heated zone 912, the suction may substantially prevent dripping of polymer melt located within the heated zone. Once printing resumes, the pneumatic cylinder 906 may be returned to the neutral position.

As discussed herein, a "semi-continuous" strand composite has a core that has been segmented along its length into a plurality of discrete strands. These discrete strands may be a single segmented strand, or a plurality of individual filaments strands bundled together but nonetheless segmented along their length. Discrete segments may be arranged such that they do not overlap. As described herein, the material instead of being cut, may be severed by applying a tension to the material, in most cases while the matrix is melted or softened, and most usefully at the termination of a printing cycle. The tension may be applied by either backdriving a feed mechanism of the printer and/or translating a printer head relative to a printed part without extruding material from the nozzle.

Figures 23A, 23B, 23C:
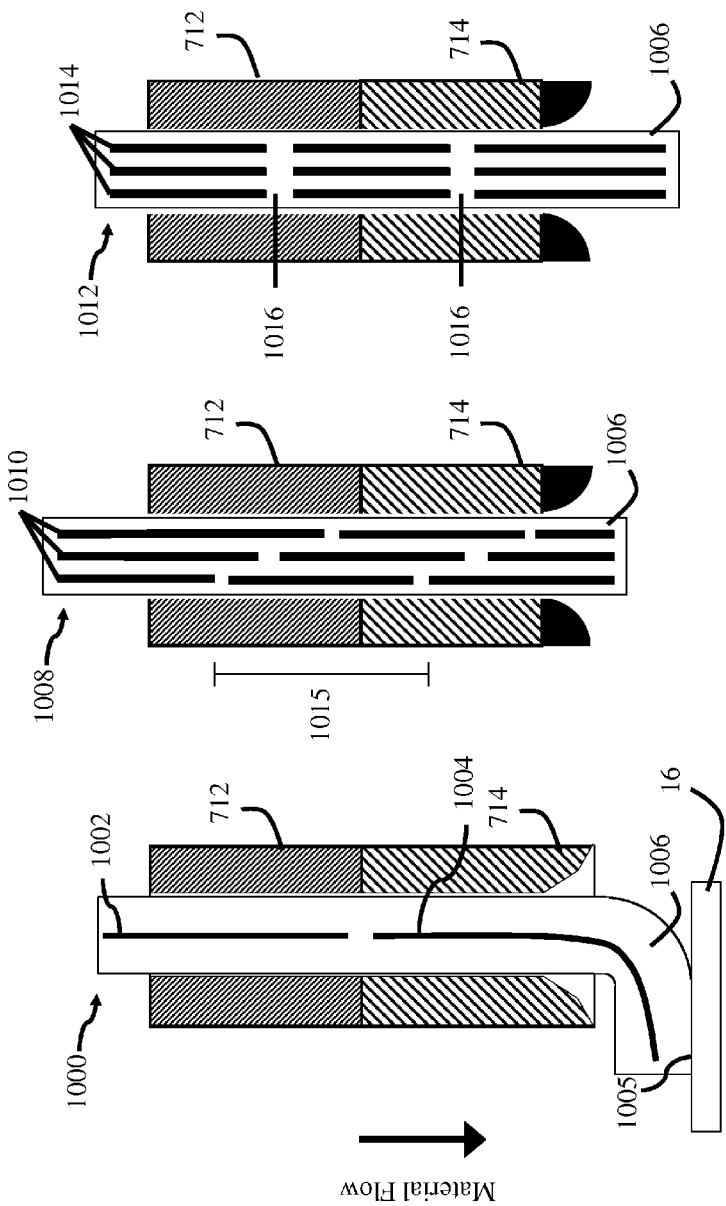
FIG. 23A is a schematic representation of a semi-continuous core filament positioned within a nozzle.
FIG. 23B is a schematic representation of a semi-continuous core filament with overlapping strands positioned within a nozzle.
FIG. 23C is a schematic representation of a semi-continuous core filament with aligned strands and positioned within a nozzle.
Figures 24A, 24B, 24C, 24D:
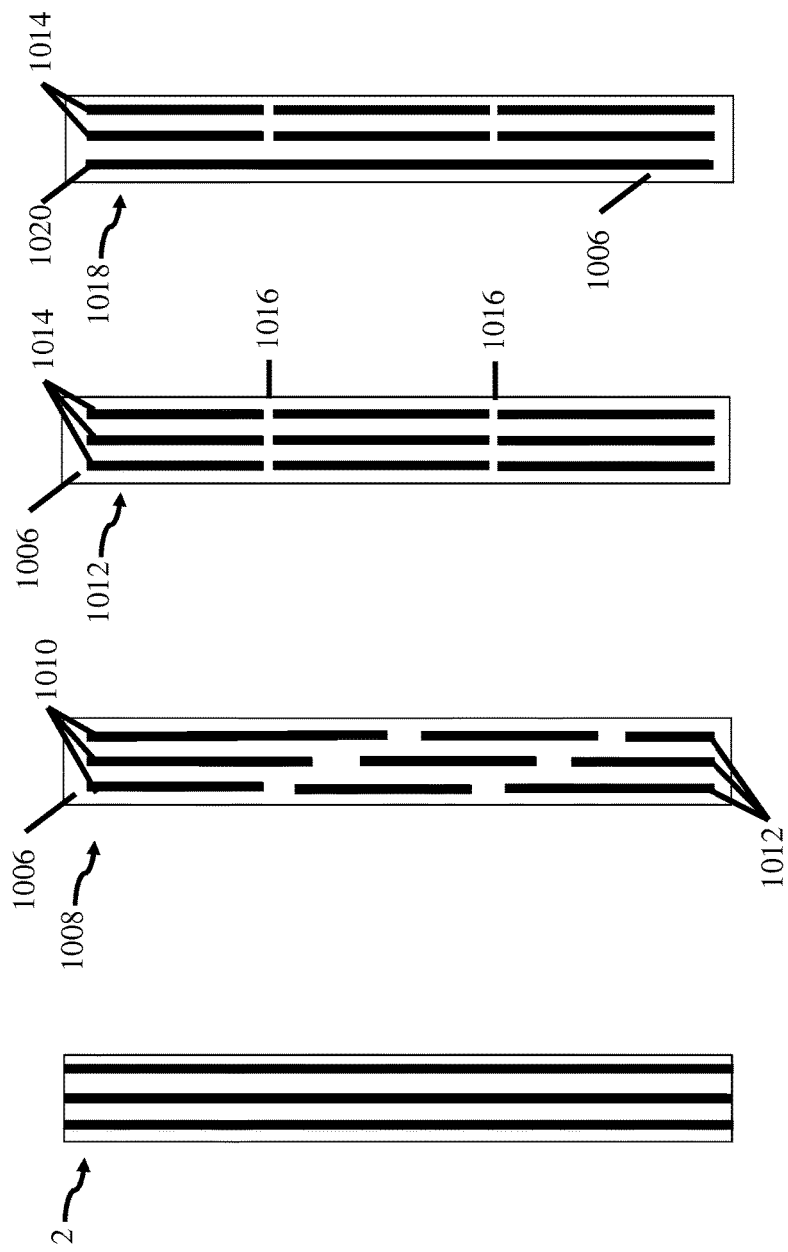
FIG. 24A is a schematic representation of a multifilament continuous core.
FIG. 24B is a schematic representation of a semi-continuous core filament with offset strands.
FIG. 24C is a schematic representation of a semi-continuous core filament with aligned strands.
FIG. 24D is a schematic representation of a semi-continuous core filament with aligned strands and one or more continuous strands.

FIGS. 23A-24D depict various embodiments of a semi-continuous strand core filament being deposited from a nozzle, as contrasted to the continuous strand core filament 2 depicted in FIG. 24A.

Semi-continuous strands embedded in a corresponding matrix material may also have discrete, indexed strand lengths, where termination of the semi-continuous core occurs at pre-defined intervals along the length of the filament (and the strand length may be larger than a length of the melt zone of an associated nozzlet). A semi-continuous strand core might include individual strands or strand bundles arranged in 3-inch (e.g., 2 to 5 inch) lengths, cleanly separated such that the fibers from one bundle abut the next bundle but do not extend into the next bundle. A path planning algorithm controlled by the controller 20 may align breaks in the strand with ends, corners, edges and other stopping points in the print. Given a printer without a cutter and using indexed strands cannot terminate the printing process until an indexed break in the semi-continuous strand is aligned with the nozzle outlet, the controller 20 optionally fills in areas below the minimum feature length with resin. For example, in many geometries, the outer portion of the cross section provides more strength than the core. In such cases, the outer section may be printed from semi-continuous strands up until the last integer strand will not fit in the printing pattern, at which point the remainder may be left empty, or filled with pure resin.

As depicted in FIG. 23A, a semi-continuous core filament 1000 including a first strand 1002 and a second strand 1004 located within the matrix 1006. The filament 1000 enters a cold feeding zone 712 of a nozzlet below the glass transition temperature of the matrix. The filament 1000 subsequently flows through heated or melt zone 714. The matrix 1006 in the filament 1000 is melted within the heated zone 714 prior to deposition. Upon exit from the nozzle, filament 1000 is attached to a part or build platen 16 at anchor point 1005. Severance may occur by moving the print head forward relative to the anchor point 1005, without advancing the semi-continuous core filament 1000; or alternatively the print head may remain stationary, and the upstream semi-continuous core filament 1000 is retracted to apply the desired tension. The tension provided by the anchor point 1005 permits the remaining portion of the second strand 1004 located within the nozzlet to pull the remnant of the embedded strand from the heated nozzle.

Figure 25:
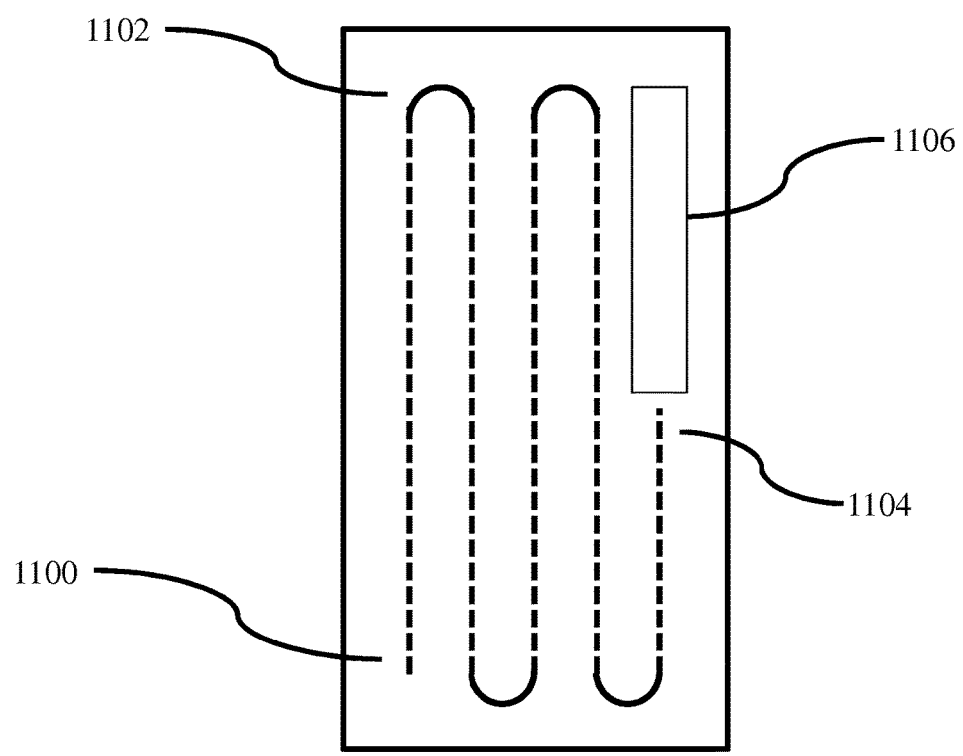
FIG. 25 is a schematic representation of a fill pattern using a semi-continuous core filament.

FIGS. 23C and 24C shows an indexed semi-continuous core filament 1012 where the termination of the core material is substantially complete at each section, thereby enabling clean severance at an integer distance. The individual sections of core material are separated from adjacent sections of core material at pre-indexed locations 1016. The material will exhibit a reduced strength (e.g., compared to bonded ranks including embedded fiber) at boundary locations corresponding to the pre-indexed locations 1016 depicted in the figures. FIG. 25 illustrates the use of such a semi-continuous core filament. As depicted in the figure, multiple strands 1100 are deposited onto a part or build platen. The strands 1100 are deposited such that they form turns 1102 as well as other features until the print head makes it final pass and severs the material at 1104 as described above. Since the individual strands are longer than the remaining distance on the part, the remaining distance 1106 may either be left as a void or filled with a separate material such as a polymer.

While FIG. 23A showed two individual strands, FIGS. 23B and 24B show a semi-continuous core filament 1008 including a distribution of similarly sized strands 1010 embedded in a matrix 1006. While three strands are shown in a staggered line, this is a simplified representation of a random, or staggered, distribution of strands. For example, material may include about 1,000 strands of carbon fiber (the fiber bundle termed a "1k tow", although in the present discussion this tow must be appropriately, void-free, embedded in a thermoplastic matrix as discussed herein). The strands 214 may be sized and distributed such that there are many overlapping strands of substantially similar length. As such, a semi-continuous strand filament may include segments sized relative to a melt zone of a printer nozzle such that the individual strands may be pulled out of the outlet of the nozzlet. The melt zone could be at least as long as the strand length of the individual fibers in a pre-preg fiber bundle, or half as long as the strand length of the individual fibers in a pre-preg fiber bundle. During tensioning of the material to separate the filament, the strands embedded in a part or adhered to a printing surface provide an anchoring force to pull out a portion of the strands remaining within the nozzle. For long strands, some strands may be retained within the nozzle, which may result in vertically oriented strands, optionally pushed over by the print head, or optionally subsequently deposited layers placed strategically as vertically oriented strands within a material layer.

A material may combine indexed and overlapping strands. For example, indexed continuous strands may be used, in parallel with smaller length bundles located at transition points between the longer strands, such that the melt zone in the nozzlet includes sufficient distance to drag out the overlapping strands located in the melt zone. The advantage of this approach is to reduce the weak point at the boundary between the longer integer continuous strands. During severance of a given core and matrix material, it is desirable that the severance force is sufficiently low to prevent part distortion, lifting, upstream fiber breaking, or other deleterious effects. In some cases, strands may be broken during the extraction, which is acceptable at the termination point. While the strand length can vary based on the application, typical strand lengths may range from about 0.2" up to 36" for large scale printing.

FIG. 24D shows an example of a hybrid approach between a semi-continuous core filament and a continuous core filament. In the depicted embodiment, a material 1018 includes multiple discrete sections including one or more core segments 1014 embedded within a matrix 1006 that are located at pre-indexed locations similar to the embodiment described above in regards to FIGS. 24C and 25C. The material also includes a continuous core 1020 embedded within the matrix 1006 extending along a length of material. The continuous core 1020 may be sized such that it may be severed by a sufficient tensile force to enable severing of the material at the pre-indexed locations simply by the application of a sufficient tensile force. Alternatively, any of the various cutting methods described above might also be used.

Figure 26:
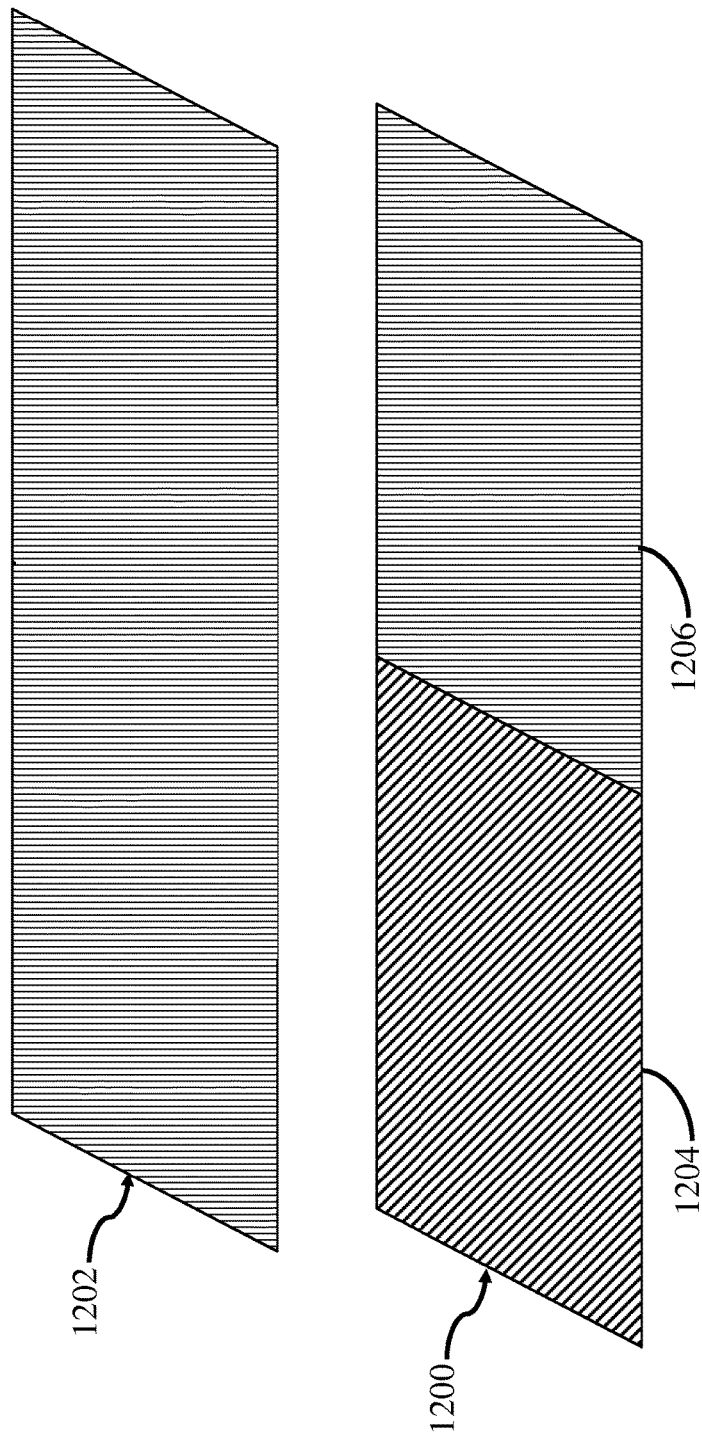
FIG. 26 is a schematic representation of multiple printed layers formed by the three-dimensional printing system and/or process with the different layers and different portions of the layers including different fiber directions.

Successive layers of composite may, like traditional layup, be laid down at 0°, 45°, 90°, and other desired angles to provide part strength in multiple directions and to increase the strength-to-weight ratio. The controller 20 may be controlled to functionality to deposit the reinforcing fibers with an axial alignment in one or more particular directions and locations. The axial alignment of the reinforcing fibers may be selected for one or more individual sections within a layer, and may also be selected for individual layers. For example, as depicted in FIG. 26 a first layer 1200 may have a first reinforcing fiber orientation and a second layer 1202 may have a second reinforcing fiber orientation. Additionally, a first section 1204 within the first layer 1200, or any other desired layer, may have a fiber orientation that is different than a second section 1206, or any number of other sections, within the same layer.

Figure 27:
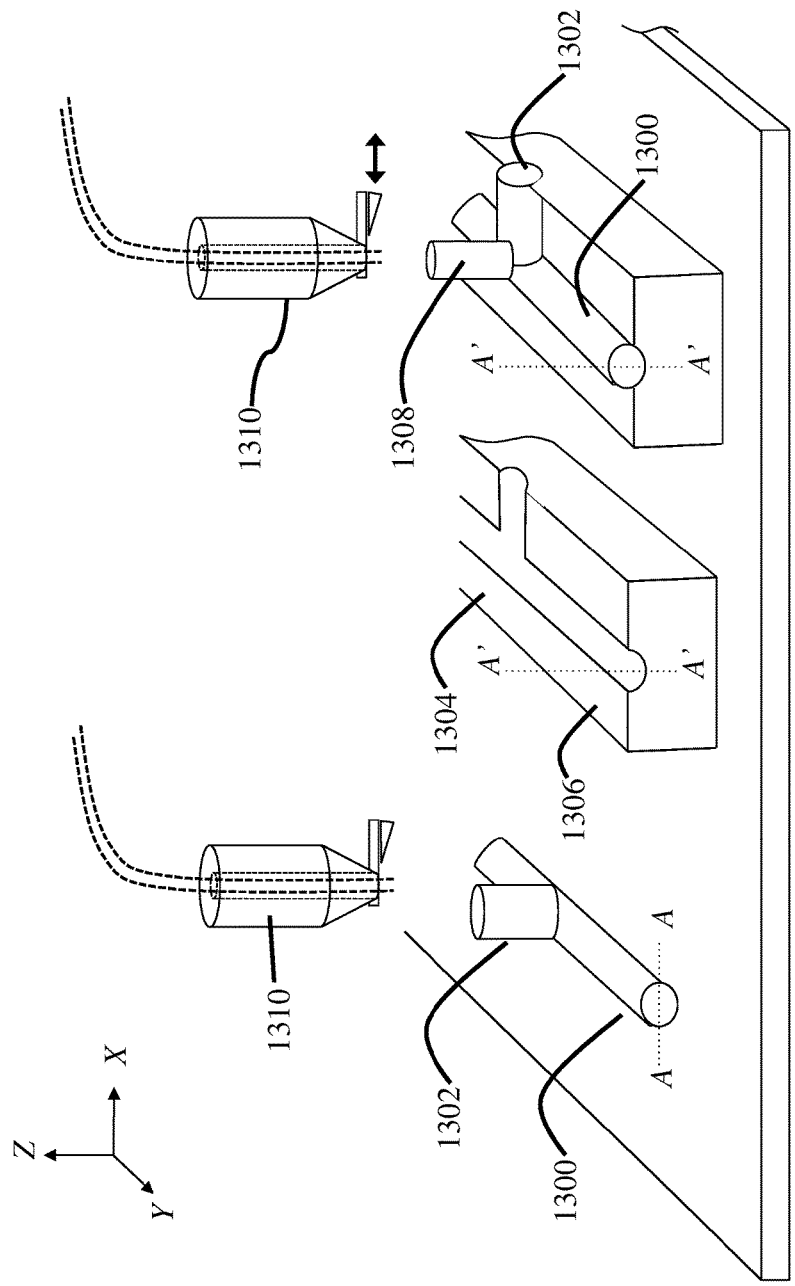
FIG. 27A is a schematic representation of a three dimensional printing process for forming a component in a first orientation.
FIG. 27B is a schematic representation of a fixture to use with the part of FIG. 27A.
FIG. 27C is a schematic representation of a three dimensional printing process for forming a component on the part of FIG. 27A in a second orientation.

FIGS. 27A-27C show a method of additive manufacturing of an anisotropic object with a printer head 1310. Part 1300 has a vertically oriented subcomponent 1302 printed with the part oriented with Plane A aligned with the XY print plane in a first orientation. The printed subcomponent 1302 forms a wound conductive coil of a motor, wound around the Z direction. In order to form another coil on the part 1300, a fixture 1304, shown in FIG. 27B, is added to the print area positioned at, or below, the print plane 1306. The fixture 1304 holds the part 1300 in a second orientation, with plane A rotated to plane A' such that the next subcomponent 1308 can be added to the part 1300. The subcomponent 1308 is again deposited in the Z direction, but is out of plane with subcomponent 1302, as shown in FIG. 27C.

Figure 28:
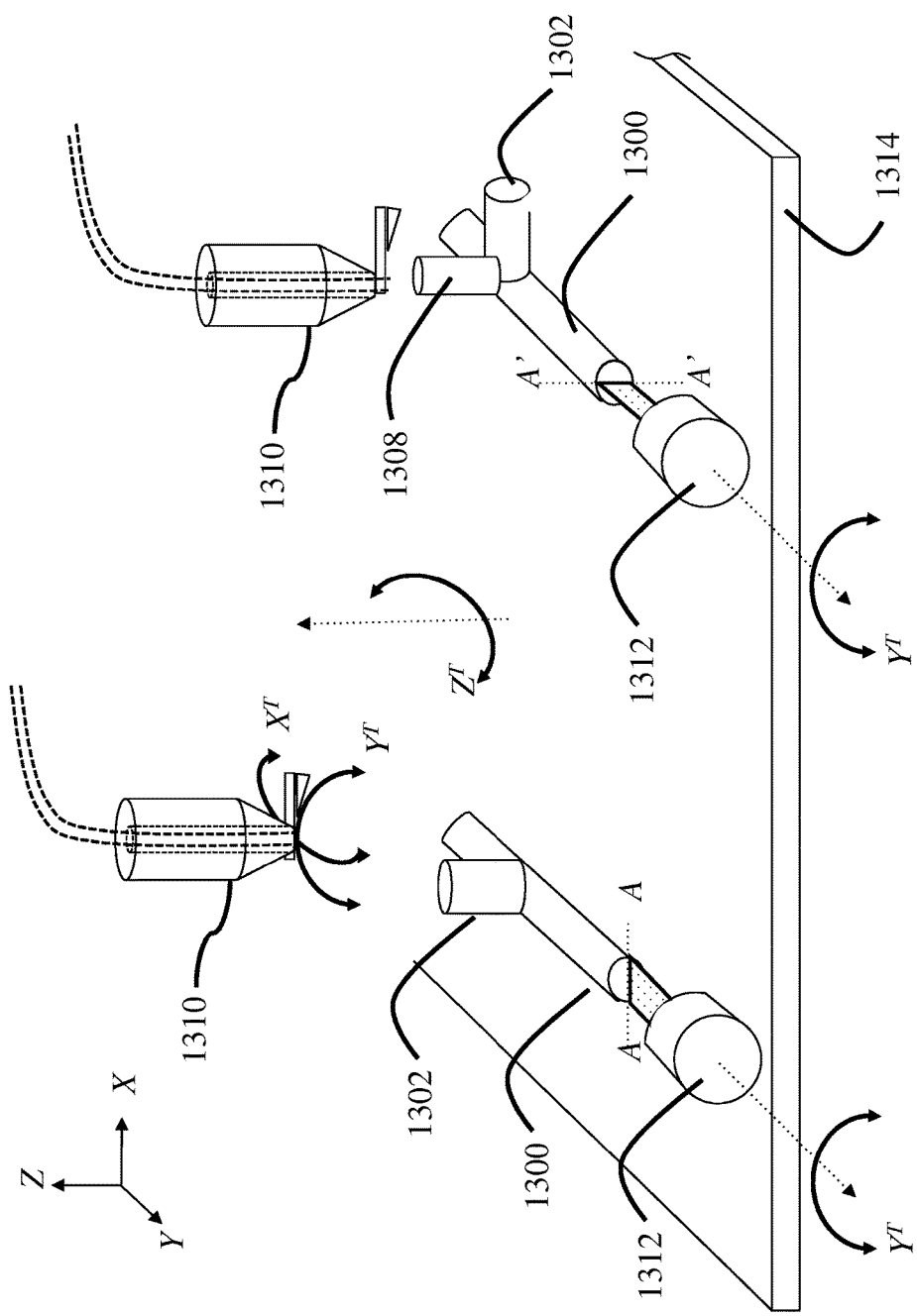
FIG. 28A is a schematic representation of a three dimensional printing process using a multiaxis system in a first orientation.
FIG. 28B is a schematic representation of forming a component in another orientation on the part of FIG. 28A.

FIG. 28A shows the same anisotropic part as FIGS. 27A-27C, but instead of using fixtures, the printer rotates the part 1300 and the printer head 1310 about one or more axes. Part 1300 is held in place by a rotating axis 1312, which sets and controls the orientation of plane A. In FIG. 28B, rotating axis 1312 has been rotated by 90° to form subcomponent 1308 in a direction that is perpendicular to subcomponent 1302. Conversely, printer head 510 could be pivoted about the XT and/or YT axes to achieve a similar result. Additional degrees of freedom can be added, e.g., in an automotive application, rotating axis 1312 may correspond to a rotisserie, enabling rotation of the vehicle frame about the YT axis to enable continuous fibers to be laid in the X-Y plane, the Z-Y plane, or any plane in between. Alternatively, a fluid rotation following the external contours of the vehicular body might be used to continuously deposited material on the vehicle as it is rotated. Such a three dimensional printer might optionally add the XT axis to the printer head to enable full contour following as well as the production of both convex and concave unibody structures. In addition or in the alternative to rotating the part 1300 and the printer head 1310, a table 1314 supporting the part 1300 could be rotated about the ZT axis to enable spun components of a given fiber direction.

The three-dimensional printer may form three dimensional shells over the outer contour of a stack of two dimensional layers. This may prevent delamination and increase torsional rigidity of the part.

Figure 29:
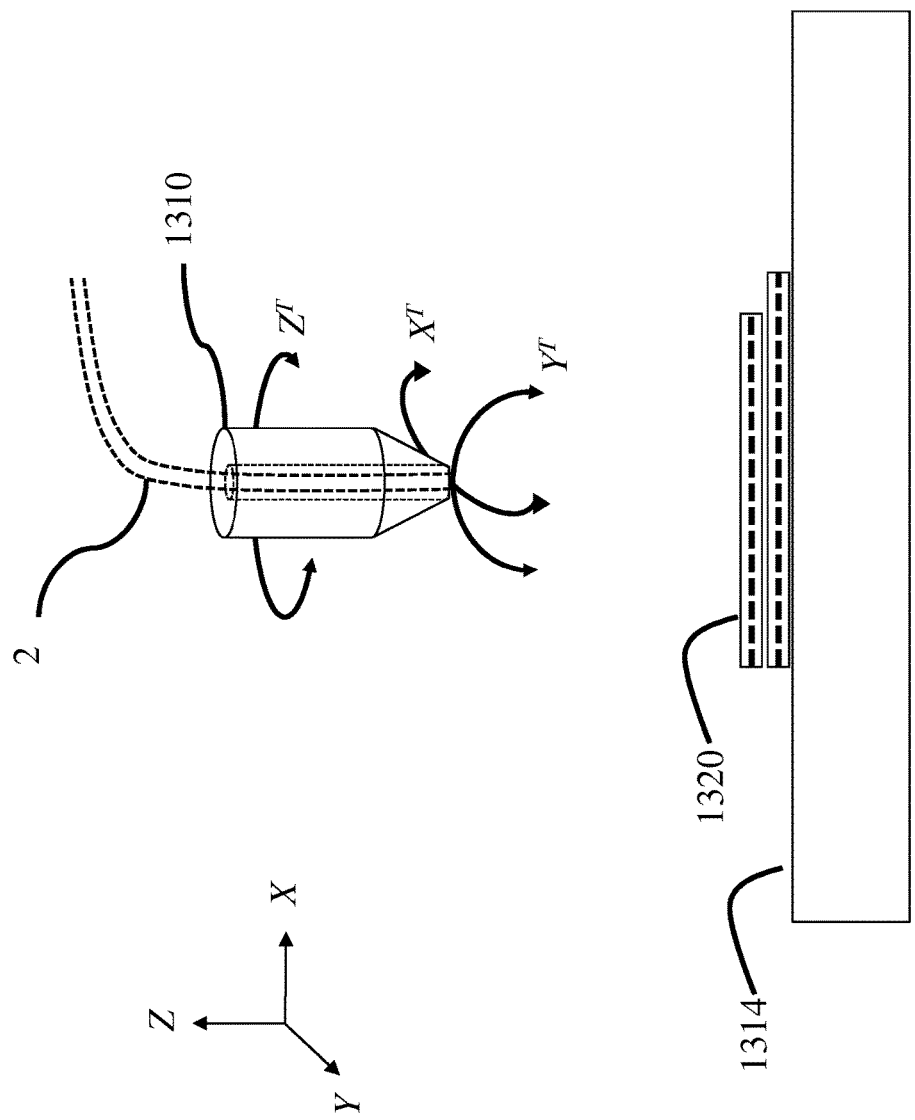
FIG. 29 is a schematic representation of a three dimensional printing system using a continuous core reinforced filament.

FIG. 29 shows a three dimensional printer head 1310 having the capabilities described with respect to FIGS. 28A and 28B, used to form a part including a three dimensionally printed shell. The printer head 1310 first deposits a series of layers 1320 (which may be fiber-reinforced or pure resin, or any combination) to build a part. The printer head 1310 is capable of articulating in the traditional XYZ directions, as well as pivoting in the XT, YT and ZT directions.

Figure 30A:
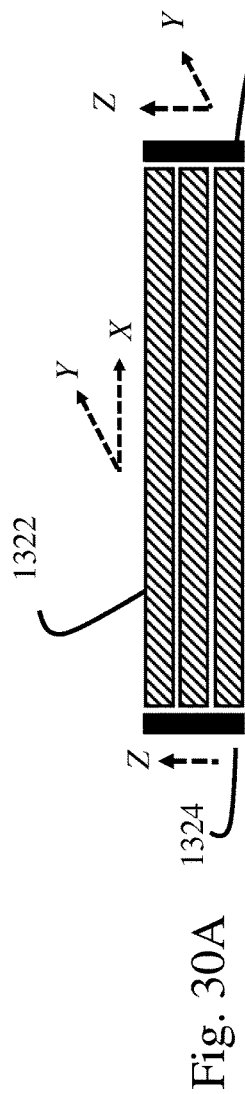
FIG. 30A is a schematic representation of a part including a shell applied to the sides using a three dimensional printing process.
Figure 30B:
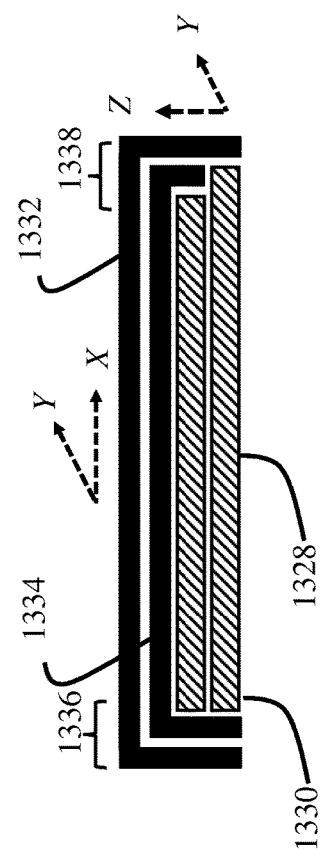
FIG. 30B is a schematic representation of a part including a shell applied to the top and sides using a three-dimensional printing process.
Figure 30C:
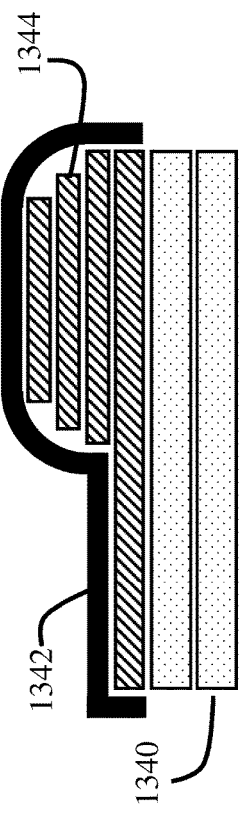
FIG. 30C is a schematic representation of a part including a shell that has been offset from an underlying supporting surface.

FIGS. 30A-30C depict various parts formed using the printer head depicted in FIG. 29. FIG. 30A shows a part including a plurality of sections 1322 deposited as two dimensional layers in the XY plane. Sections 1324 and 1326 are subsequently deposited in the ZY plane to give the part increased strength in the Z direction. FIG. 30B show a related method of shell printing, where layers 1328 and 1330 are formed in the XY plane and are overlaid with shells 1332 and 1334 which extend in both the XY and ZY planes. As depicted in the figure, the shells 1332 and 1334 may either completely overlap the underlying core formed from layers 1328 and 1330, see portion 1336, or one or more of the shells may only overly a portion of the underlying core. For example, in portion 1338 shell 1332 overlies both layers 1328 and 1330. However, shell 1334 does not completely overlap the layer 1328 and creates a stepped construction as depicted in the figure. FIG. 30C shows an alternative embodiment where a support material 1340 is added to raise the part relative to a build platen, or other supporting surface, such that the pivoting head of the three dimensional printer has clearance between the part and the supporting surface to enable the deposition of the shell 1342 onto the underlying layers 1344 of the part core.

The above described printer head may also be used to form a part with discrete subsections including different orientations of a continuous core reinforced filament. The orientation of the continuous core reinforced filament in one subsection may be substantially in the XY direction, while the direction in another subsection may be in the XZ or YZ direction.

Figure 30D:
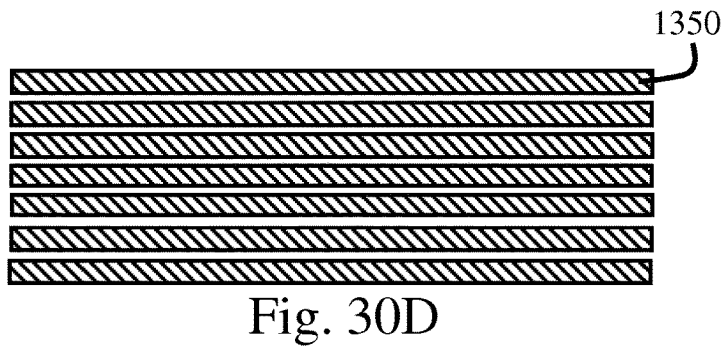
FIG. 30D is a schematic representation of a part formed with a fill material.
Figure 30E:
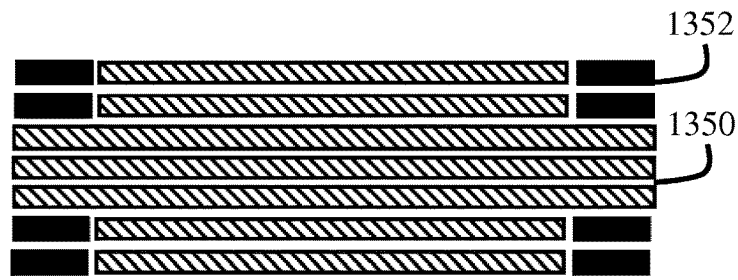
FIG. 30E is a schematic representation of a part formed with composite material extending inwards from the corners and polymer fill in the interior.
Figure 30F:
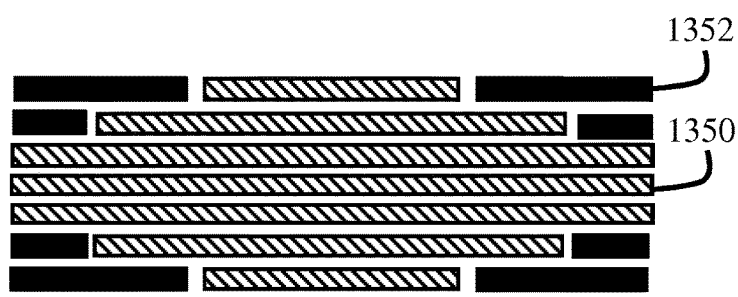
FIG. 30F is a schematic representation of a part formed with composite material extending inwards from the corners and polymer fill in the interior.
Figure 30G:
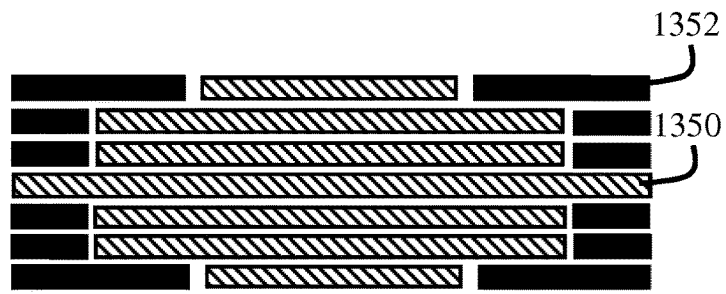
FIG. 30G is a schematic representation of a part formed with composite material extending inwards from the corners and polymer fill in the interior.

The inventive printing processes may utilize a fill pattern that uses high-strength composite material in selected areas and filler material (e.g., less strong composite or pure resin such as nylon) in other locations, see FIGS. 30D-30G, which depict stacks of layers in cross section. A part formed completely from the fill material 1350 is depicted in FIG. 30D. In FIG. 30E, a composite material 1352 is deposited at the radially outward most portions of the part and extending inwards for a desired distance to provide a desired increase in stiffness and strength. The remaining portion of the part is formed with the fill material 1350. A user may extend the use of composite versus filler either more or less from the various corners of the part as illustrated by the series of figures FIGS. 30D-30G. For example, a control algorithm controlled by controller 20 may use a concentric fill pattern that traces the outside corners and wall sections of the part, for a specified number of concentric infill passes, the remainder of the part may then be filled using a desired fill material.

FIGS. 31A-31C show the cross-section of various embodiments of an exemplary airfoil, solely as one shape that may be formed with different fiber orientations within various subsections. "Airfoil" herein is interchangeable with "3D shape having variable strength in different directions and along different surfaces".

FIG. 31A shows a method of building each section of the three dimensional part with plastic deposition in the same plane. Specifically, sections 1350, 1352 and 1354 are all constructed in the same XY planar orientation. The depicted sections are attached at the adjoining interfaces, the boundary of which is exaggerated for illustration purposes.

In FIG. 31B, part is constructed with separate sections 1362, 1364, and 1366 where the fiber orientations 1368 and 1372 of sections 1362 and 1366 are orthogonal to the fiber orientation 1370 of section 1364. By orthogonally orienting the fibers in section 1364 relative to the other sections, the resulting part has a much greater bending strength in the Z direction. Further, by constructing the part in this manner, the designer can determine the relative thickness of each section to prescribe the strength along each direction.

FIG. 31C depicts a shell combined with subsections including different fiber orientations. In this embodiment, sections 1374, 1376, and 1378 are deposited in the same direction to form a core, after which a shell 1386 is printed in the orthogonal direction. The shell 1386 may be a single layer or a plurality of layers. Further, the plurality of layers of shell 1386 may include a variety of orientation angles other than orthogonal to the underlying subsections of the core, depending on the design requirements. While this embodiment shows the inner sections with fiber orientations all in the same direction 1380, 1382, and 1384, it should be obvious that subsections 1374, 1376, and 1378 may be provided with different fiber orientations similar to FIG. 31B as well.

FIG. 32 depicts an optional embodiment of a three dimensional printer with selectable printer heads. In the depicted embodiment, a print arm 1400 is capable of attaching to printer head 1402 at universal connection 1404. An appropriate consumable material 1406, such as a continuous core reinforced filament, may already be fed into the printer head 1402, or it may be fed into the printer after it is attached to the printer 1400. When another print material is desired, print arm 1400 returns printer head 1402 to an associated holder. Subsequently, the printer 1400 may pick up printer head 1408 or 1410 which are capable of printing consumable materials that are either different in size and/or include different materials to provide different.

Although one version of the invention uses thermoplastic matrix, hybrid systems are possible. A reinforced filament may employ a matrix that is finished by curing cycle, e.g., using heat, light, lasers, and/or radiation. For example, continuous carbon fibers are embedded in a partially cured epoxy such that the extruded component sticks together, but requires a post-cure to fully harden. Similarly, while one version of the invention uses of preformed continuous core reinforced filaments, in some embodiments, the continuous core reinforced filament may be formed by combining a resin matrix and a solid continuous core in the heated extrusion nozzle. The resin matrix and the solid continuous core are able to be combined without the formation of voids along the interface due to the ease with which the resin wets the continuous perimeter of the solid core as compared to the multiple interfaces in a multifilament core. Therefore, such an embodiment may be of particular use where it is desirable to alter the properties of the deposited material.

Figure 33:
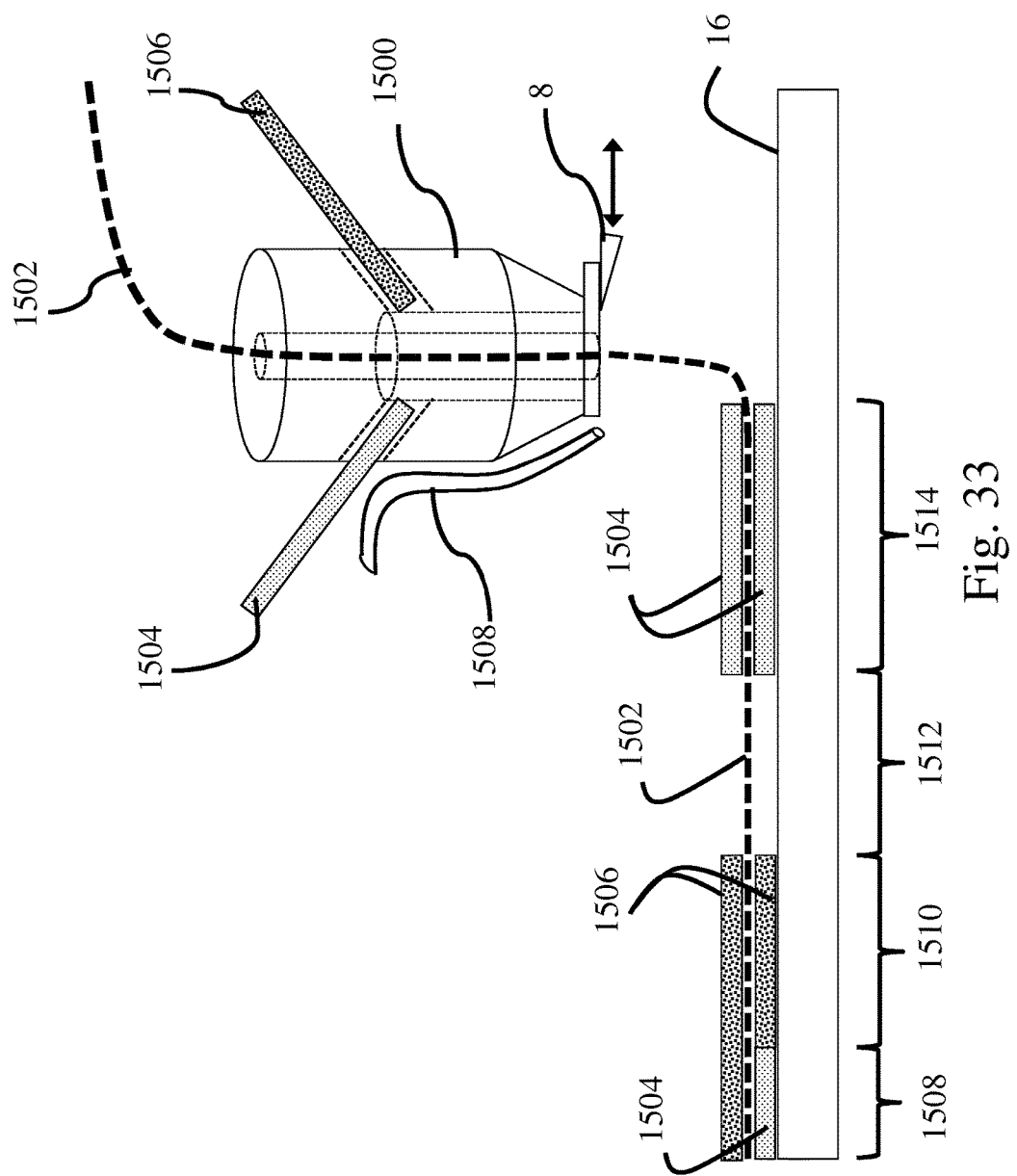
FIG. 33 is a schematic representation of a multi-element printer head for use in the printing system.

FIG. 33 depicts a hybrid multi-element printer head 1500 that is capable of selectively extruding material feed options fiber or wire 1502, first matrix 1504, and second matrix 1506 as well as an optional cutter 8. More specifically, the multi-element printer head 1500 is capable of selectively depositing any of material feed options 1502, 1504, and 1506, as singular elements or in combination. For example, material 1502 is a continuous copper wire fed through a central channel; material 1504 is a binding resin such as Nylon plastic; and material 1506 is a different binding resin such as a dissolvable or soluble support material. The printer head 1500 extrudes all the elements at once where, for example, the copper wire 1502 surrounded by the nylon binder 1504 on the bottom surface and the dissolvable support material 1506 on the top surface, see section 1508. The printer head 1500 may also deposit the copper wire 1502 coated with either the nylon binder 1504 or the soluble support material 1506 separately, see sections 1510 and 1514. Alternatively, the multi-element printer head 1500 may deposit the above noted material options singly for any number of purposes, see the bare copper wire at section 1512.

The printer head 1500 optionally includes an air nozzle 1508 which enables pre-heating of the print area and/or rapid cooling of the extruded material, see FIG. 33. The air nozzle 1508 may enable the formation of structures such as flying leads, gap bridging, and unsupported features. For example, a conductive core material may be extruded by the multi-element printer head 1500 with a co-extruded insulating plastic, to form a trace in the printed part. The end of the trace may then be terminated as a flying lead or pigtail. To achieve this, the multi-element printer head would lift, while commensurately extruding the conductive core and insulating jacket. The multi-element printer head may also optionally cool the insulating jacket with the air nozzlet 1508. The end of the wire could then be printed as a "stripped wire" where the conductive core is extruded without the insulating jacket. The cutter 8 may then terminate the conductive core. Formation of a flying lead in the above-noted manner may be used to eliminate a stripping step down stream during assembly.

Figure 34:
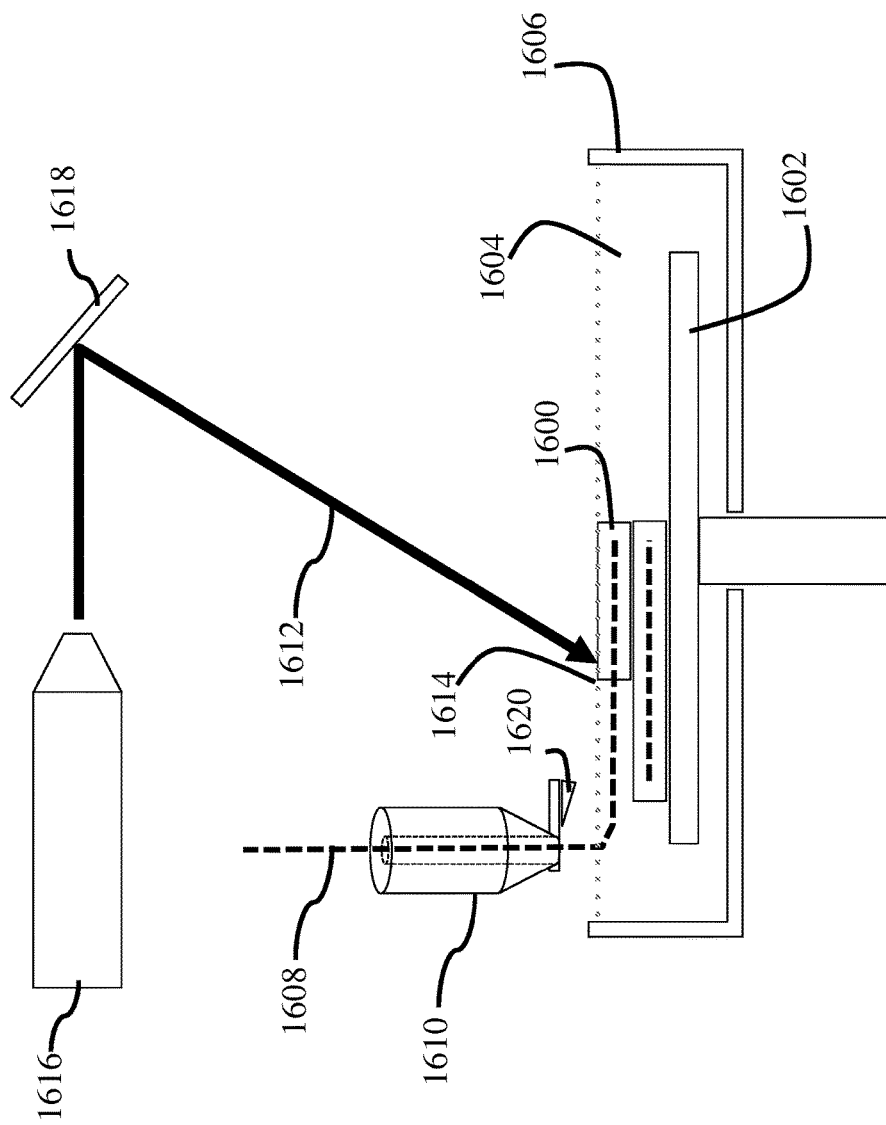
FIG. 34 is a schematic representation of a stereolithography three dimensional printing process including deposited reinforcing fibers.

FIG. 34 depicts a different hybrid system, employing stereolithography (and/or selective laser sintering) to provide the matrix about the embedded fiber, i.e. processes in which a continuous resin in liquid or powder form is solidified layer by layer by sweeping a focused radiation curing beam (laser, UV) in desired layer configurations. In order to provide increased strength as well as the functionalities associated with different types of continuous core filaments including both solid and multifilament materials, the stereolithography process associated with the deposition of each layer can be modified into a two-step process that enables construction of composite components including continuous core filaments in desired locations and directions. A continuous core or fiber may be deposited in a desired location and direction within a layer to be printed, either completely or partially submerged in the resin. After the continuous fiber is deposited in the desired location and direction, the adjoining resin is cured to harden around the fiber. This may either be done as the continuous fiber is deposited, or it may be done after the continuous fiber has been deposited. In one embodiment, the entire layer is printed with a single continuous fiber without the need to cut the continuous fiber. In other embodiments, reinforcing fibers may be provided in different sections of the printed layer with different orientations. In order to facilitate depositing the continuous fiber in multiple locations and directions, the continuous fiber may be terminated using a cutter as described herein, or by the laser that is used to harden the resin.

FIG. 34 depicts a part 1600 being built on a platen 1602 using stereolithography. The part 1600 is immersed in a liquid resin (photopolymer) material 1604 contained in a tray 1606. During formation of the part 1600, the platen 1602 is moved by a layer thickness to sequentially lower after the formation of each layer to keep the part 1600 submerged. During the formation of each layer, a continuous core filament 1608 is fed through a nozzlet 1610 and deposited onto the part 1600. The nozzlet 1610 is controlled to deposit the continuous core filament 1608 in a desired location as well as a desired direction within the layer being formed. The feed rate of the continuous core filament 1608 may be equal to the speed of the nozzlet 1610 to avoid disturbing the already deposited continuous core filaments. As the continuous core filament 1608 is deposited, appropriate electromagnetic radiation (e.g., laser 1612) cures the resin surrounding the continuous core filament 1608 in a location 1614 behind the path of travel of the nozzlet 1610. The distance between the location 1614 and the nozzlet 1610 may be selected to allow the continuous core filament to be completely submerged within the liquid resin prior to curing. The laser is generated by a source 1616 and is directed by a controllable mirror 1618. The three dimensional printer also includes a cutter 1620 to enable the termination of the continuous core filament as noted above.

Figure 35:
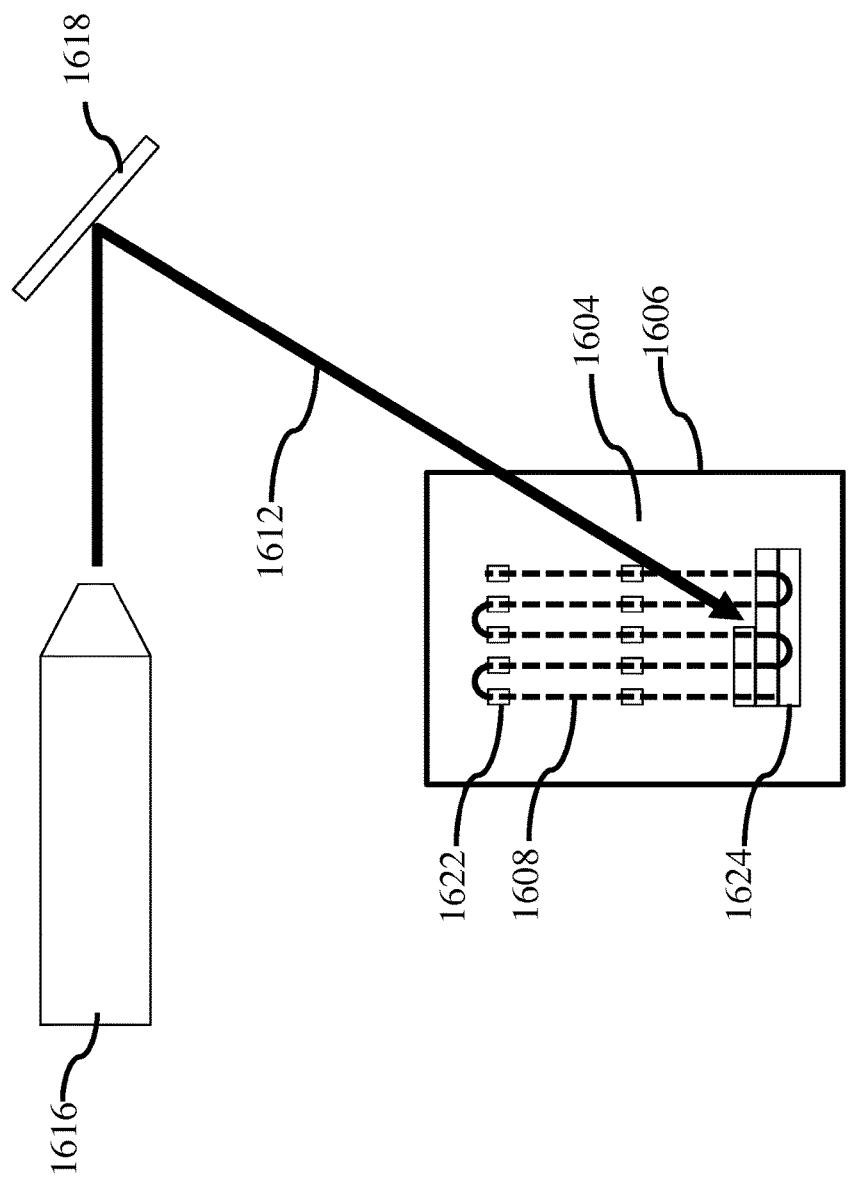
FIG. 35 is a schematic representation of a stereolithography three dimensional printing process including deposited reinforcing fibers.

Optionally, the deposited filament is held in place by one or more "tacks", which are a sufficient amount of hardened resin material that holds the continuous core filament in position while additional core material is deposited. As depicted in FIG. 35, the continuous core filament 1608 is tacked in place at multiple discrete points 1622 by the laser 1612 as the continuous core filament is deposited by a nozzle, not depicted. After depositing a portion, or all, of the continuous core filament 1608, the laser 1612 is directed along a predetermined pattern to cure the liquid resin material 1604 and form the current layer. Similar to the above system, appropriate electromagnetic radiation (e.g., laser 1612), is generated by a source 1616 and directed by a controllable mirror 1618. The balance of the material can be cured to maximize cross linking between adjacent strands is maximized, e.g., when a sufficient number of strands has been deposited onto a layer and tacked in place, the resin may be cured in beads that are perpendicular to the direction of the deposited strands of continuous core filament. Curing the resin in a direction perpendicular to the deposited strands may provide increased bonding between adjacent strands to improve the part strength in a direction perpendicular to the direction of the deposited strands of continuous core filament. If separate portions of the layer include strands of continuous core filament oriented in different directions, the cure pattern may include lines that are perpendicular or parallel to the direction of the strands of continuous fibers core material in each portion of the layer.

To avoid the formation of voids along the interface between the continuous core filament and the resin matrix during the stereolithography process, it may be desirable to facilitate wetting or wicking. Wetting of the continuous fiber and wicking of the resin between the into the cross-section of the continuous multifilament core may be facilitated by maintaining the liquid resin material at an elevated temperature, for a certain amount of time, using a wetting agent on the continuous fiber, applying a vacuum to the system, or any other appropriate method.

In addition to using the continuous core reinforced filaments to form various composite structures with properties in desired directions using the fiber orientation, in some embodiments it is desirable to provide additional strength in directions other than the fiber direction. For example, the continuous core reinforced filaments might include additional composite materials to enhance the overall strength of the material or a strength of the material in a direction other than the direction of the fiber core. For example, carbon fiber core material may include substantially perpendicularly loaded carbon nanotubes. Loading substantially perpendicular small fiber members on the core increases the shear strength of the composite, and advantageously increases the strength of the resulting part in a direction substantially perpendicular to the fiber direction. Such an embodiment may help to reduce the propensity of a part to delaminate along a given layer.

What is claimed is:

1. A method for additive manufacturing of a part, the method comprising:
   feeding an unmelted fiber reinforced composite filament including multiple strands extending within a matrix material;
   heating the fiber reinforced composite filament in a transverse pressure zone to a temperature greater than a melting temperature of the matrix material to melt the matrix material interstitially within the fiber reinforced composite filament;
   applying a flattening force to the fiber reinforced composite filament as the fiber reinforced composite filament is deposited in bonded ranks to the part; and
   maintaining a neutral to positive tension in the fiber reinforced composite filament between the flattening force and the part, the neutral to positive tension being a tension less than that necessary to separate a bonded rank from the part.

2. The method of claim 1, wherein the feeding the unmelted fiber reinforced composite filament includes feeding the unmelted fiber reinforced composite along a clearance fit zone that prevents buckling of the fiber reinforced composite filament.

3. The method of claim 1, wherein the matrix material comprises a thermoplastic resin having an unmelted ultimate tensile strength of approximately 10 through 100 MPa and a melted ultimate tensile strength of less than 10 MPa, and at least one of the multiple strands includes a stranded material having an ultimate tensile strength of approximately 200-100000 MPa.

4. The method of claim 3, further comprising heating the fiber reinforced composite filament in a non-contact zone, and maintaining the neutral to positive tension primarily via tensile force within the multiple strands.

5. The method of claim 1, further comprising maintaining a substantially constant cross sectional area of the fiber reinforced composite filament in the transverse pressure zone as a bonded rank is attached to the part.

6. The method of claim 5, wherein the fiber reinforced composite filament has a cross sectional area greater than 1×10E-5 square inches and less than 2×10E-3 square inches.

7. The method of claim 5, wherein at least one of the multiple strands includes, in any cross-section area, between 100 and 6000 parallel continuous axial strands.

8. The method of claim 1, further comprising cutting the fiber reinforced composite filament at or adjacent the flattening force.

9. The method of claim 1, further comprising:
drawing the fiber reinforced composite filament in the transverse pressure zone from a connection to a first portion of the part;
translating the transverse pressure zone through free space; and
flattening to reconnect the fiber reinforced composite filament to a second portion of the part.

10. A method for additive manufacturing of a part, the method comprising:
supplying an unmelted fiber reinforced composite filament including multiple strands extending within a matrix material of the fiber reinforced composite filament;
threading forward the fiber reinforced composite filament to contact the part in a transverse pressure zone;
translating the transverse pressure zone relative to and adjacent to the part-to bring an end of the fiber reinforced composite filament to a melting position; and
melting the matrix material interstitially within the fiber reinforced composite filament at the melting position.

11. The method of claim 10, further comprising:
flattening, with a flattening force, the fiber reinforced composite filament as it is pressed in bonded ranks to the part; and
maintaining a neutral to positive tension in the fiber reinforced composite filament between the flattening force and the bonded ranks, the neutral to positive tension being a tension less than that necessary to separate a bonded rank from the part.

12. The method of claim 11, further comprising controlling a height of the flattening force from a top of the part during the flattening to be less than a diameter of the fiber reinforced composite filament.

13. The method of claim 10, wherein the matrix material comprises a thermoplastic resin having an unmelted elastic modulus of approximately 0.1 through 5 GPa and a melted elastic modulus of less than 0.1 GPa, and at least one of the multiple strands includes a stranded material having an elastic modulus of approximately 5-1000 GPa.

14. The method of claim 10, further comprising;
heating the fiber reinforced composite filament immediately upstream of the flattening; and
compressing along the fiber reinforced composite filament via an axial compressive force within the multiple strands extending along the fiber reinforced composite filament.

15. The method of claim 14, further comprising translating an end of the fiber reinforced composite filament abutting the part laterally underneath the transverse pressure zone to be flattened by application of heat and pressure.

16. The method of claim 15, further comprising maintaining the fiber reinforced composite filament at a temperature below a glass transition temperature of the matrix material throughout at least one channel.

17. The method of claim 10, further comprising cutting the fiber reinforced composite filament in an unmelted state.

18. The method of claim 10, further comprising preventing the fiber reinforced composite filament from touching at least one heated wall of a cavity adjacent the transverse pressure zone.

19. The method of claim 10, further comprising touching the fiber reinforced composite filament to a heated member in the transverse pressure zone to melt the matrix material of the fiber reinforced composite filament.

20. The method of claim 10, further comprising:
forming ranks formed from flattened fiber reinforced composite filament bonded to the part, and
reshaping the ranks laterally and vertically with the flattening force combined with a reaction force from previously formed ranks.

21. The method according to claim 1, wherein heating the fiber reinforced composite filament in the transverse pressure zone to the temperature greater than the melting temperature of the matrix material to melt the matrix material interstitially within the fiber reinforced composite filament includes heating the fiber reinforced composite filament in the transverse pressure zone to a temperature greater than a glass transition temperature of the matrix material to flow the matrix material interstitially within the fiber reinforced composite filament.

22. The method according to claim 1, wherein heating the fiber reinforced composite filament in the transverse pressure zone to the temperature greater than the melting temperature of the matrix material to melt the matrix material interstitially within the fiber reinforced composite filament includes heating the fiber reinforced composite filament in the transverse pressure zone to a temperature greater than a melting point temperature of the matrix material to flow the matrix material interstitially within the fiber reinforced composite filament.

23. The method according to claim 10, wherein translating the transverse pressure zone relative to and adjacent to the part to bring the end of the fiber reinforced composite filament to the melting position comprises translating the transverse pressure zone relative to and adjacent to the part to bring the end of the fiber reinforced composite filament to a glass transition position, and
wherein melting the matrix material interstitially within the fiber reinforced composite filament at the melting position comprises flowing the matrix material interstitially within the fiber reinforced composite filament at the glass transition position.

24. The method according to claim 10, wherein translating the transverse pressure zone relative to and adjacent to the part to bring the end of the fiber reinforced composite filament to the melting position comprises translating the transverse pressure zone relative to and adjacent to the part to bring the end of the fiber reinforced composite filament to a melting point position, and
wherein melting the matrix material interstitially within the fiber reinforced composite filament at the melting position comprises flowing the matrix material interstitially within the fiber reinforced composite filament at the melting point position.

* * * * *